US012547605B2

(12) United States Patent
Knoll et al.

(10) Patent No.: US 12,547,605 B2
(45) Date of Patent: Feb. 10, 2026

(54) PERFORMING LOAD ERROR TRACKING DURING LOADING OF DATA FOR STORAGE VIA A DATABASE SYSTEM

(71) Applicant: Ocient Holdings LLC, Chicago, IL (US)

(72) Inventors: Steffen R. Knoll, Stuttgart (DE); Helen L. Hu, Darien, IL (US); George Kondiles, Chicago, IL (US); Austin Chang, San Jose, CA (US); Evan Jiang, Brooklyn, NY (US); Jonathan C. Kelley, Lake Bluff, IL (US); Pavel Yusim, Chicago, IL (US); Owen Pang, Austin, TX (US); Thomas E. Smith, Ann Arbor, MI (US)

(73) Assignee: Ocient Holdings LLC, Chicago, IL (US)

( * ) Notice: Subject to any disclaimer, the term of this patent is extended or adjusted under 35 U.S.C. 154(b) by 25 days.

(21) Appl. No.: 18/642,043

(22) Filed: Apr. 22, 2024

(65) Prior Publication Data

US 2025/0328518 A1 Oct. 23, 2025

(51) Int. Cl.
*G06F 16/00* (2019.01)
*G06F 16/23* (2019.01)

(52) U.S. Cl.
CPC ................ *G06F 16/2365* (2019.01)

(58) Field of Classification Search
CPC .................................. G06F 16/2365
USPC .................................. 707/600–899
See application file for complete search history.

(56) References Cited

U.S. PATENT DOCUMENTS

| 5,548,770 | A | 8/1996 | Bridges |
| 6,230,200 | B1 | 5/2001 | Forecast |
| 6,633,772 | B2 | 10/2003 | Ford |
| 7,499,907 | B2 | 3/2009 | Brown |
| 7,908,242 | B1 | 3/2011 | Achanta |
| 9,372,904 | B2 * | 6/2016 | Dola ............... G06F 16/254 |
| 11,314,579 | B2 * | 4/2022 | Ramasamy ........... H04L 67/10 |
| 2001/0051949 | A1 | 12/2001 | Carey |

(Continued)

OTHER PUBLICATIONS

A new high performance fabric for HPC, Michael Feldman, May 2016, Intersect360 Research.

(Continued)

*Primary Examiner* — Michelle N Owyang
(74) *Attorney, Agent, or Firm* — GARLICK & MARKISON; Timothy W. Markison

(57) ABSTRACT

A database system is operable to initiate performance of a loading process to load a plurality of records included across a plurality of files based on processing the plurality of files to process the plurality of records for storage via the database system. During performance of the loading process, load error tracking data is maintained in accordance with error handling configuration data. When a record-level error occurs during processing of a corresponding record of the plurality of records, the load error tracking data is updated to indicate the record-level error for the corresponding record. When a file-level error occurs during processing of a corresponding file of the plurality of files, the load error tracking data is updated to indicate the file-level error for the corresponding file. The load error tracking data is communicated for access by a user entity associated with the loading process.

18 Claims, 67 Drawing Sheets

(56) References Cited

U.S. PATENT DOCUMENTS

| | | |
|---|---|---|
| 2002/0032676 A1 | 3/2002 | Reiner |
| 2004/0162853 A1 | 8/2004 | Brodersen |
| 2008/0133456 A1 | 6/2008 | Richards |
| 2009/0063893 A1 | 3/2009 | Bagepalli |
| 2009/0183167 A1 | 7/2009 | Kupferschmidt |
| 2010/0082577 A1 | 4/2010 | Mirchandani |
| 2010/0241646 A1 | 9/2010 | Friedman |
| 2010/0274983 A1 | 10/2010 | Murphy |
| 2010/0312756 A1 | 12/2010 | Zhang |
| 2011/0219169 A1 | 9/2011 | Zhang |
| 2012/0109888 A1 | 5/2012 | Zhang |
| 2012/0151118 A1 | 6/2012 | Flynn |
| 2012/0185866 A1 | 7/2012 | Couvee |
| 2012/0254252 A1 | 10/2012 | Jin |
| 2012/0311246 A1 | 12/2012 | Mcwilliams |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2015/0066800 A1* | 3/2015 | Hawes, III ............ G06Q 10/06 705/342 |
| 2015/0205607 A1 | 7/2015 | Lindholm |
| 2015/0244804 A1 | 8/2015 | Warfield |
| 2015/0248366 A1 | 9/2015 | Bergsten |
| 2015/0293966 A1 | 10/2015 | Cai |
| 2015/0310045 A1 | 10/2015 | Konik |
| 2016/0034547 A1 | 2/2016 | Lerios |
| 2016/0378589 A1* | 12/2016 | Kambayashi ......... G06F 3/0673 714/807 |
| 2020/0364224 A1* | 11/2020 | Hay ..................... G06F 16/2379 |
| 2021/0004350 A1* | 1/2021 | Sundaramoorthy ........................ G06F 16/1744 |
| 2023/0367773 A1 | 11/2023 | Kondiles |
| 2024/0045880 A1* | 2/2024 | Gonel .................. G06F 16/254 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy . . . com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends In Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

\* cited by examiner database system 10 computing device 18 computing device 18 computing device 18 node 37 node 37 node 37 node 37

FIG. 18 — data for segment 1 (raw segment); primary organization column (e.g., time stamp); selected key column (e.g., engine on or off)

FIG. 19 — divide segment by columns into data slabs; data slab

FIG. 20 — sort data slabs based on key column(s); sorted data slab query processing system 2502

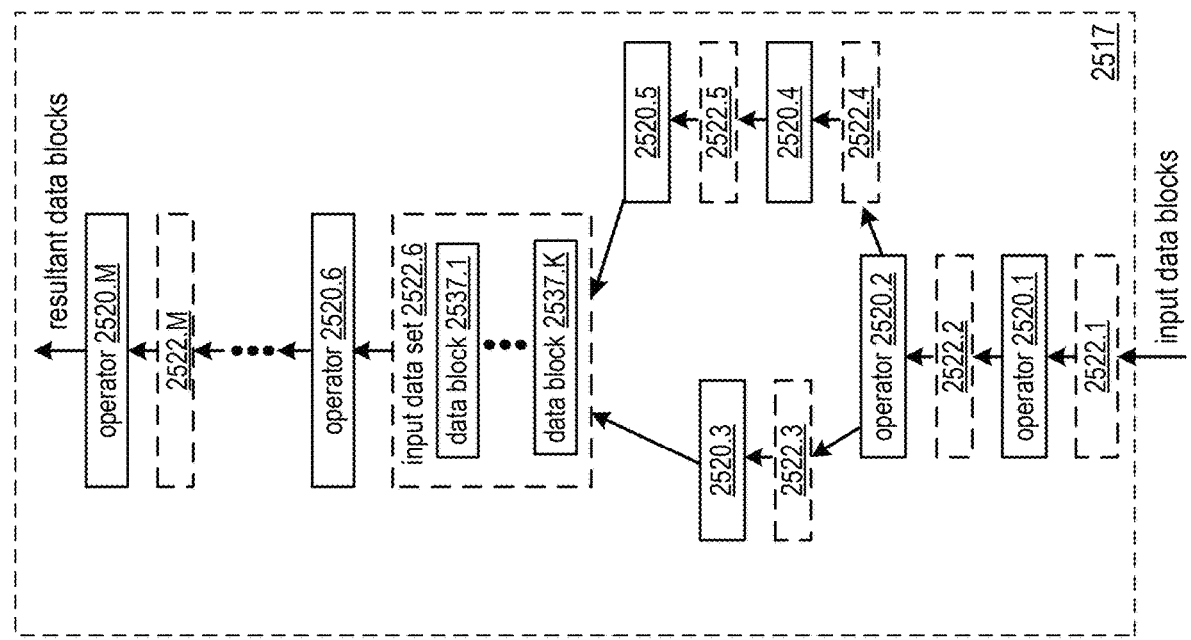

database system 10 database system 10 query execution module 2504 database system 10 database system 10 query processing system 2510 query processing system 2510 database system 10 database system 10

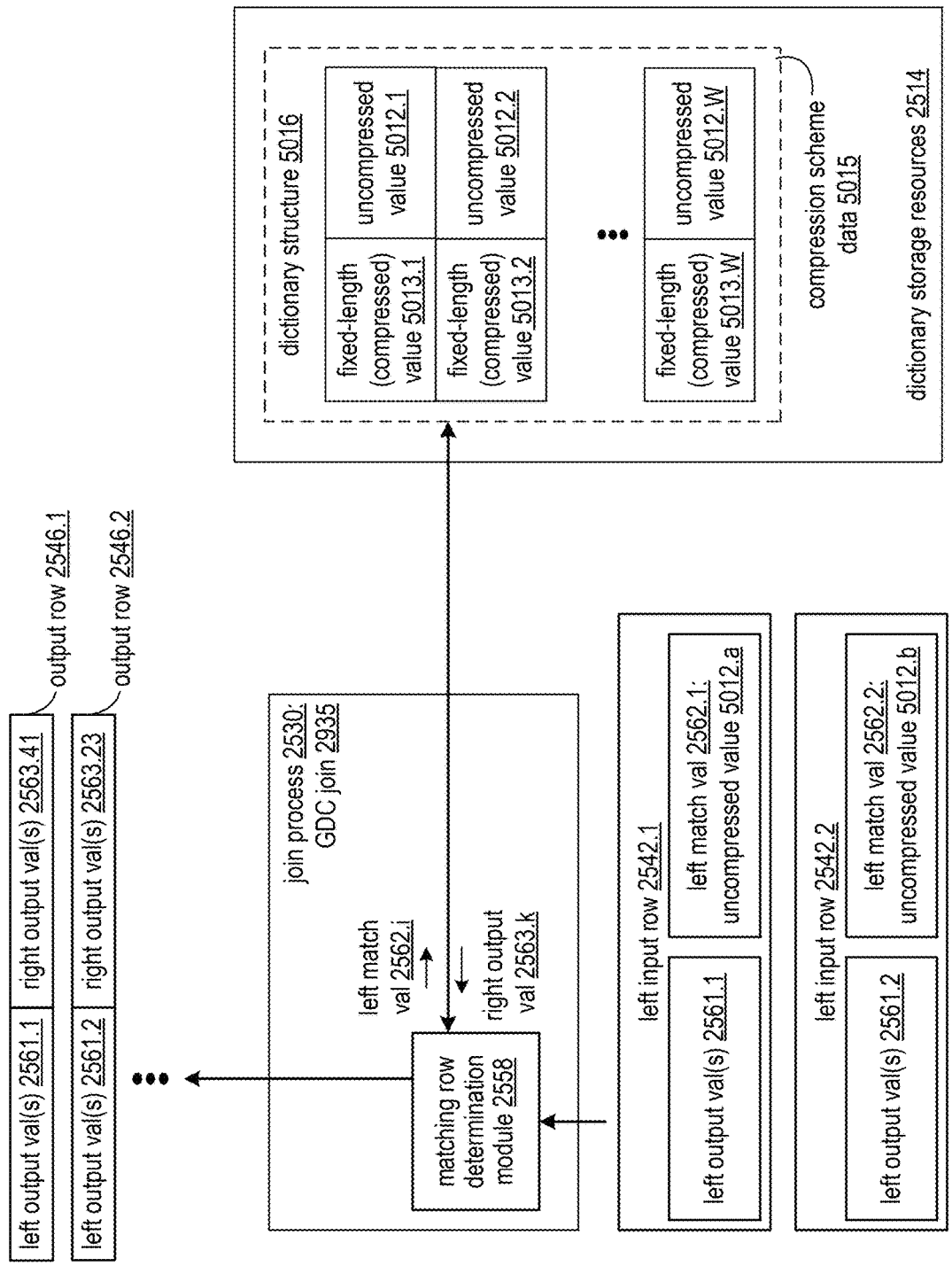

database system 10 record processing and storage system 2505 database system 10 database system 10 database system 10 transformation graph data 2715 initial transformation graph data 2715' database system 10 database system 10 database system 10 database system 10 database system 10 database system 10 loading process 2605

PERFORMING LOAD ERROR TRACKING DURING LOADING OF DATA FOR STORAGE VIA A DATABASE SYSTEM

CROSS-REFERENCE TO RELATED APPLICATIONS

None

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 24H is a schematic block diagram of a query operator execution flow in accordance with various embodiments;

FIG. 24V is a schematic block diagram of a query execution module that implements a Global Dictionary Compression join via access to a dictionary structure in accordance with various embodiments;

DETAILED DESCRIPTION OF THE INVENTION

Figure 1:
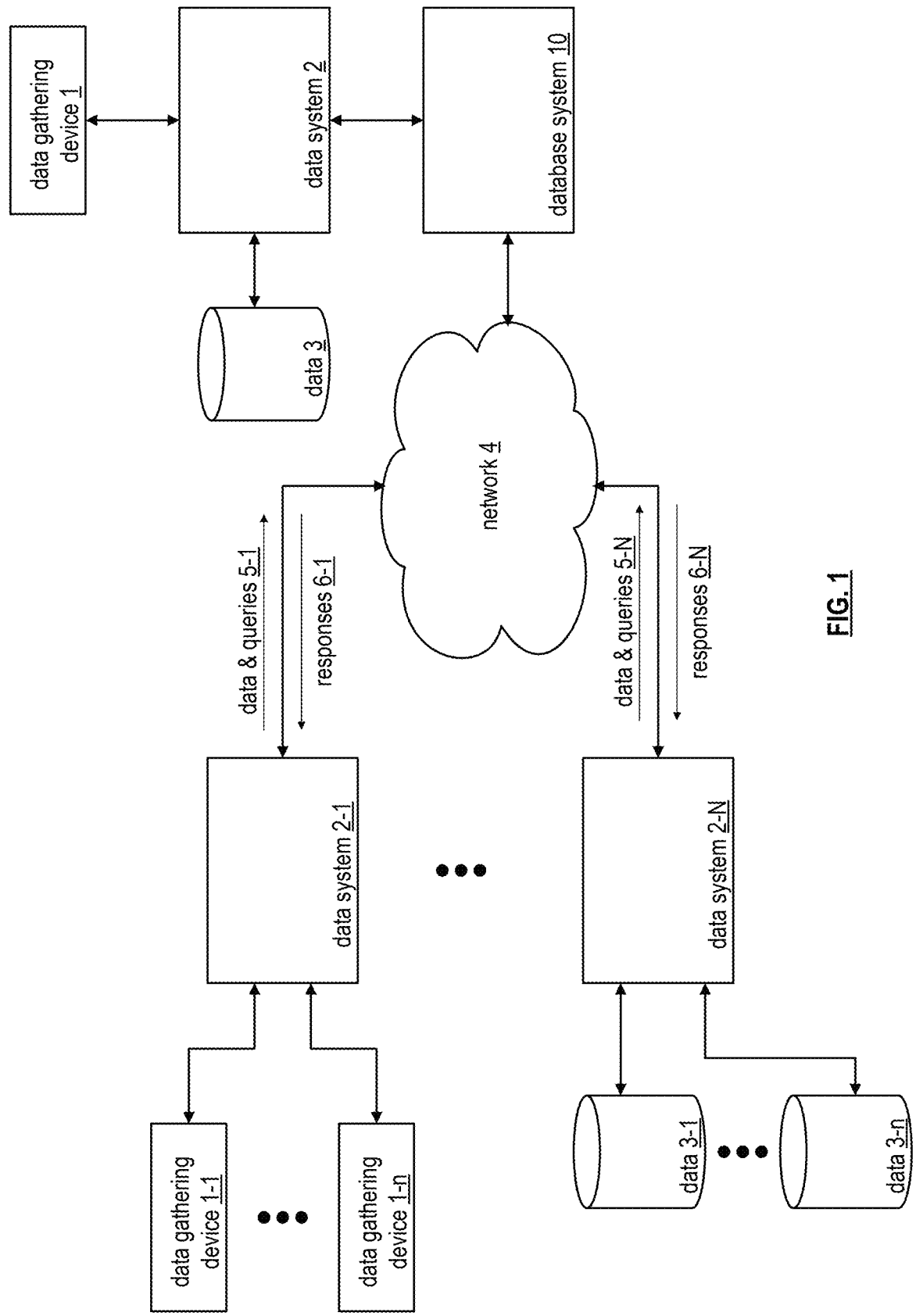
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
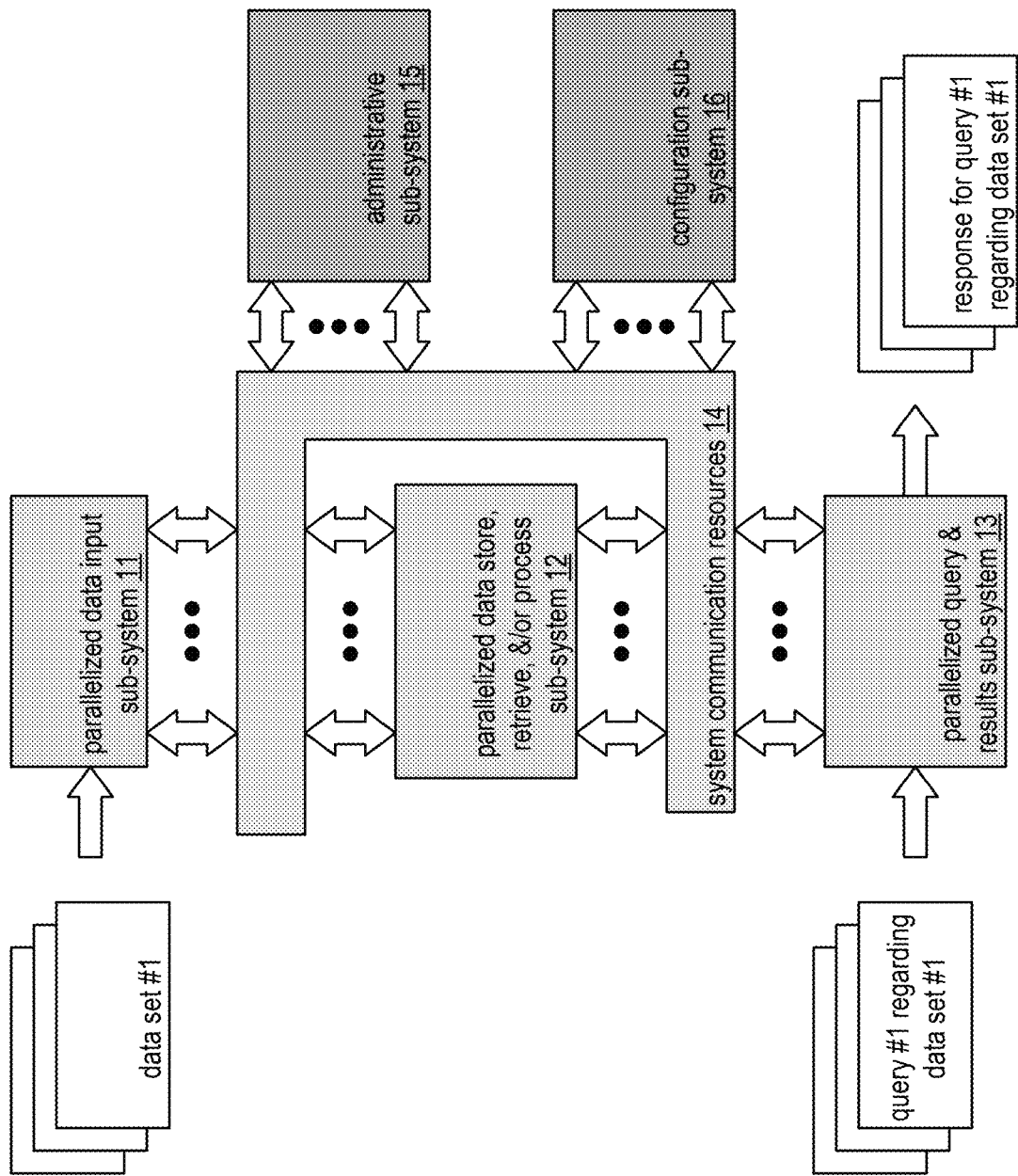
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of: wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
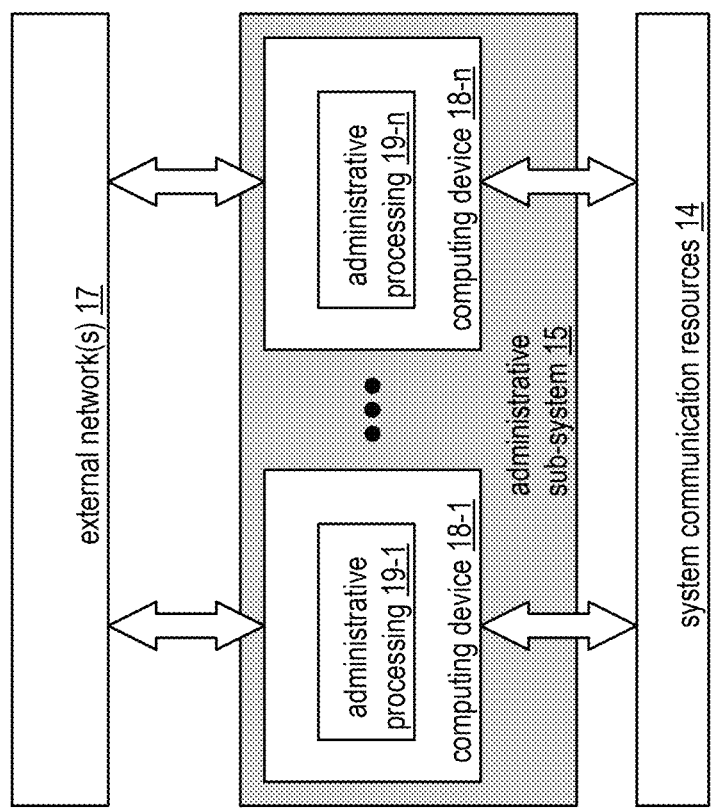
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
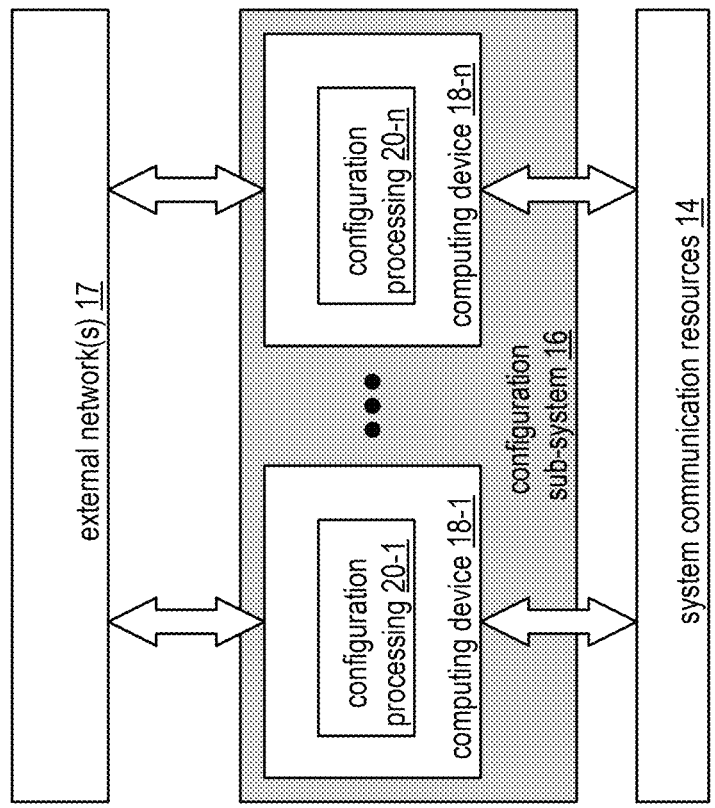
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
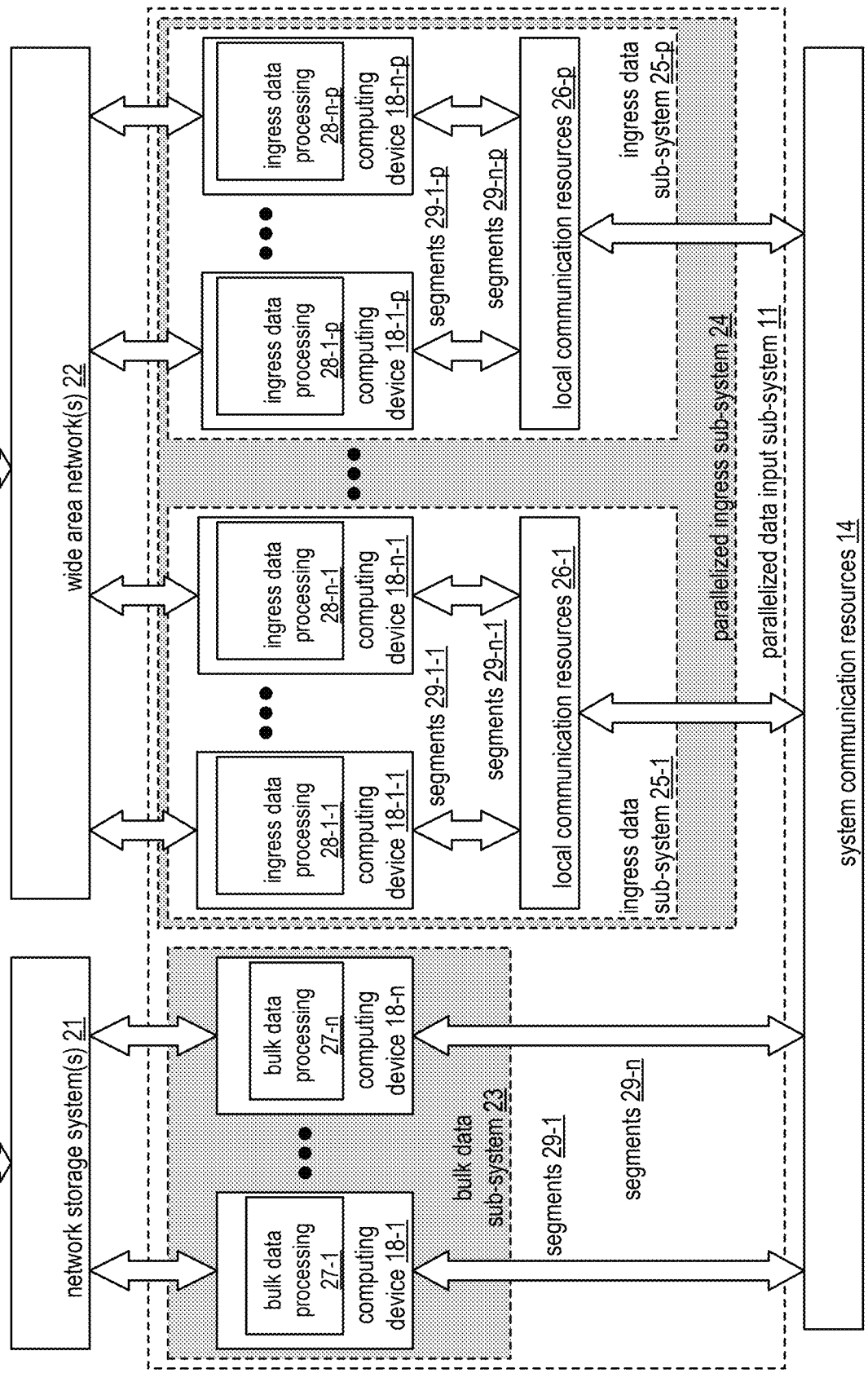
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-$p$, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
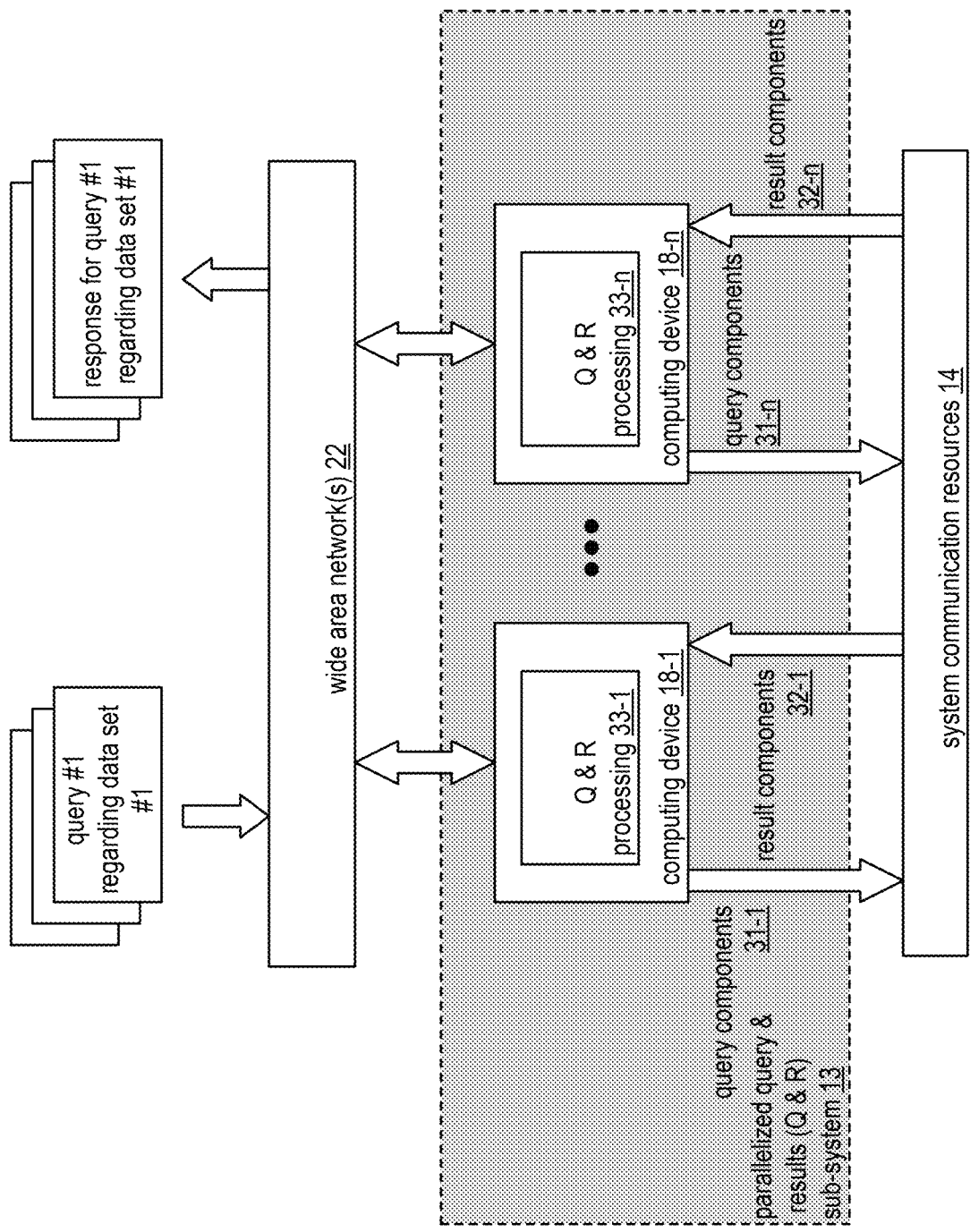
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-$n$. Each of the computing devices executes a query (Q) & response (R) processing function 33-1 through 33-$n$. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-$n$. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
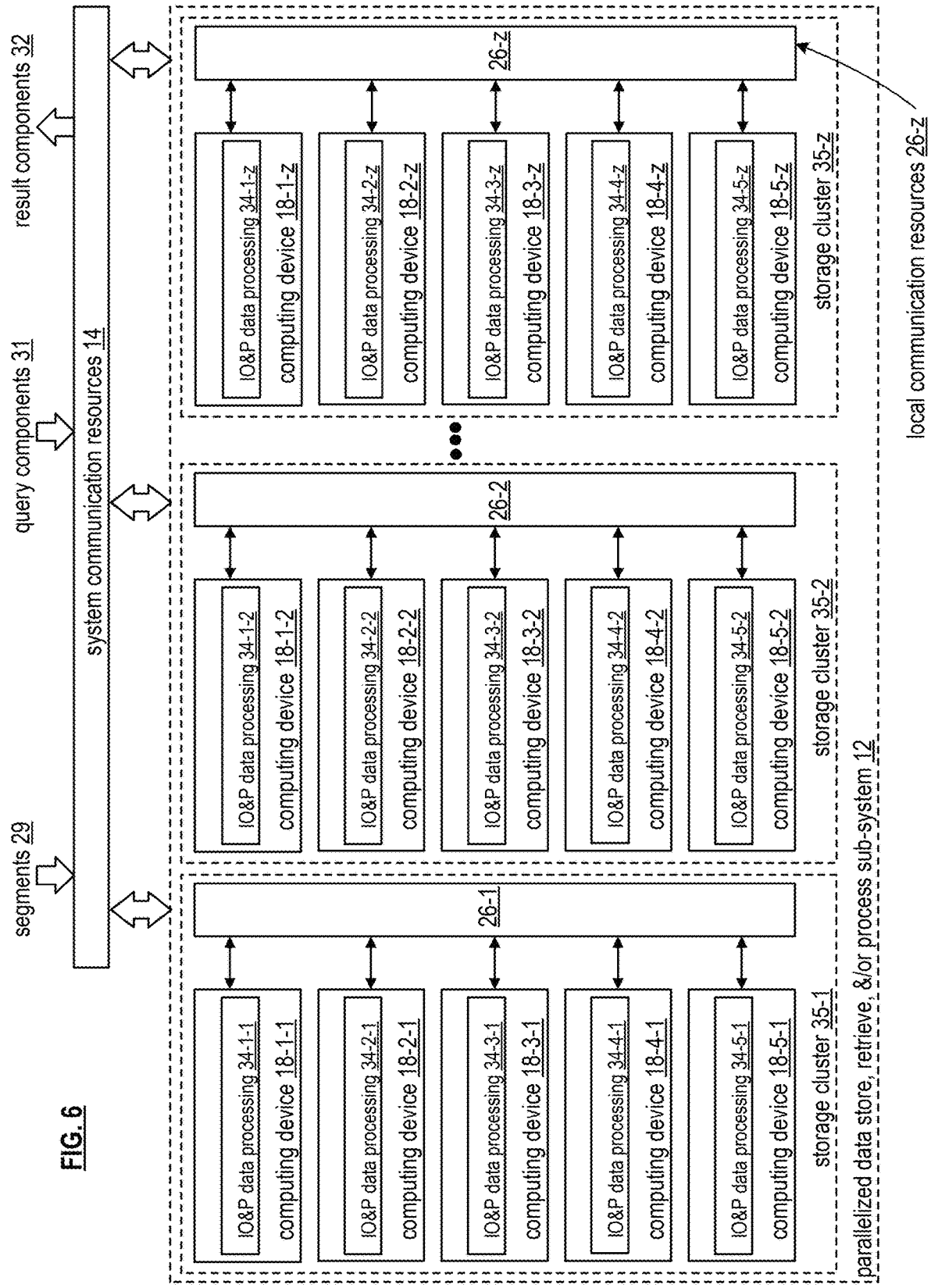
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-$z$. Each storage cluster includes a corresponding local communication resource 26-1 through 26-$z$ and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-$n$ are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
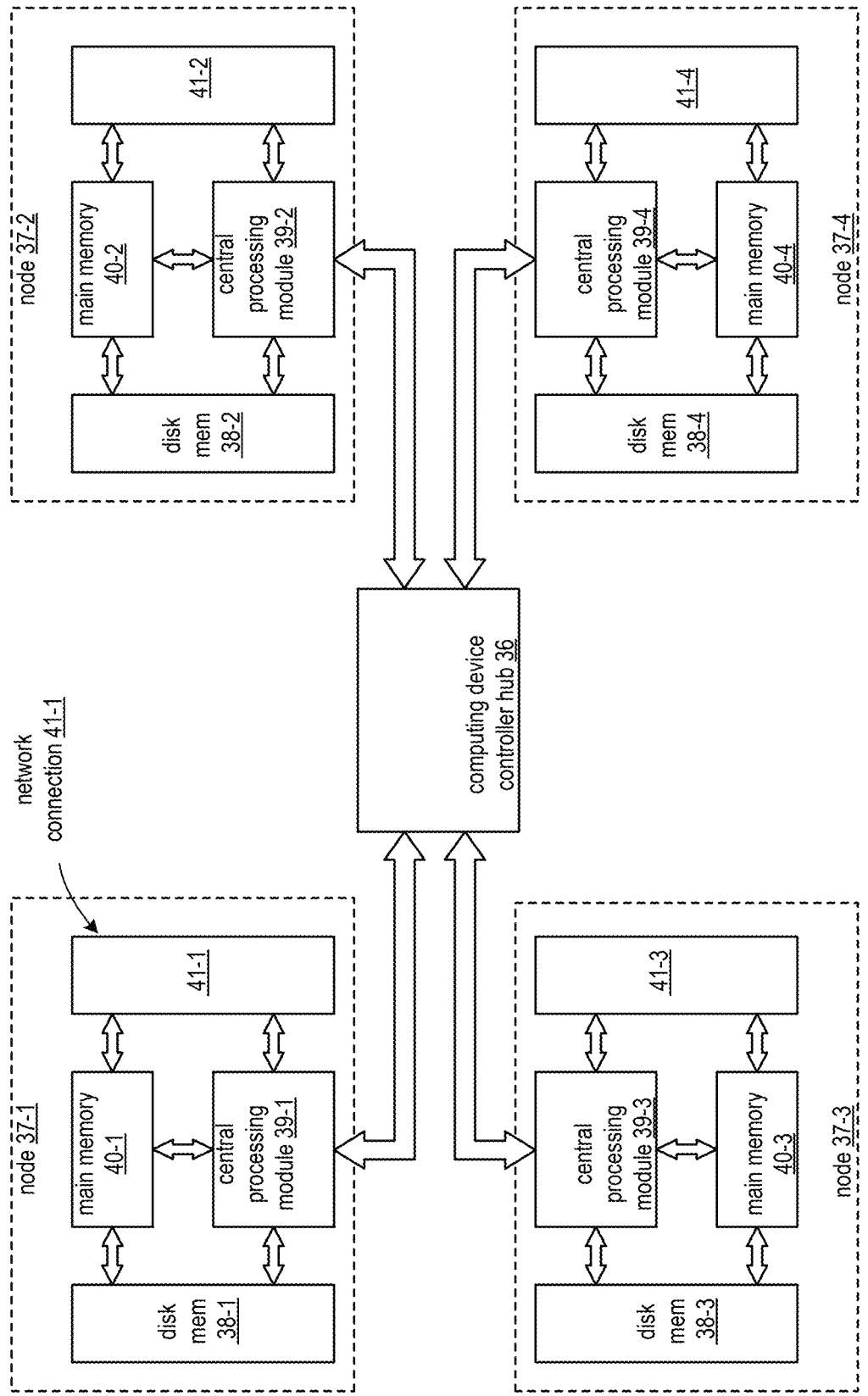
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
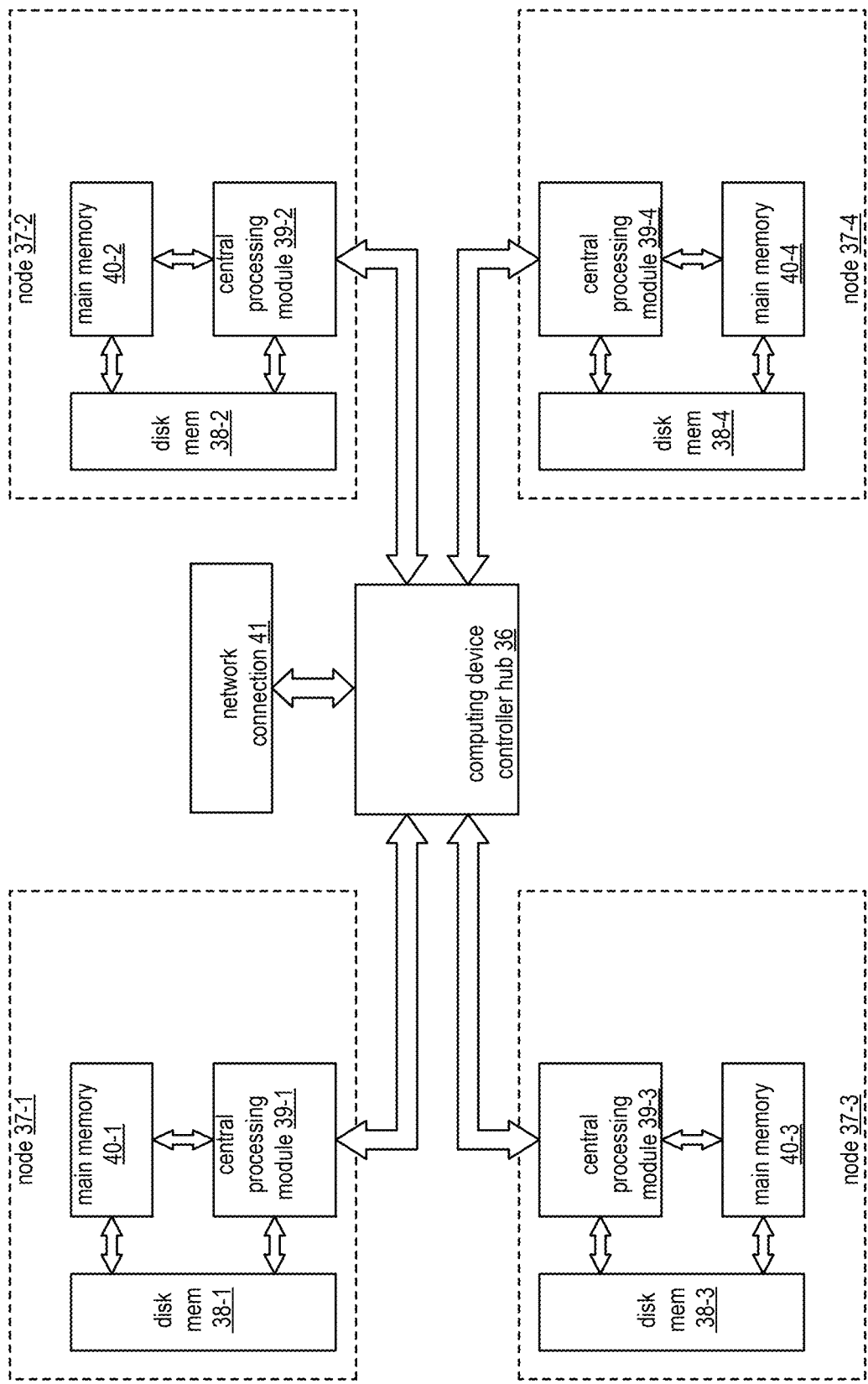
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
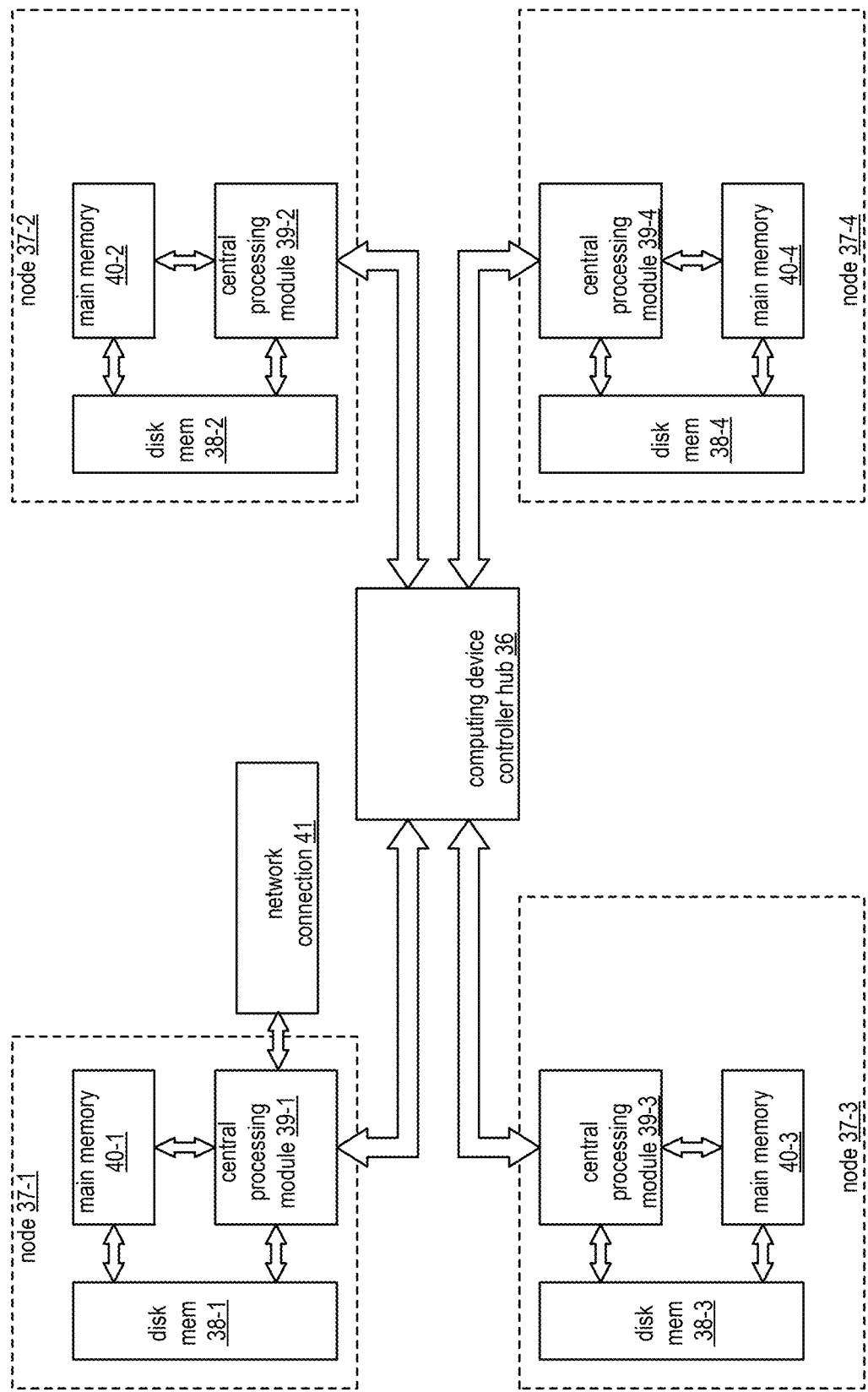
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
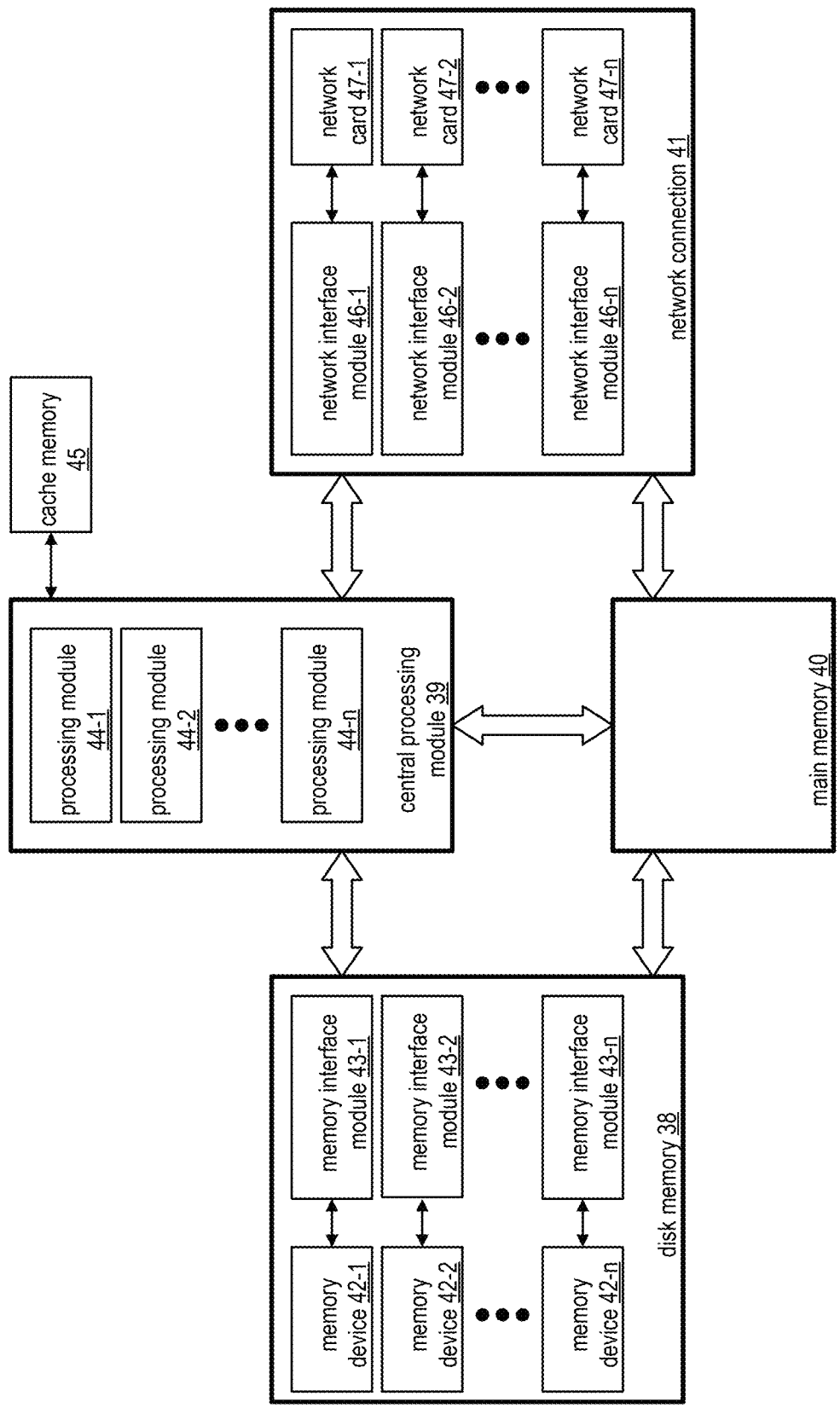
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
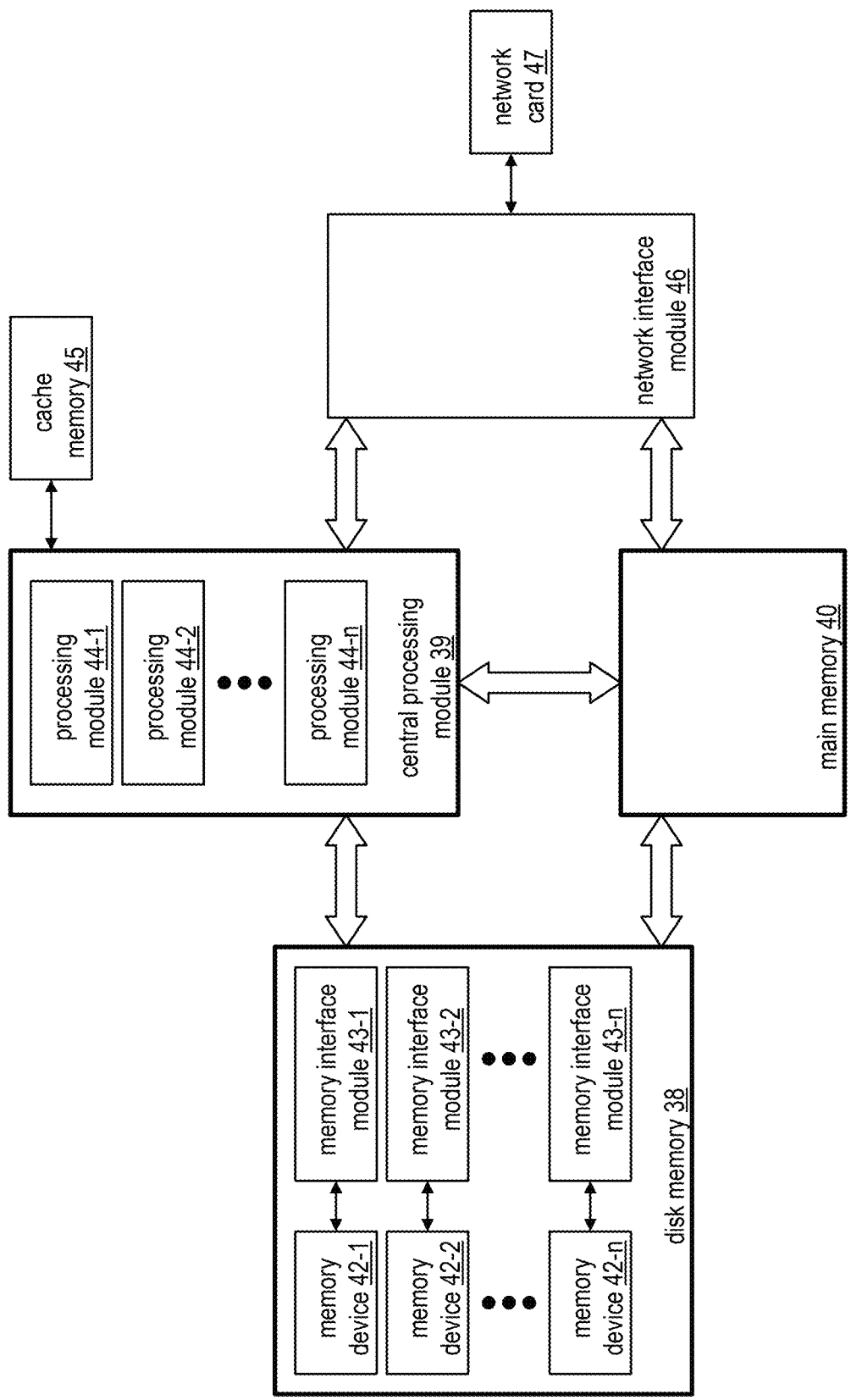
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
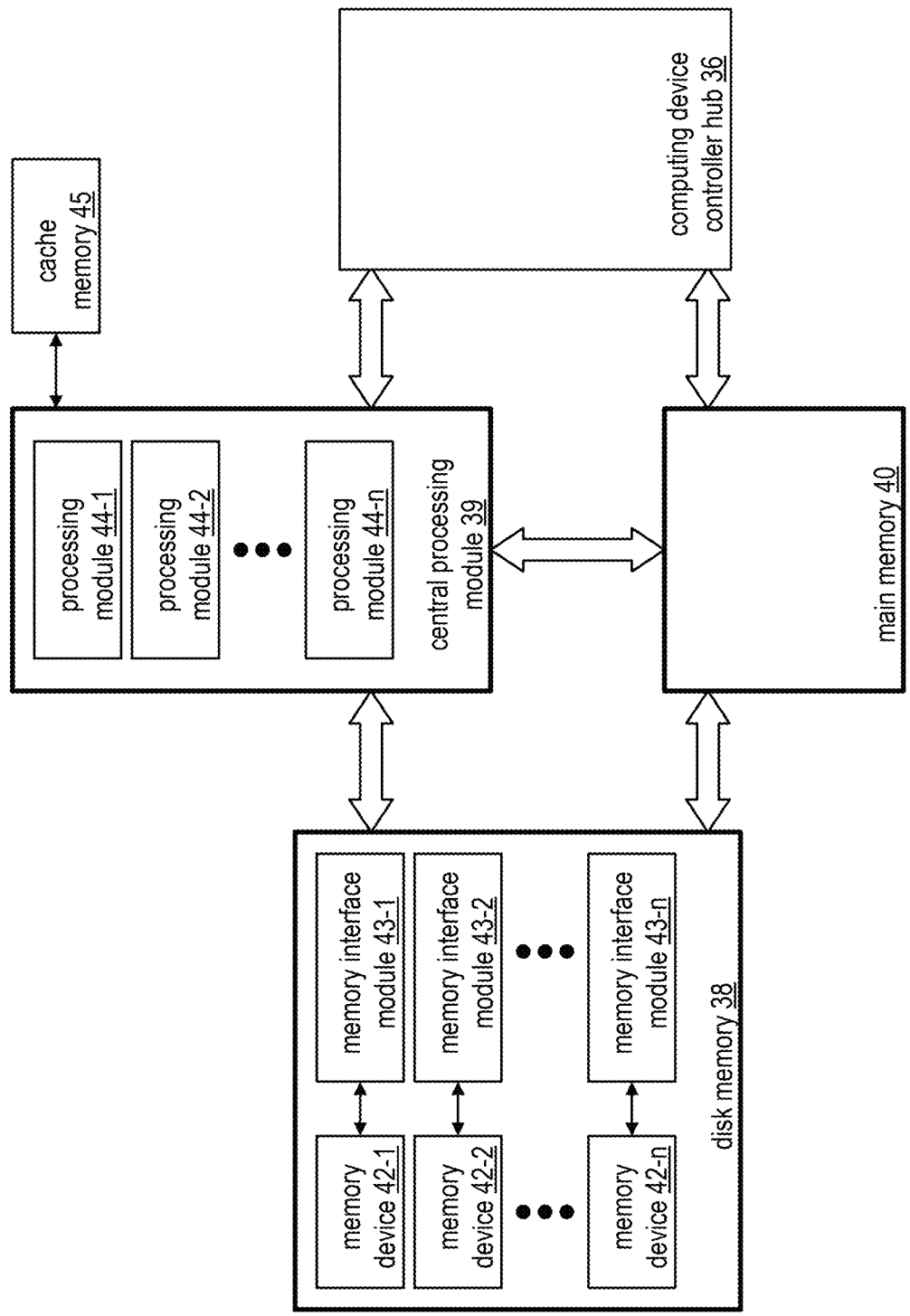
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
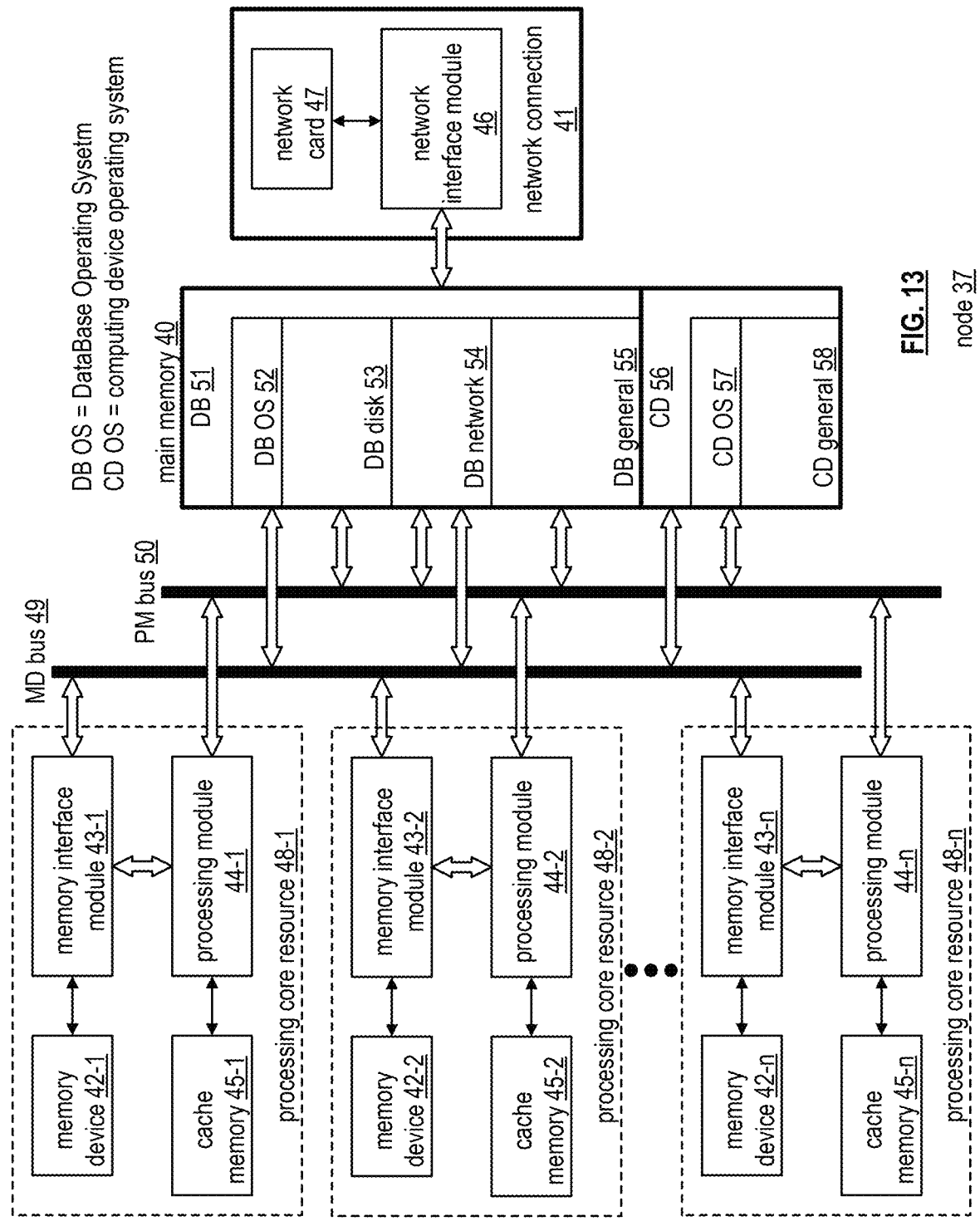
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
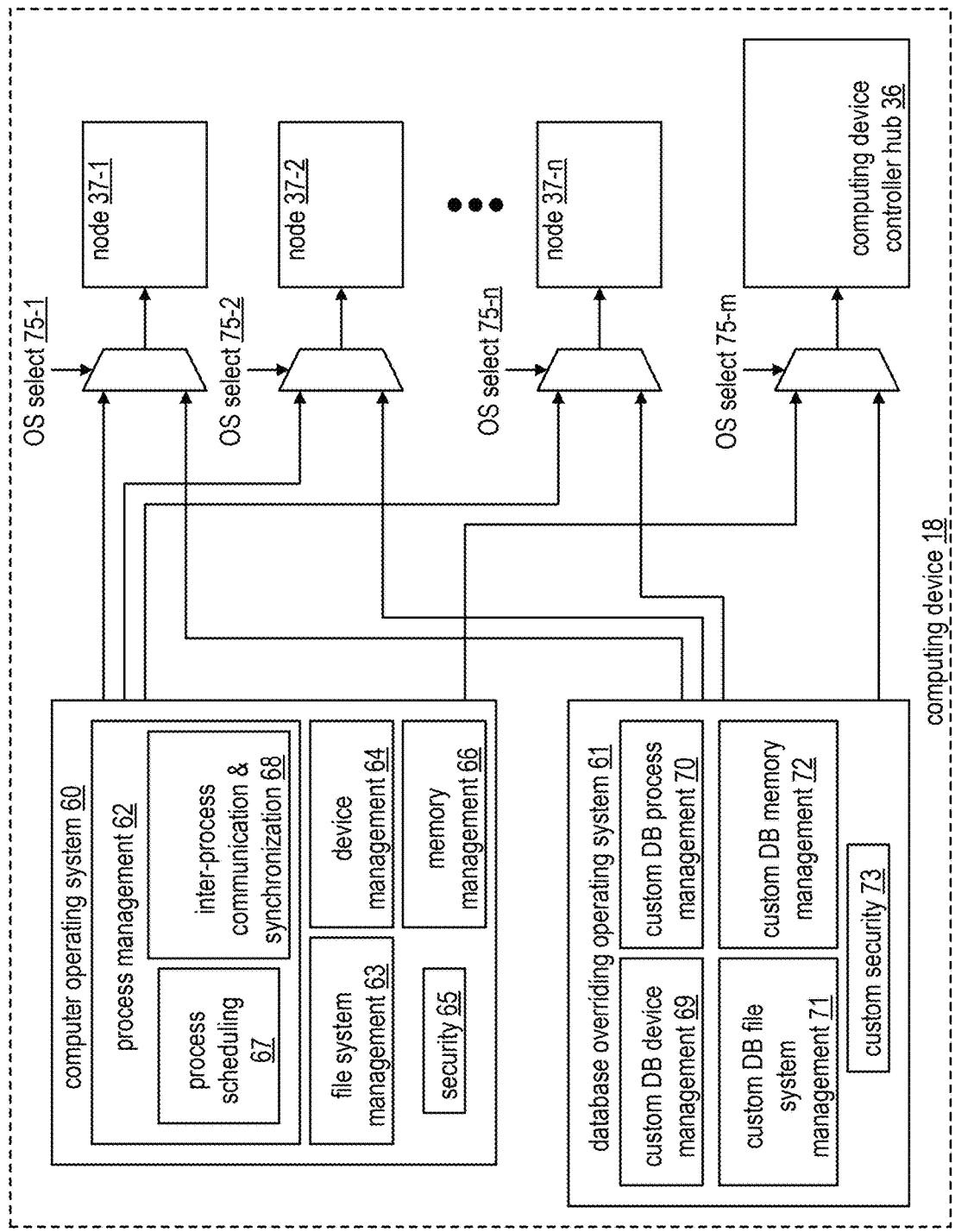
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
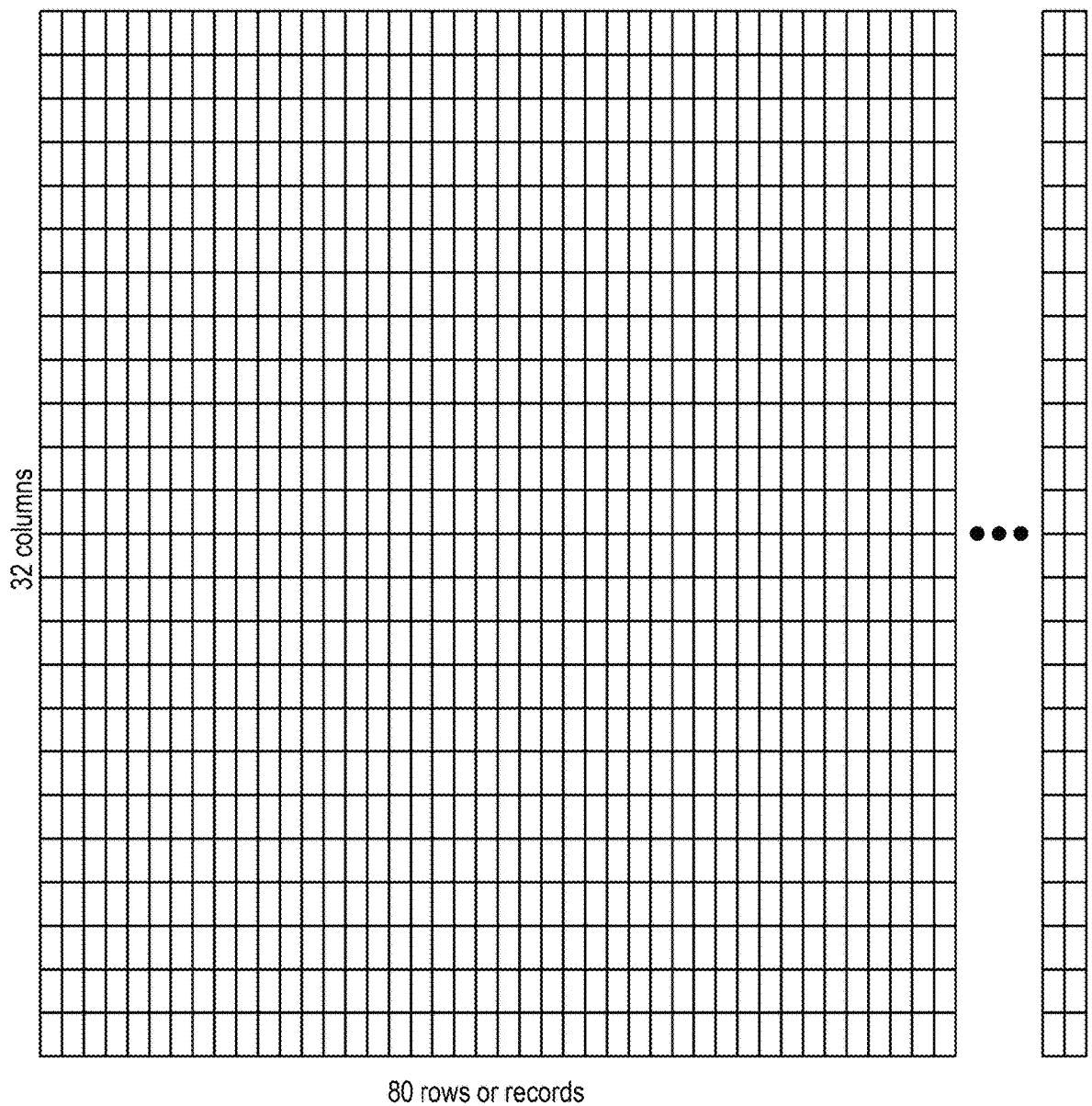

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
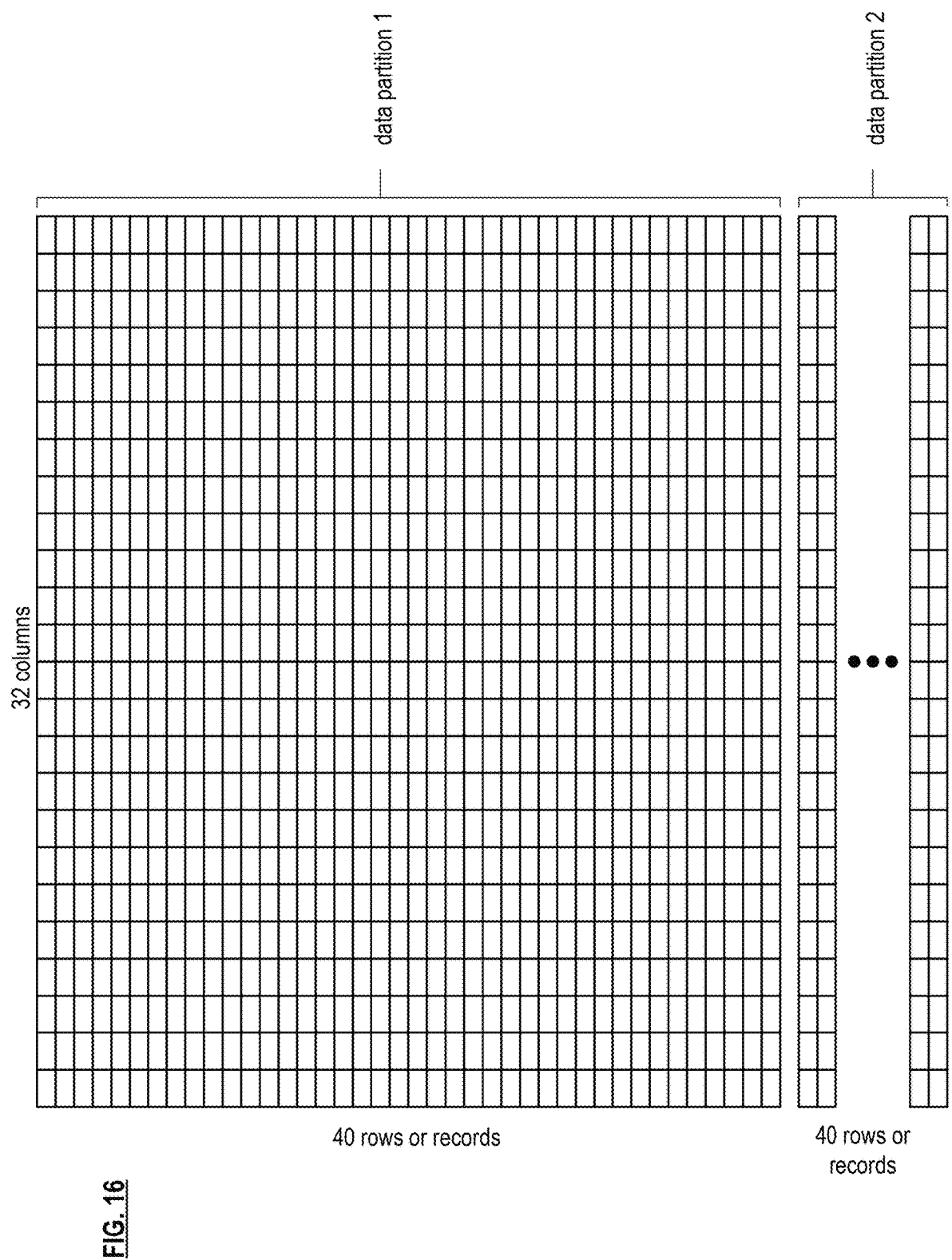

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
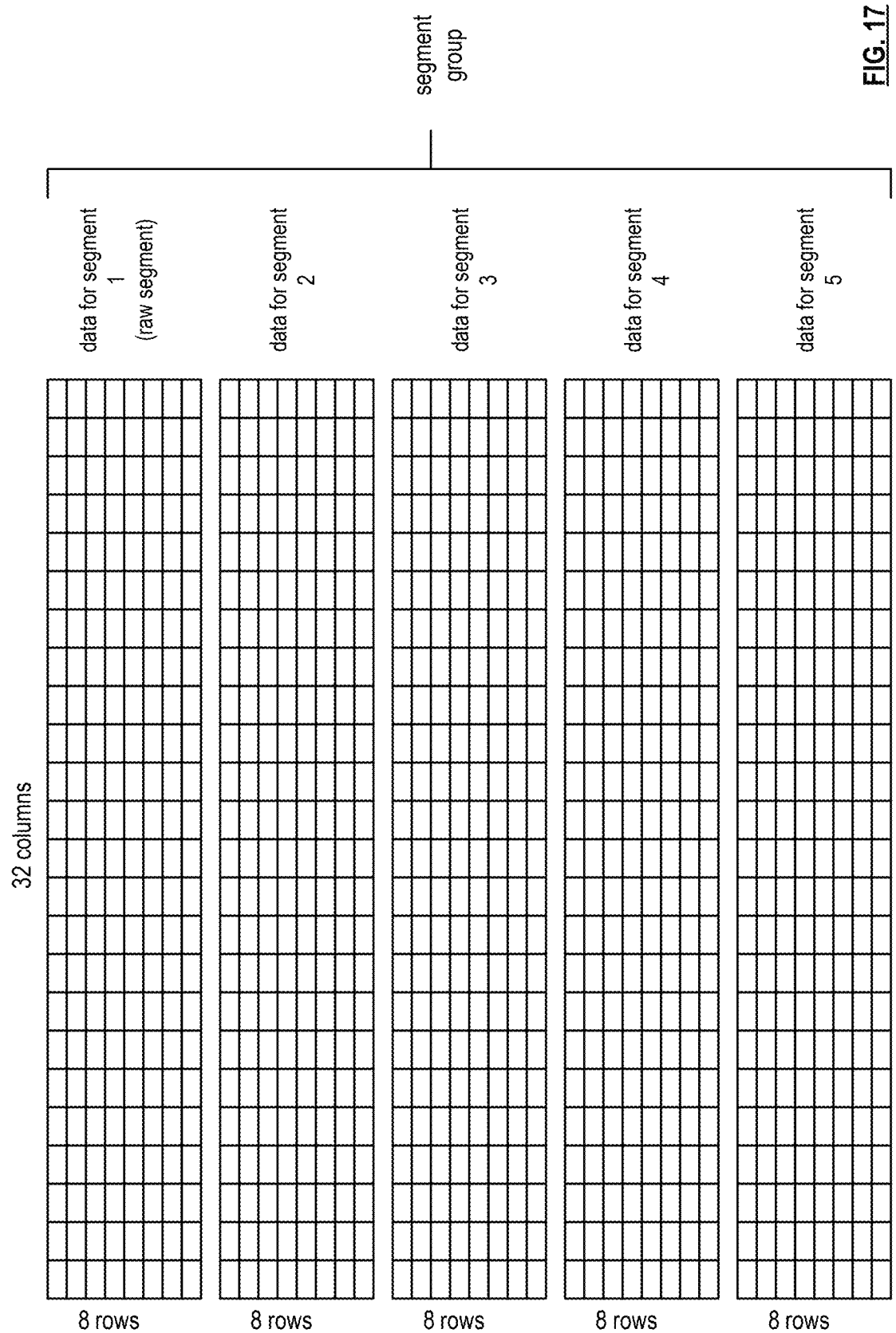

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
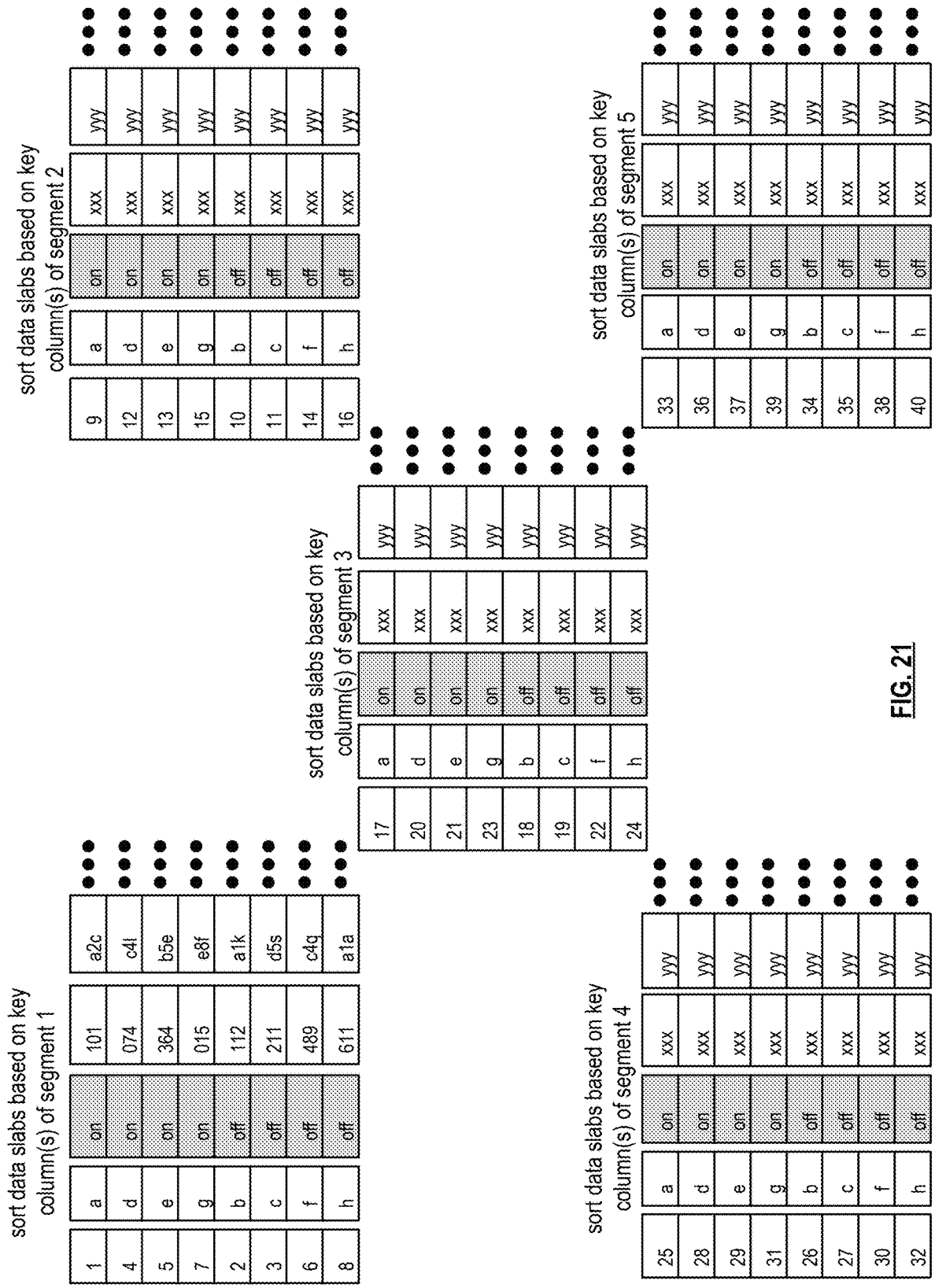

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
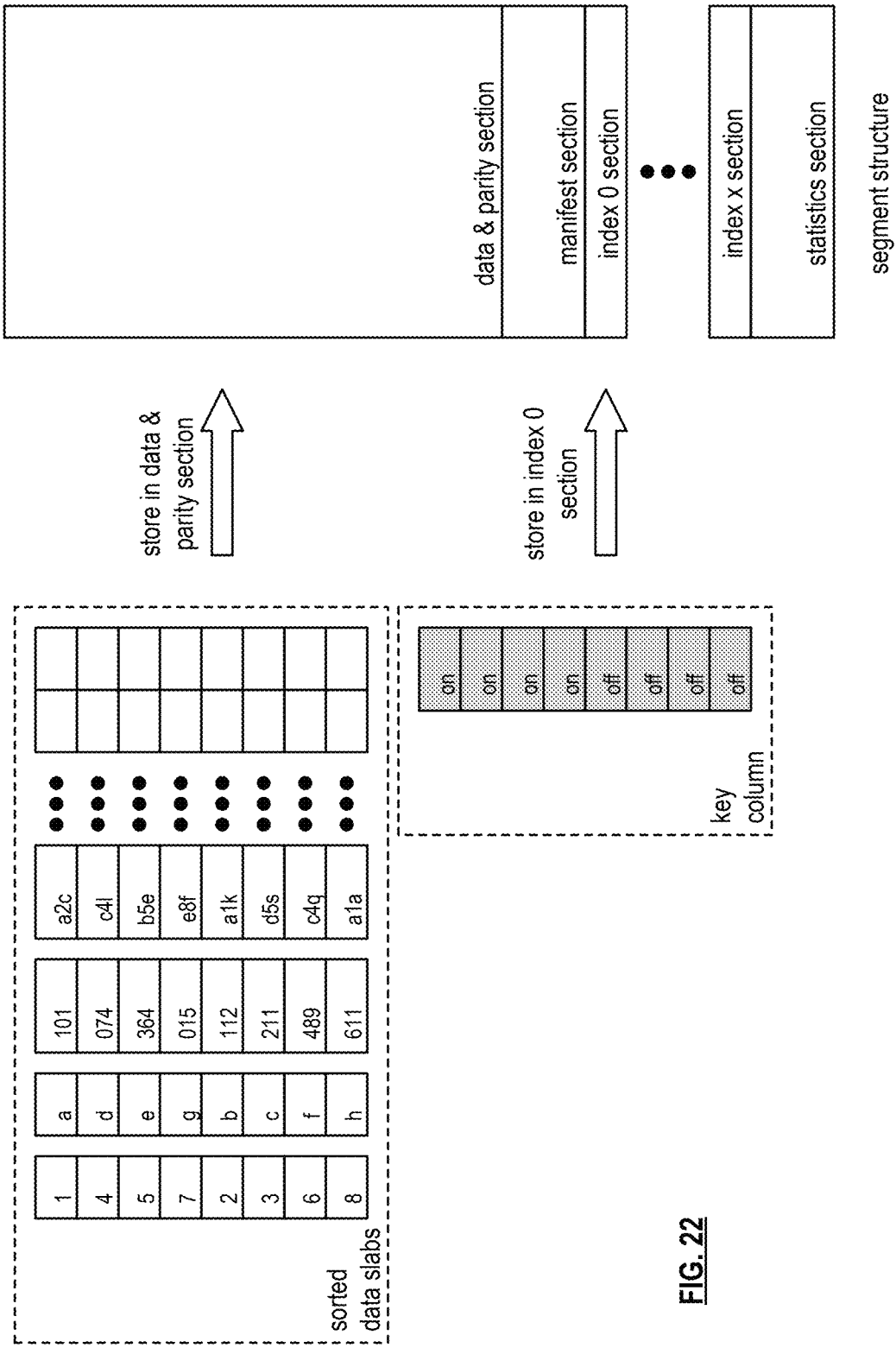

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited to, number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
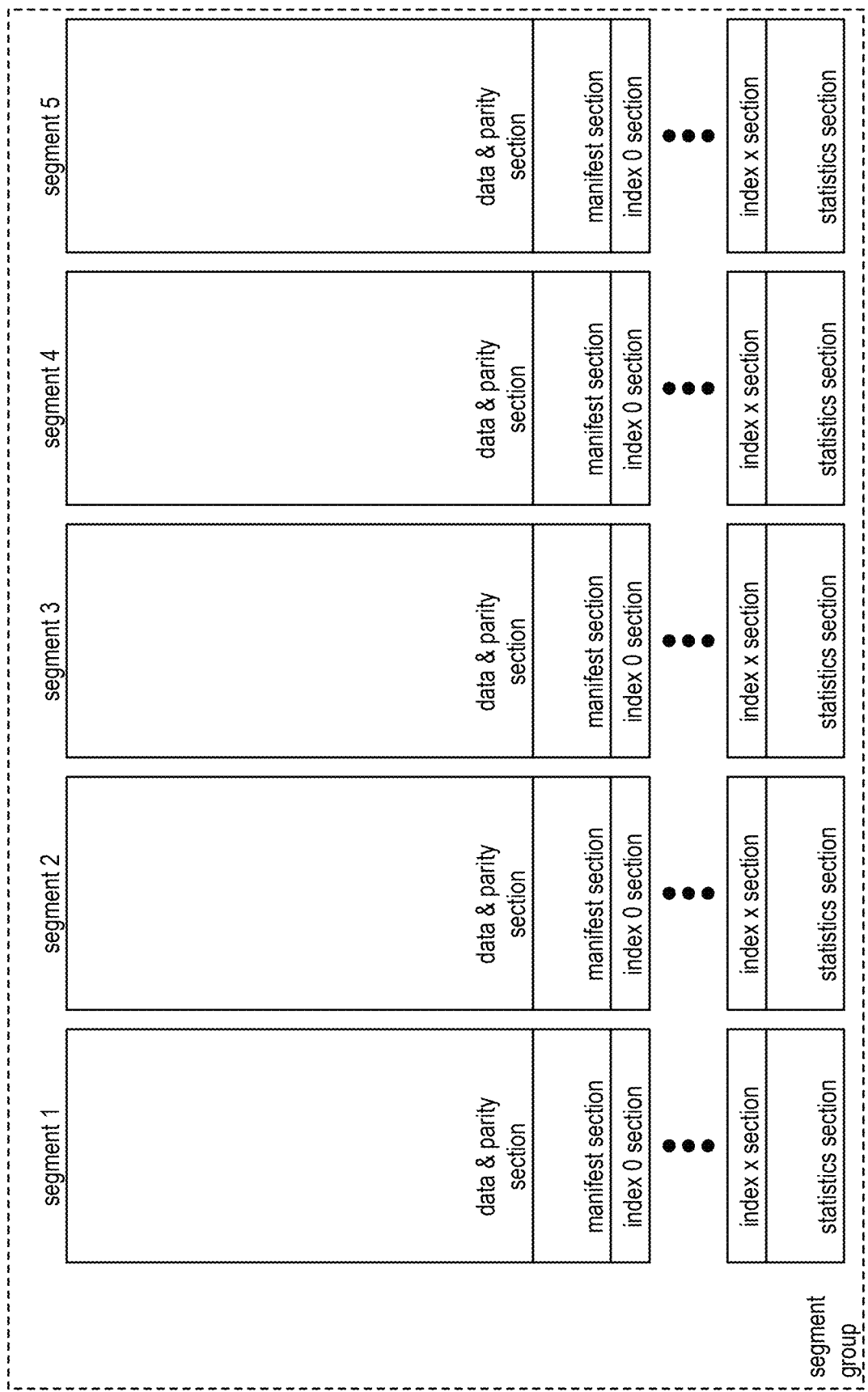

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
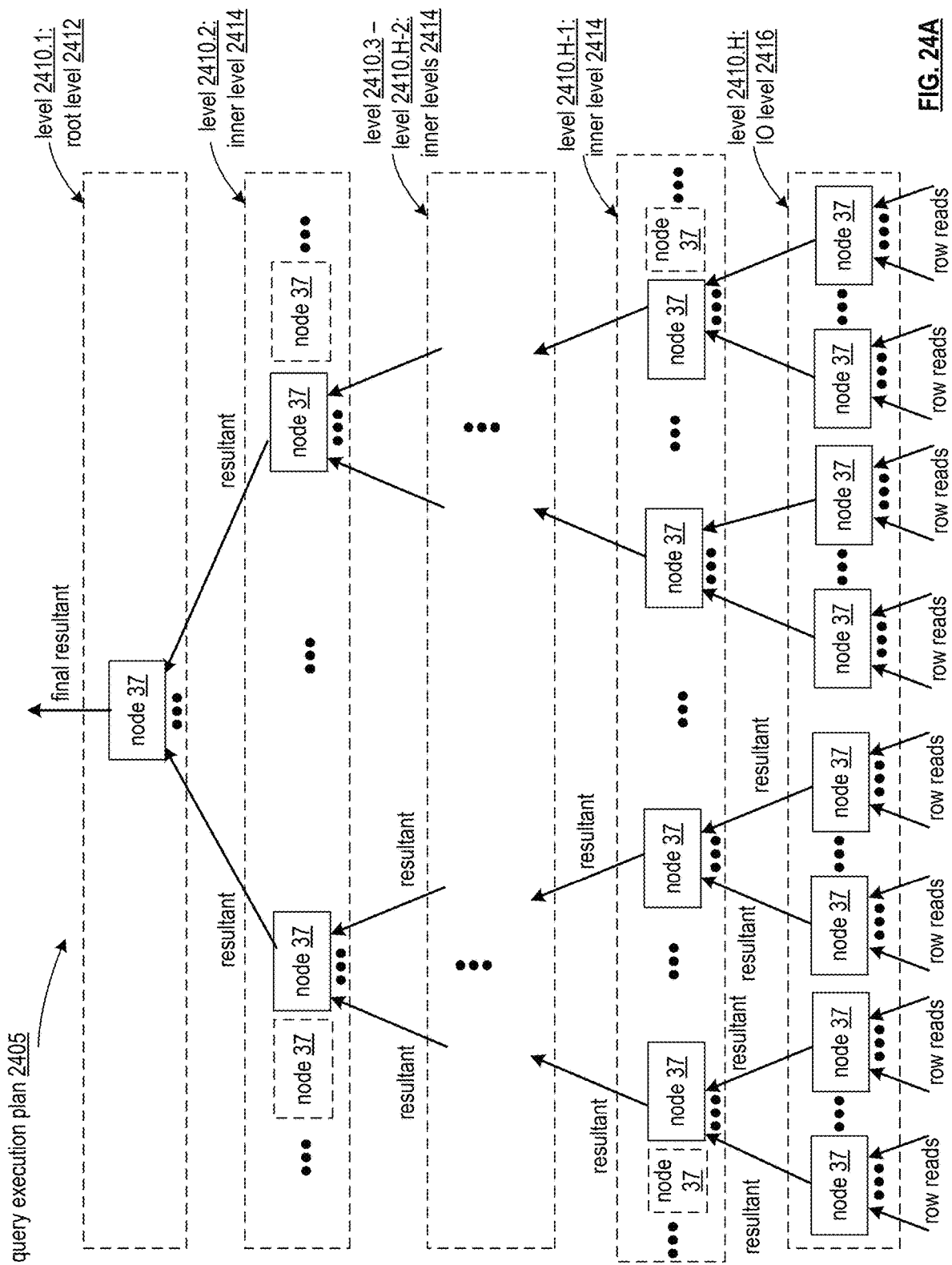
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
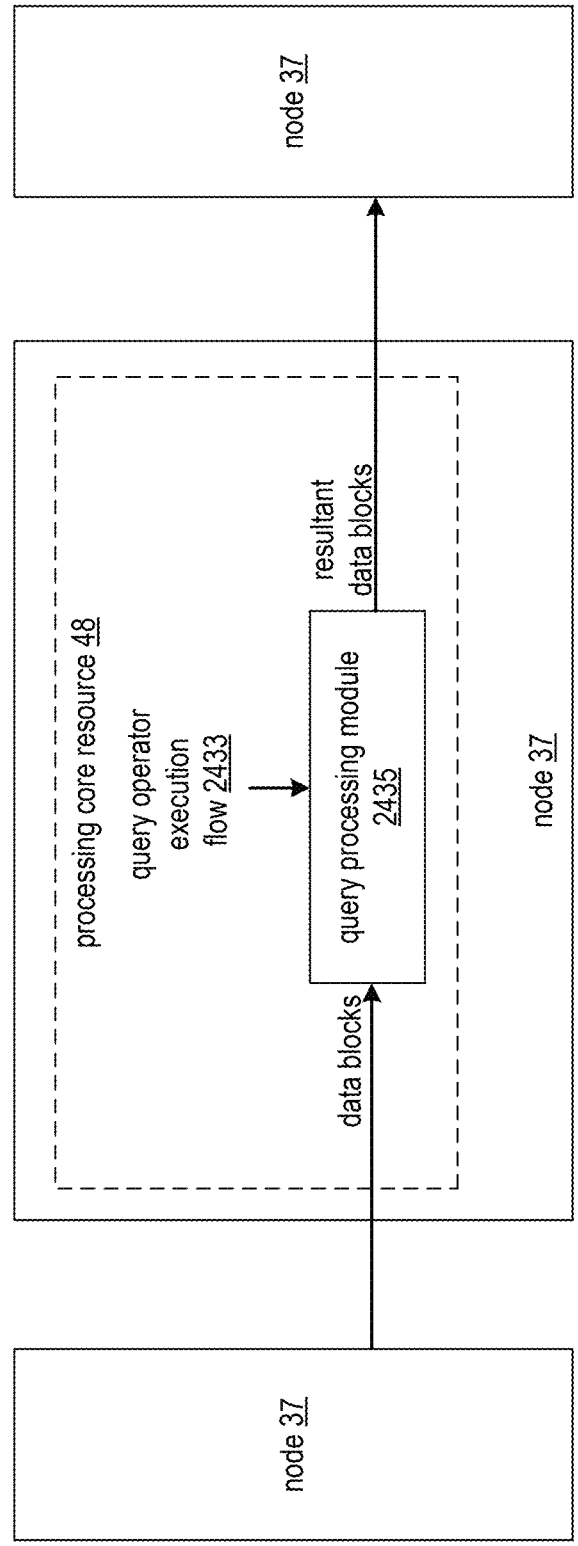
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
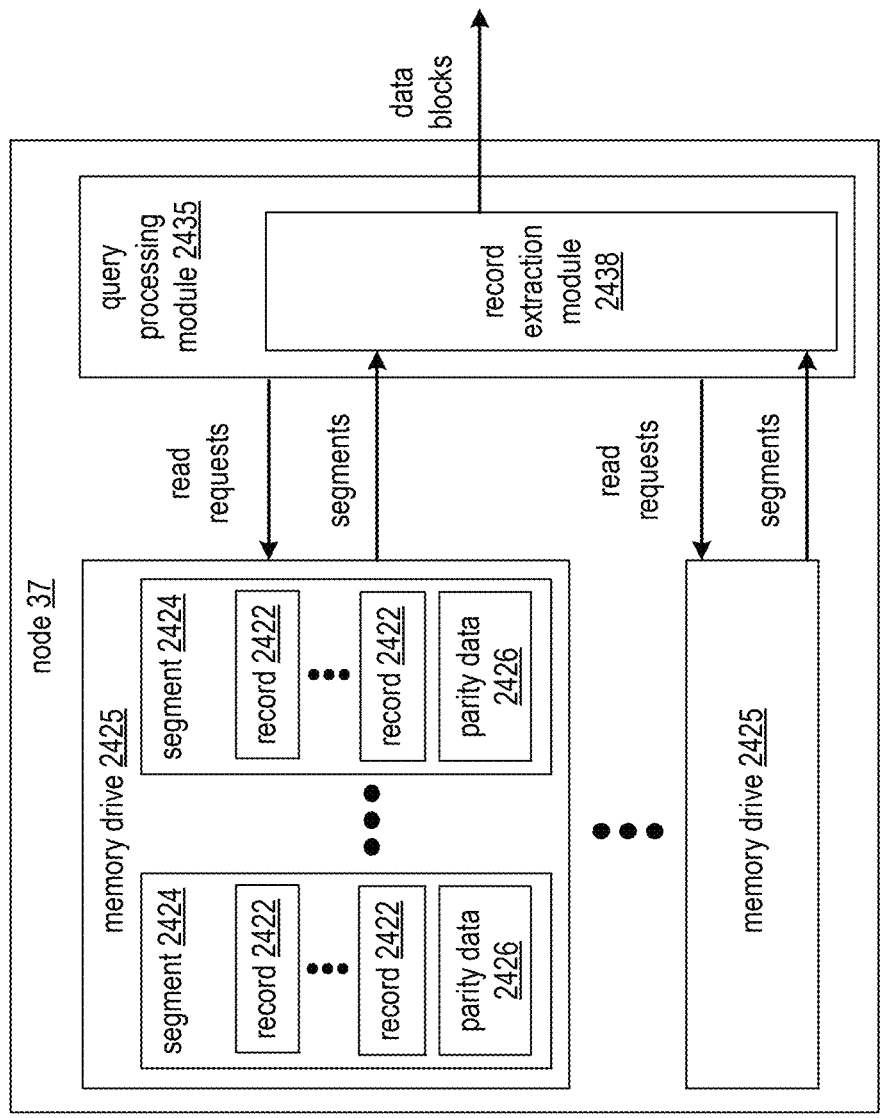

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
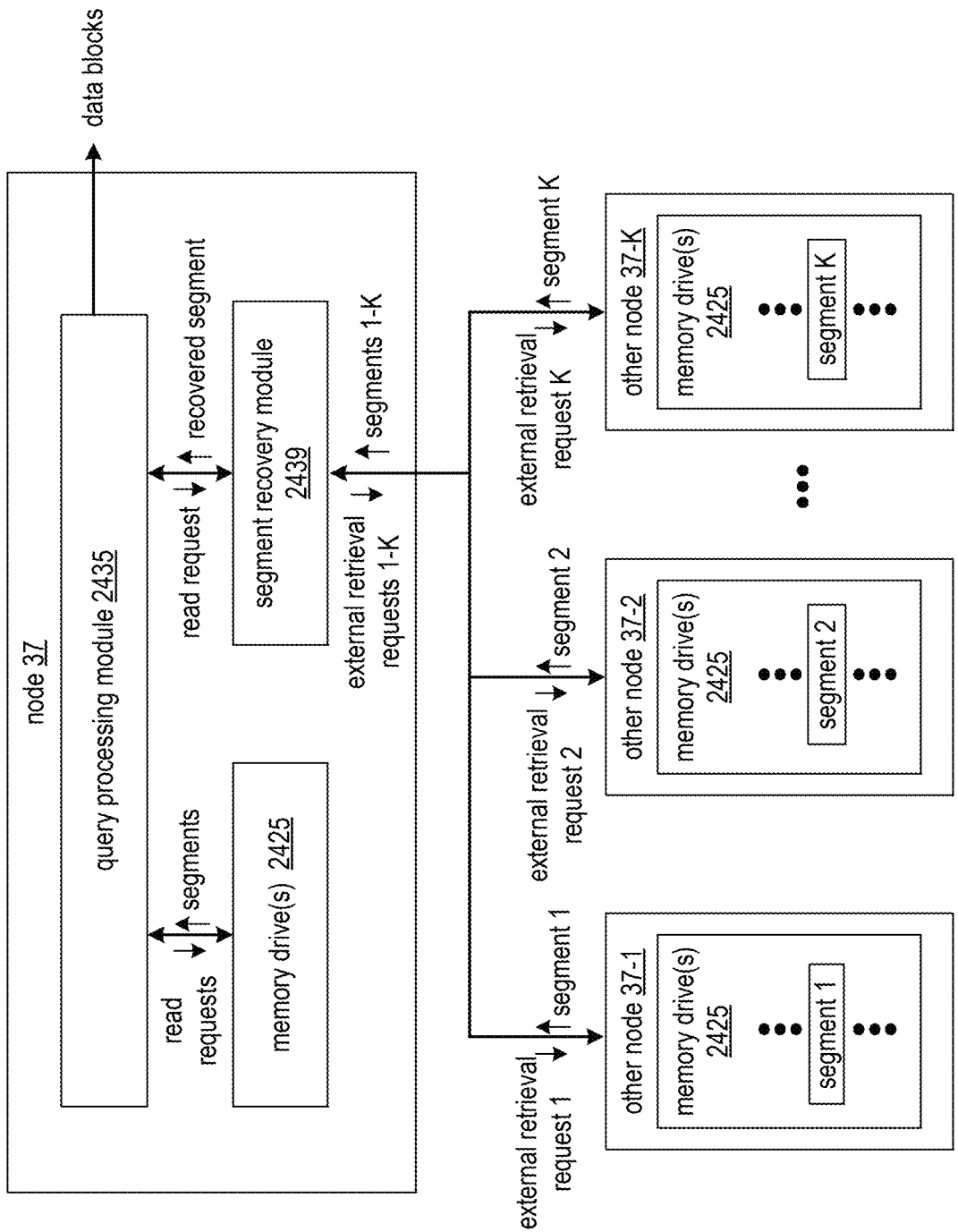

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
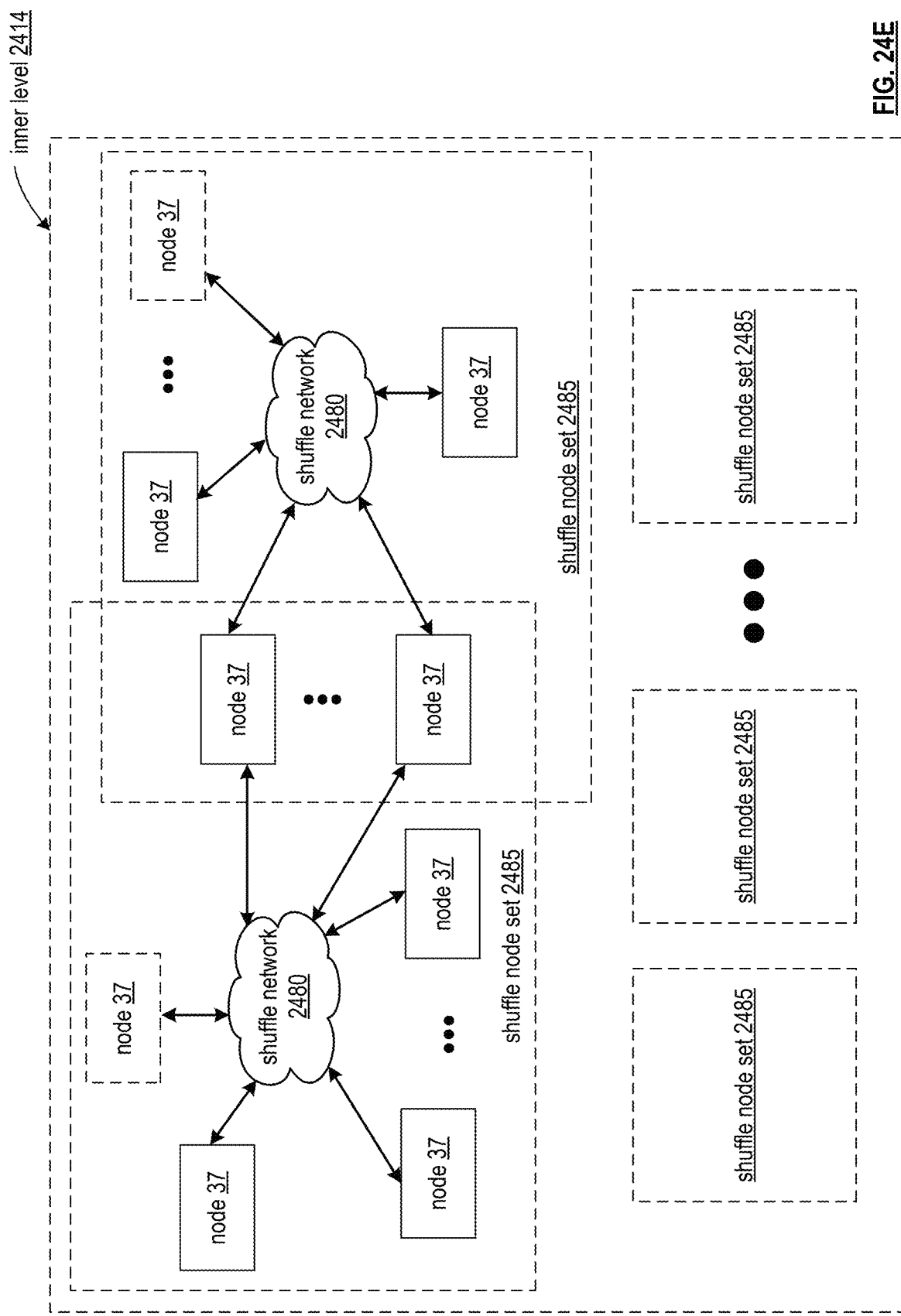
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the same shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
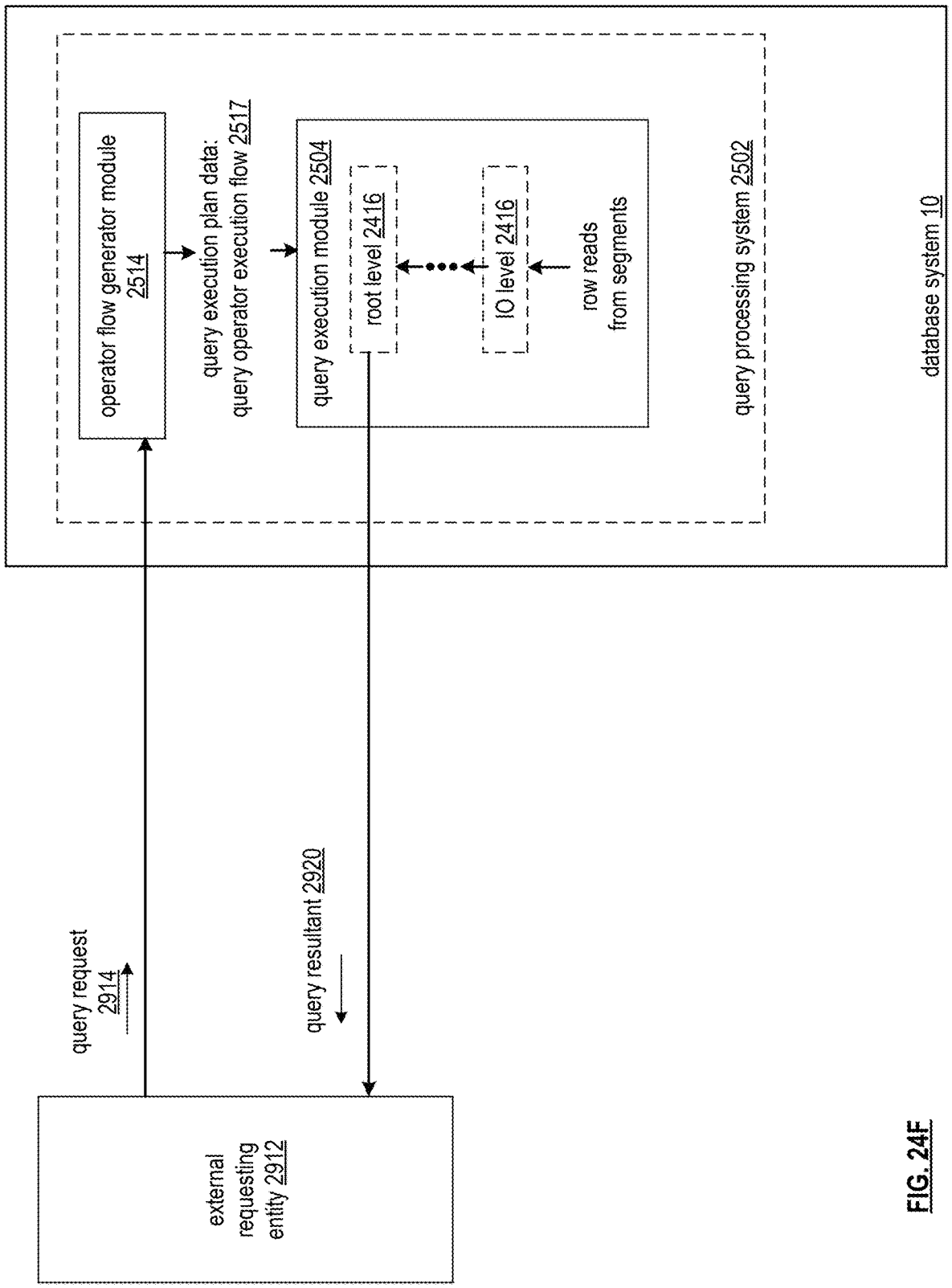
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
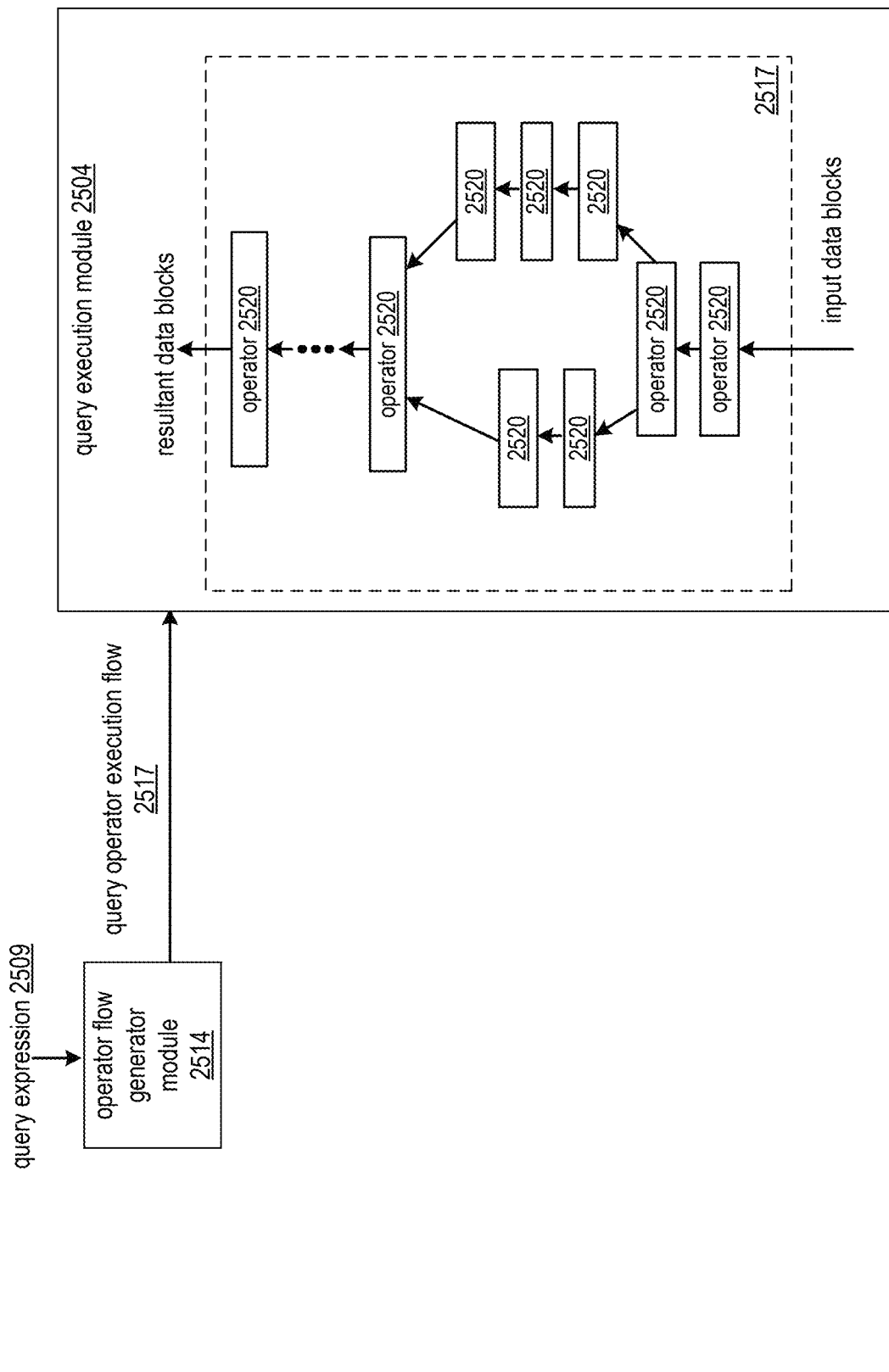
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
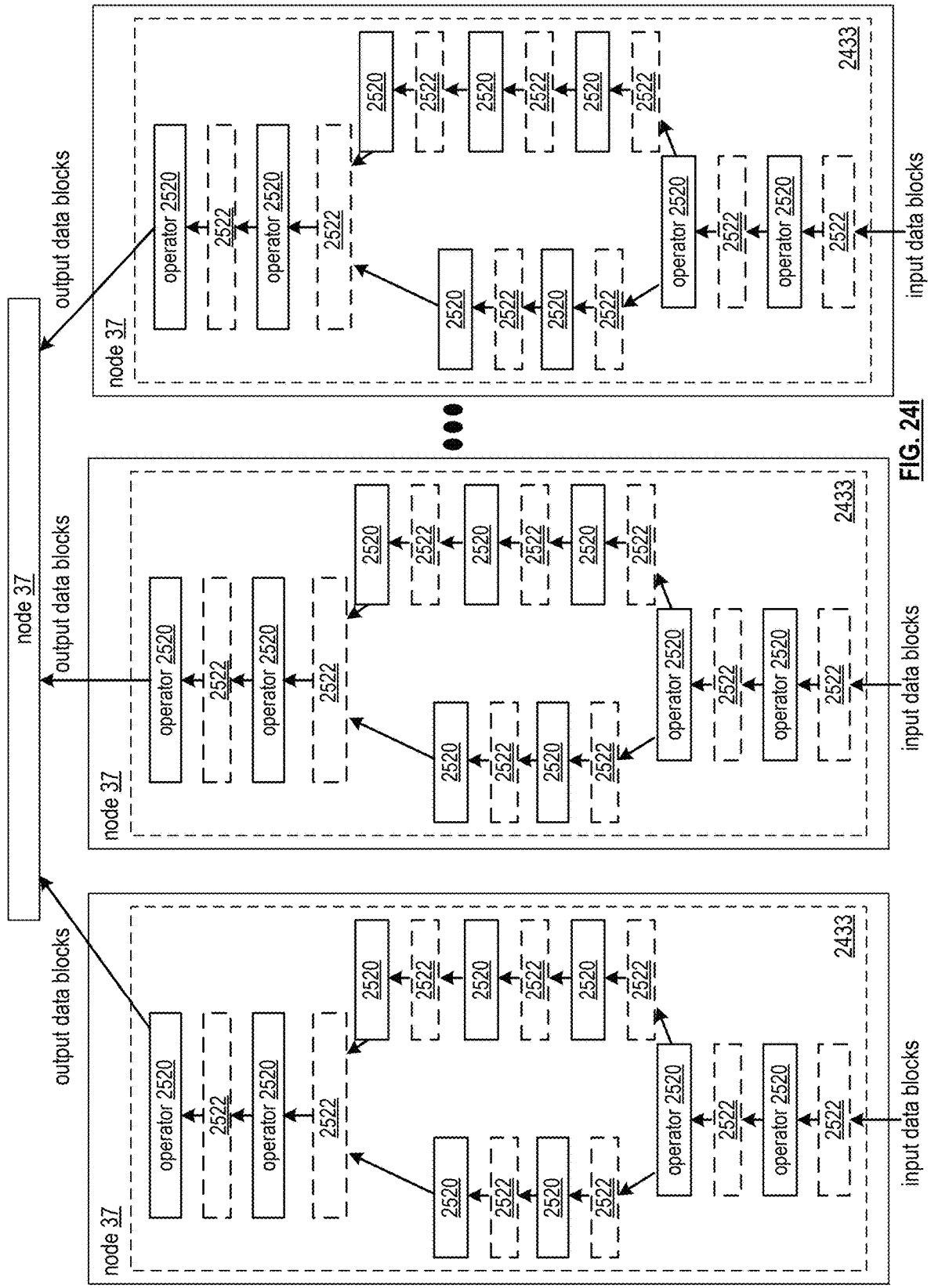
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
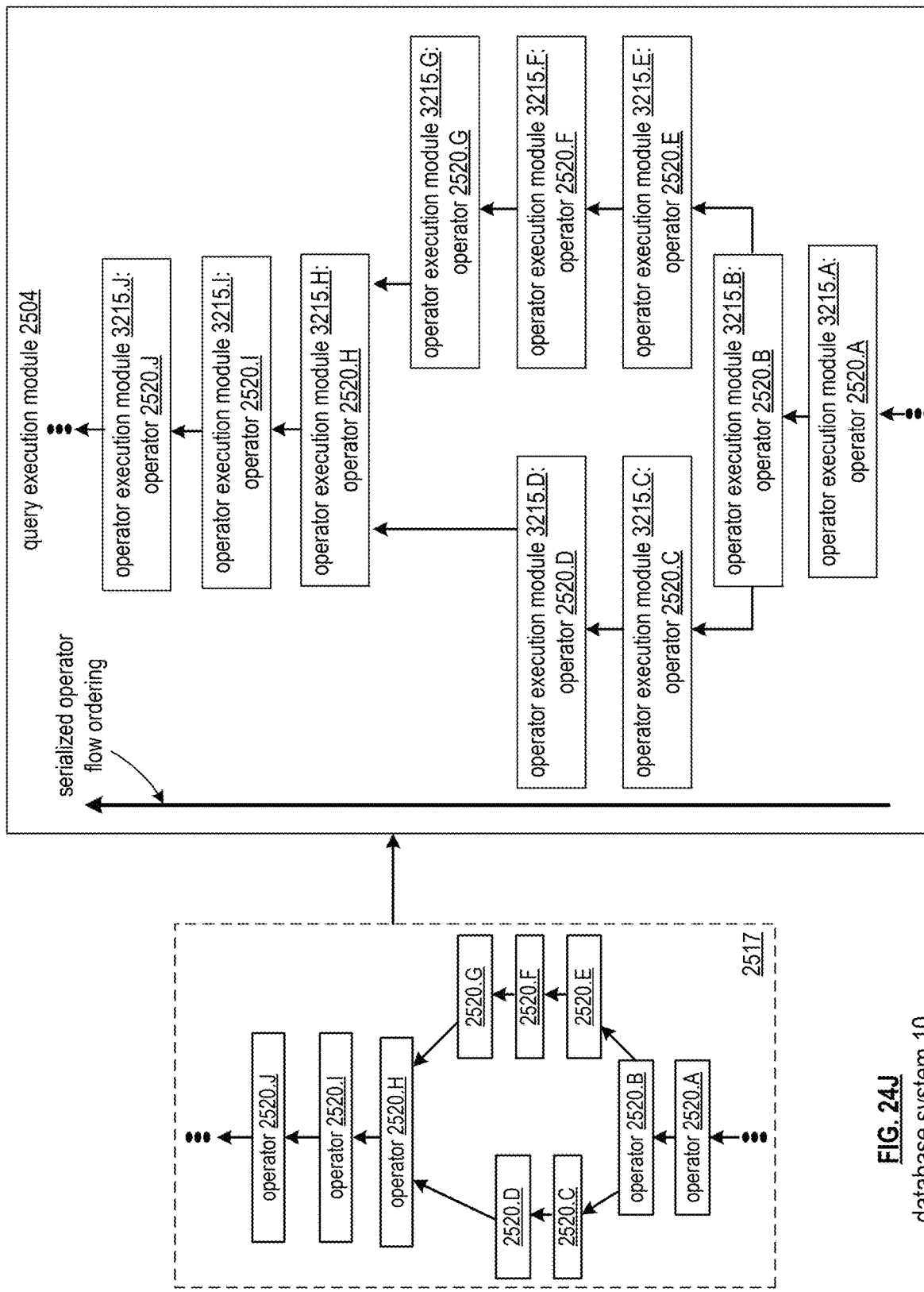
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
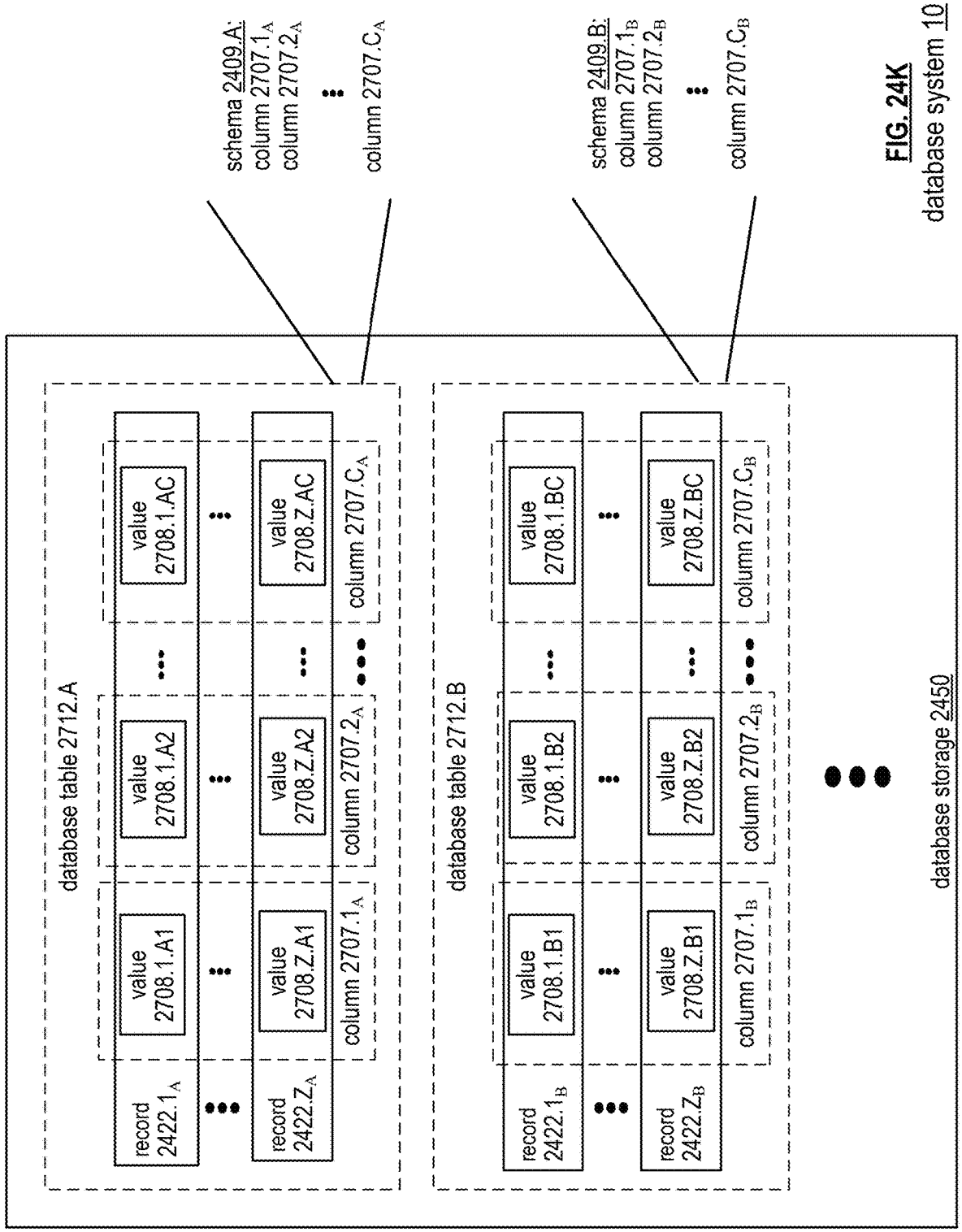
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
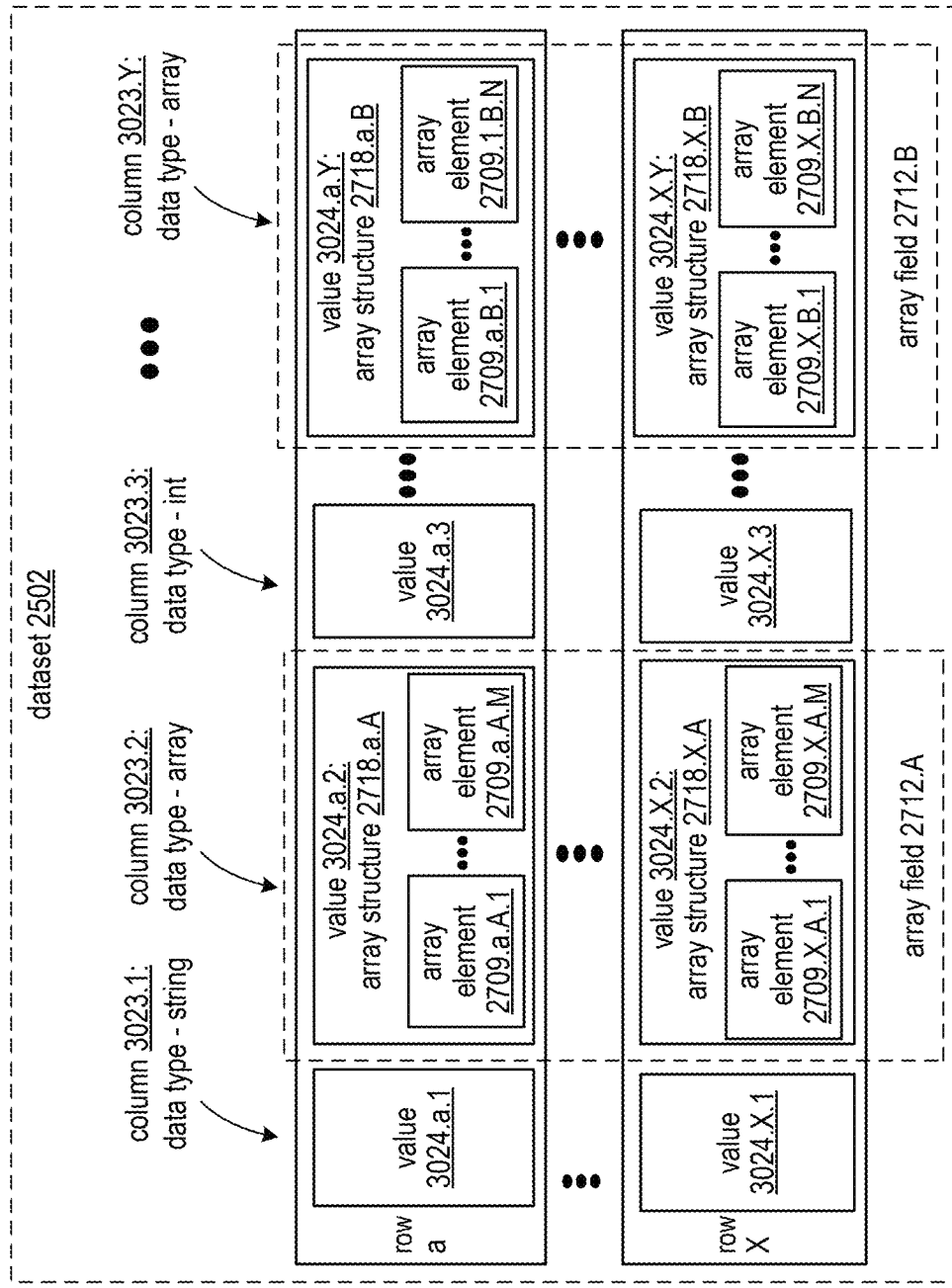
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
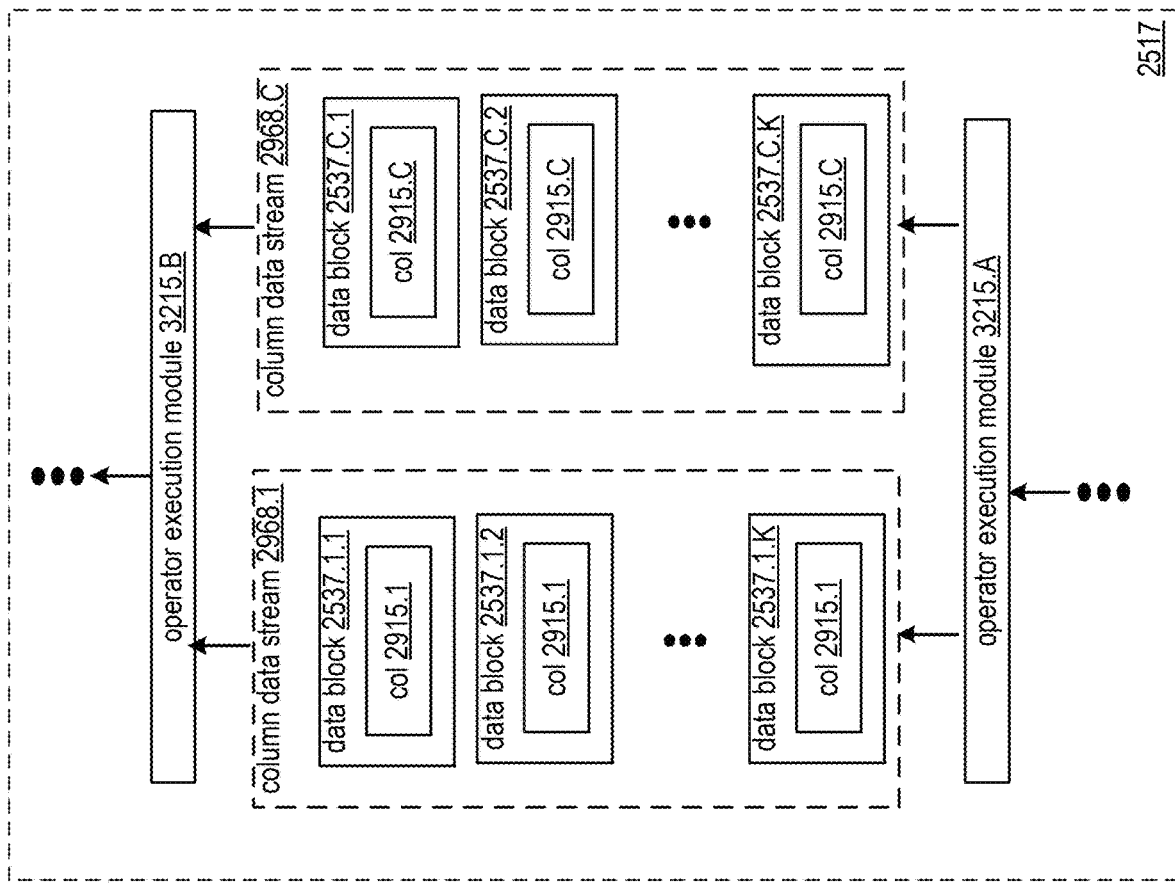
FIG. 24M is a schematic block diagram of a query execution module that implements a plurality of column data streams in accordance with various embodiments.
Figure 24N:
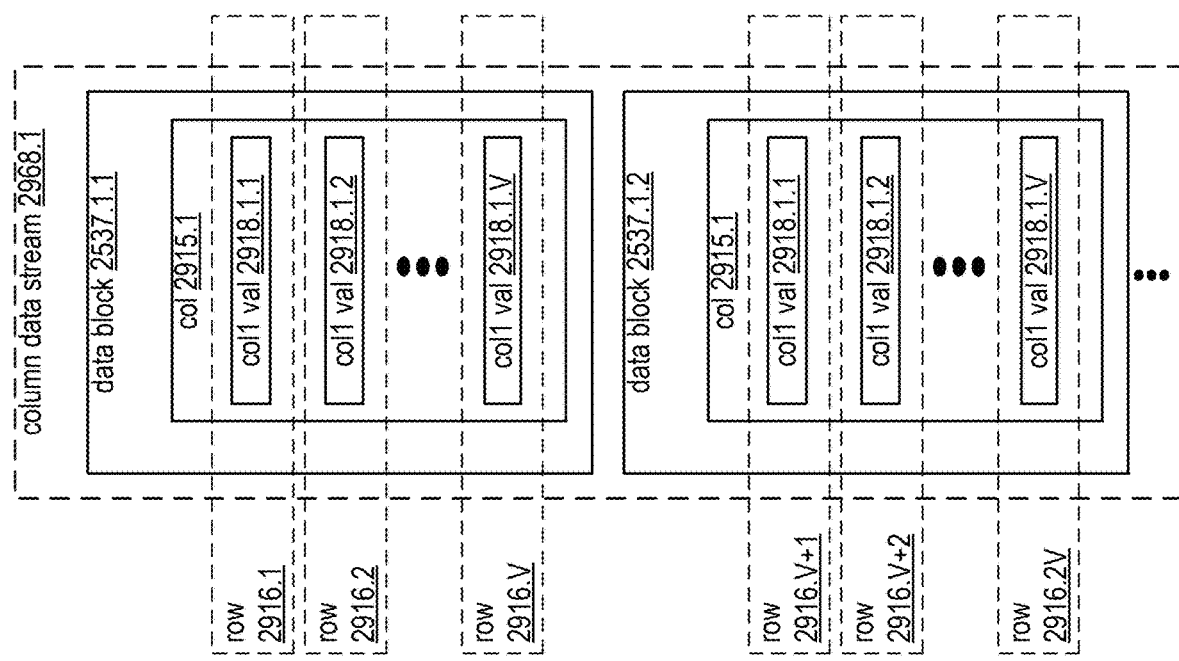
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24O:
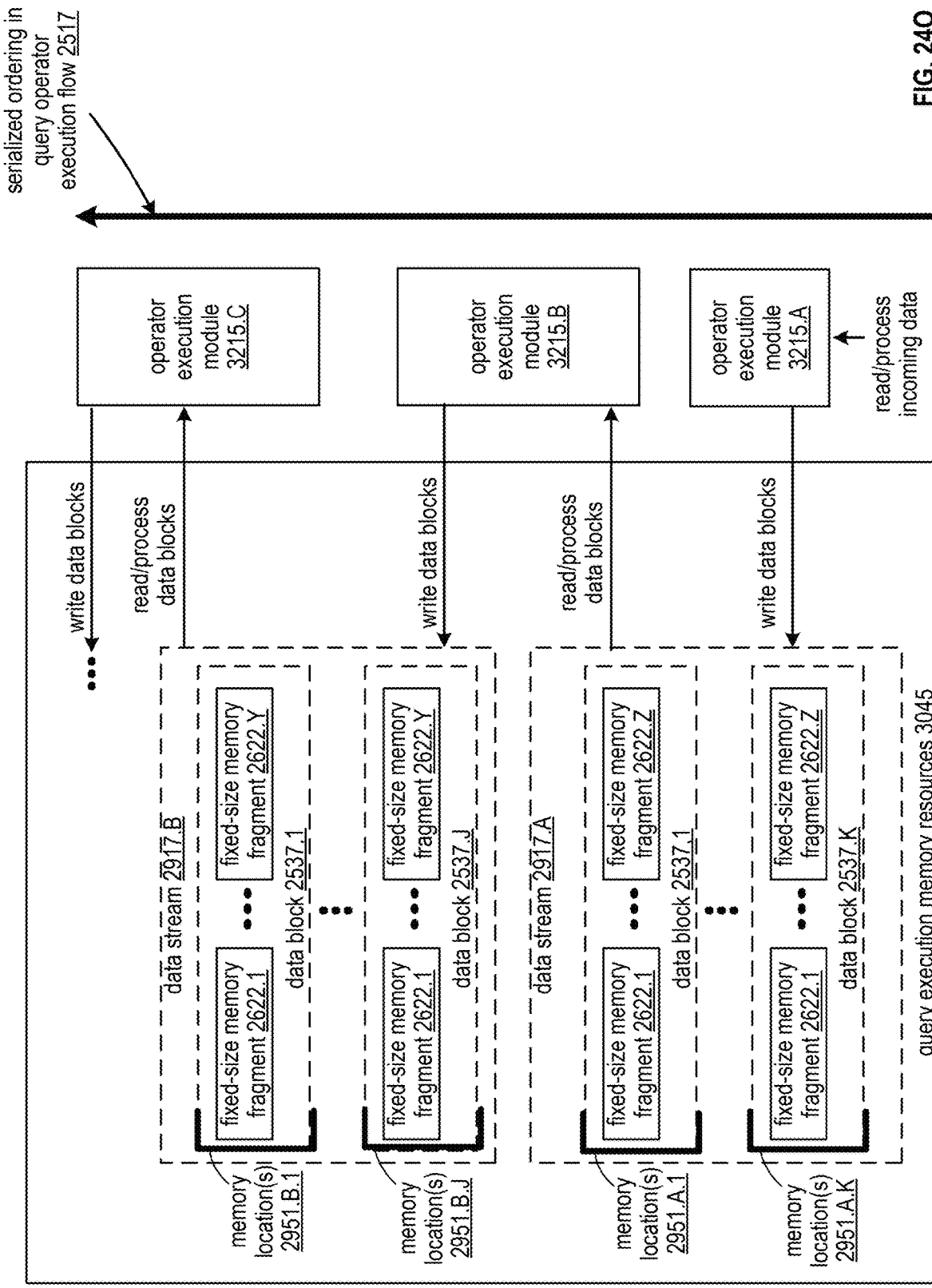
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622. Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24P:
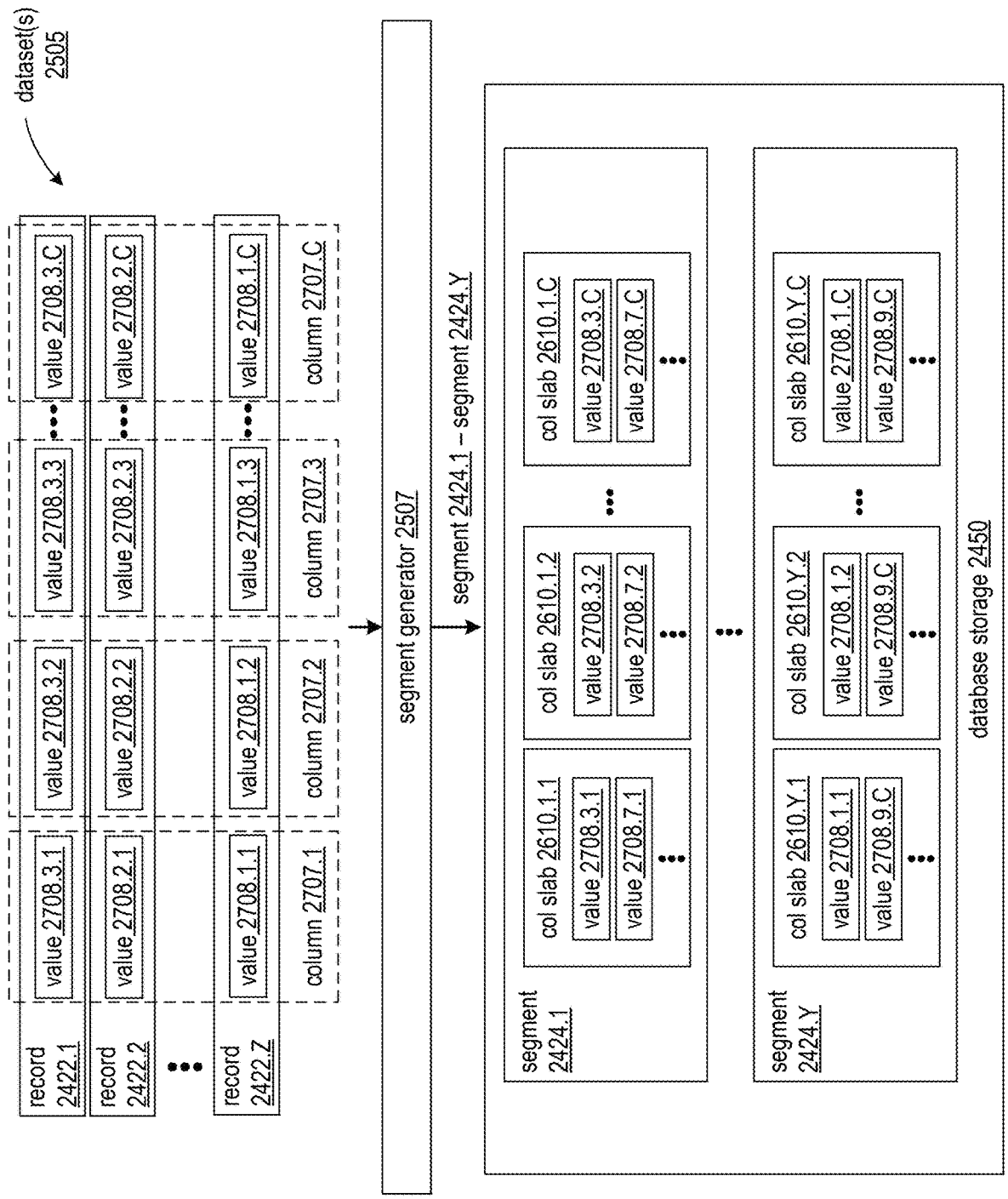
FIG. 24P is a schematic block diagram of a database system that implements a segment generator that generates segments from a plurality of records in accordance with various embodiments.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

Figure 24Q:
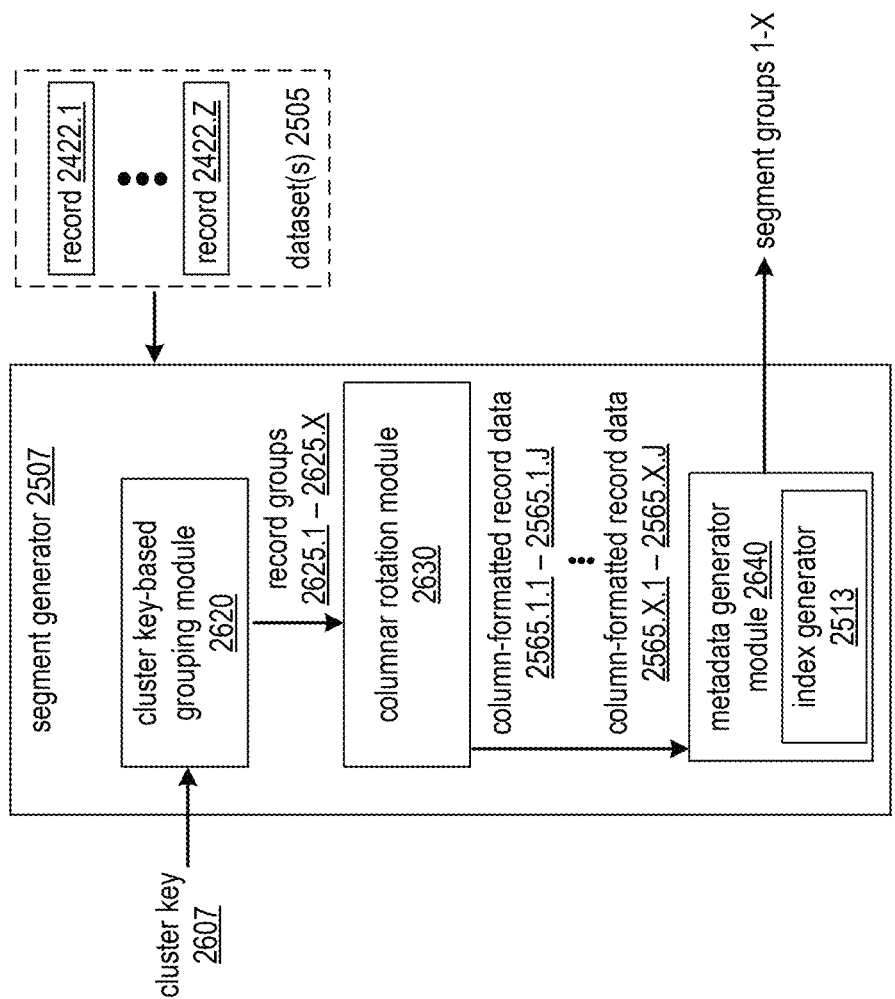
FIG. 24Q is a schematic block diagram of a segment generator that implements a cluster key-based grouping module, a columnar rotation module, and a metadata generator module in accordance with various embodiments.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility patent application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility patent application for all purposes; and/or U.S. Utility application Ser. No. 16/985,930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility patent application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
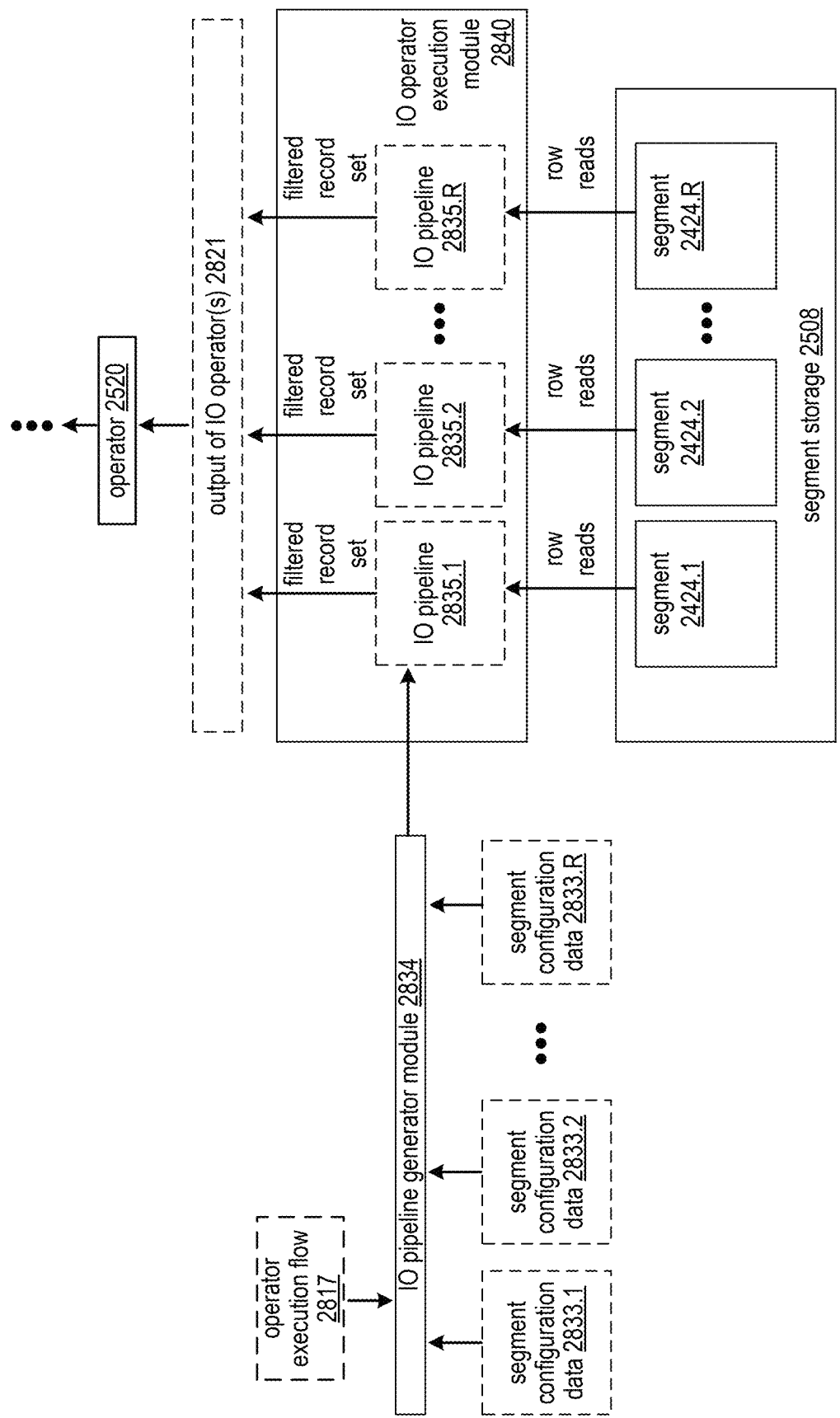
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
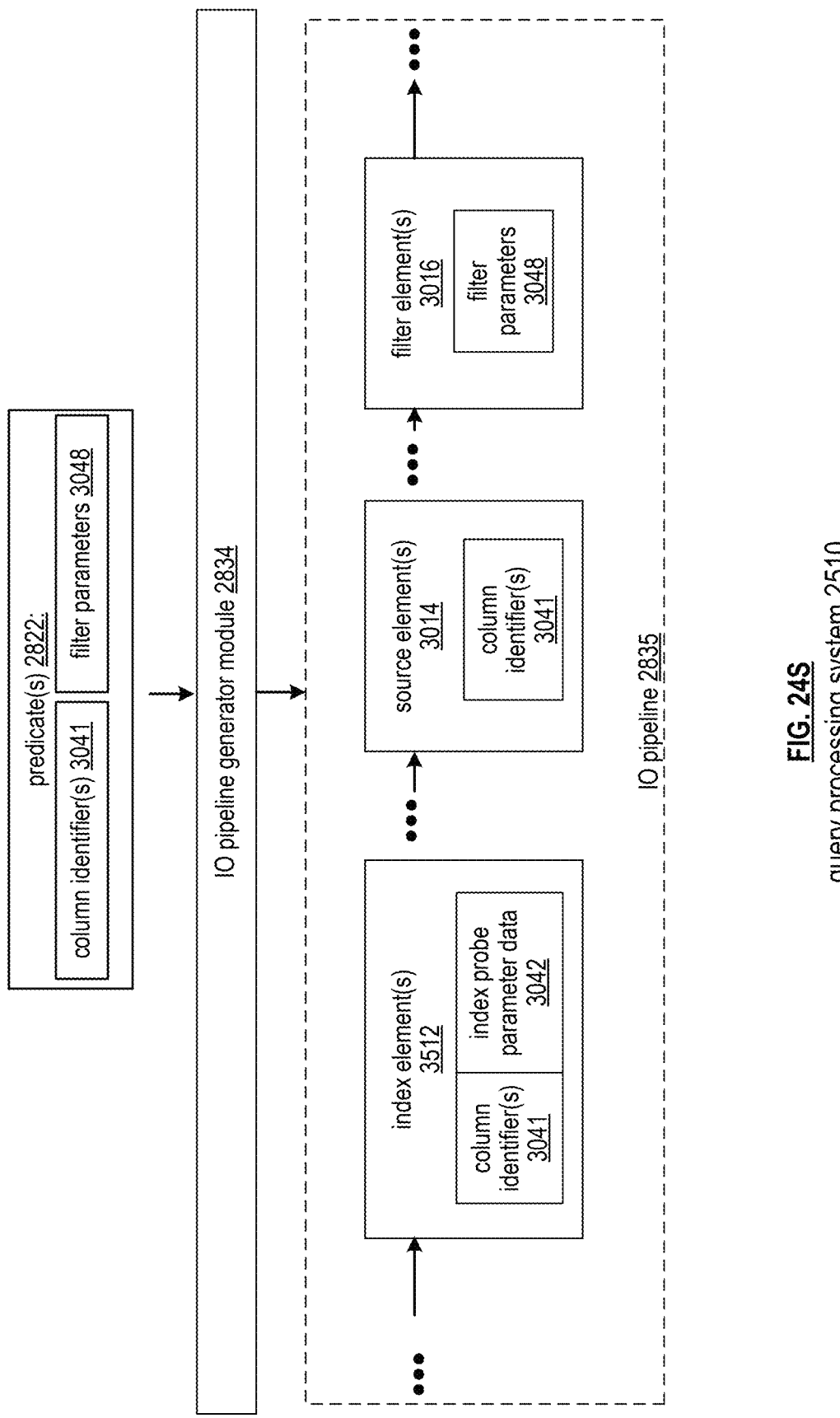
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility patent application for all purposes.

Figure 24T:
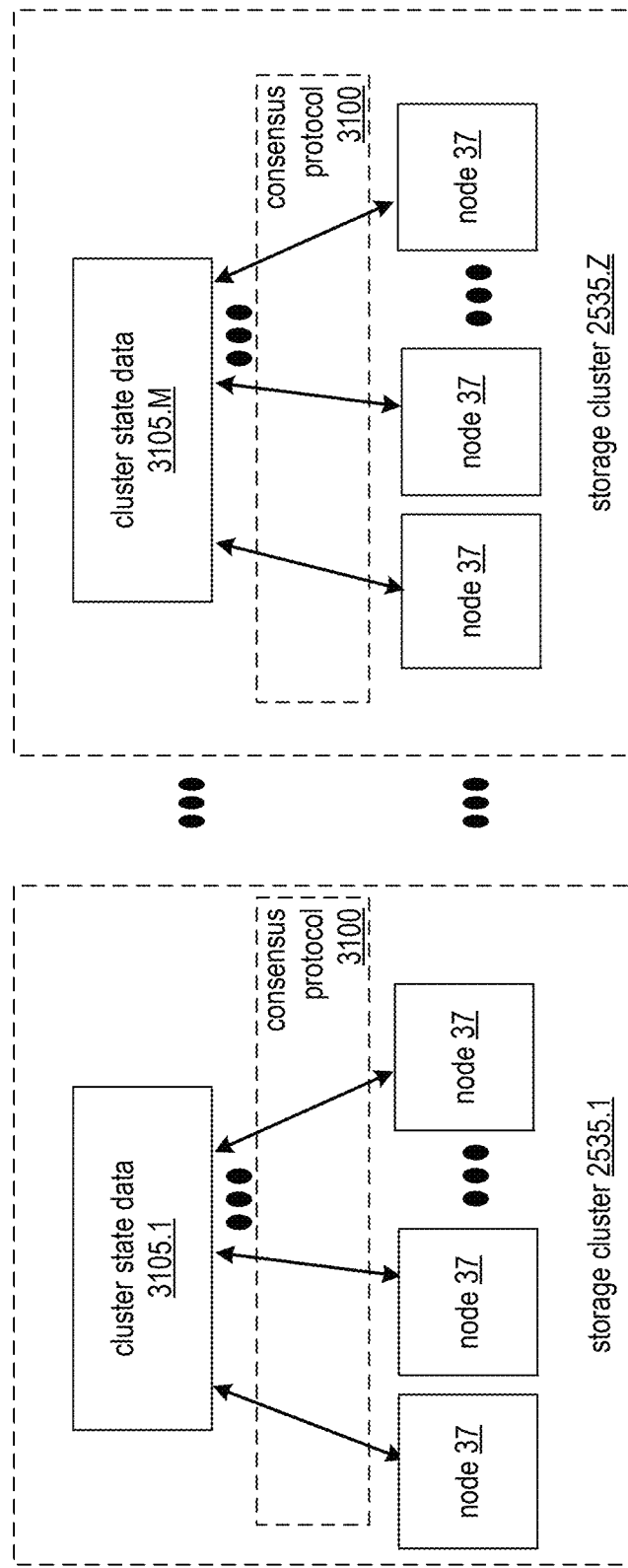
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility patent application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility patent application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
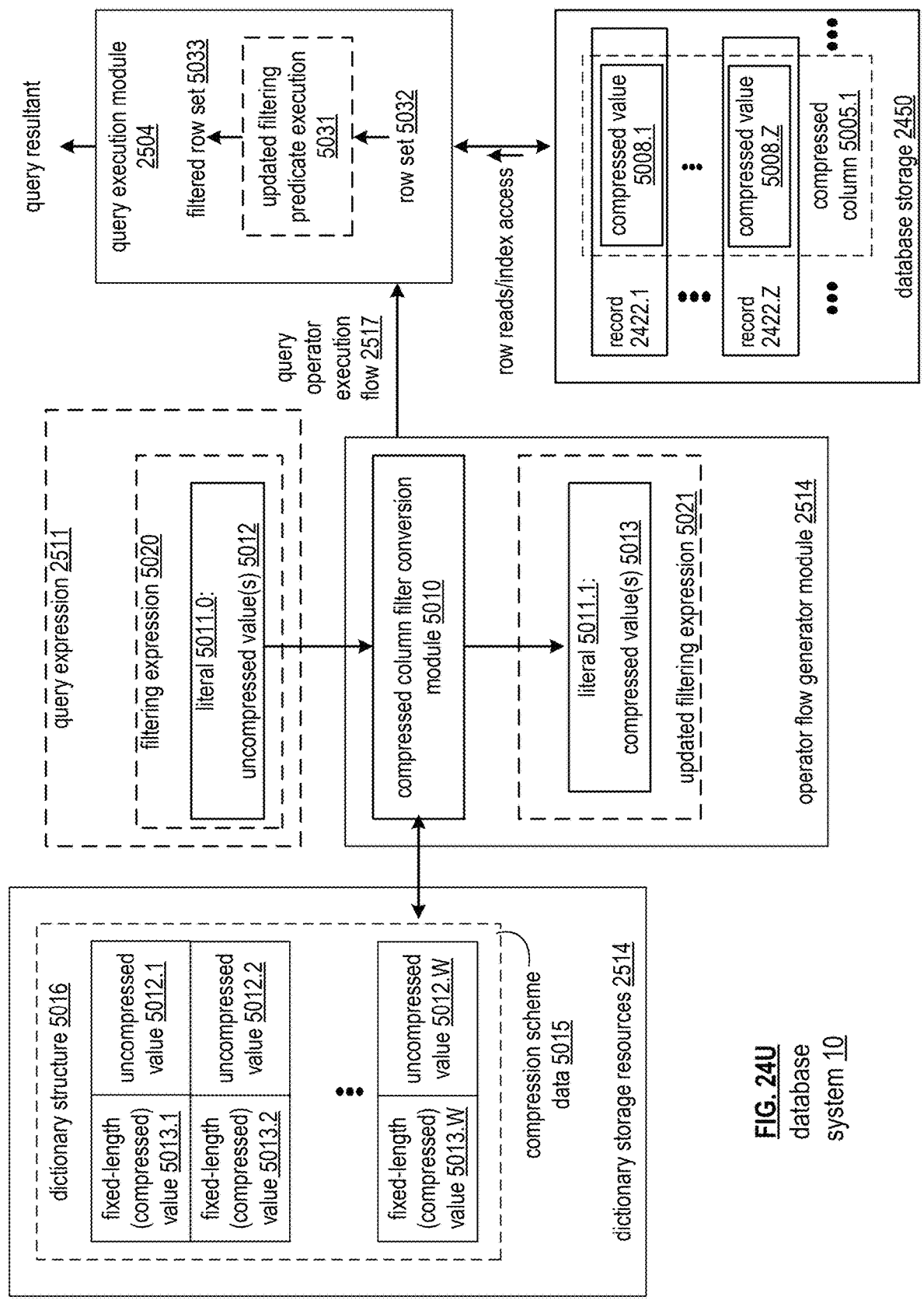
FIG. 24U is a schematic block diagram of a database system that implements a compressed column filter conversion module based on accessing a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIG. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDCs of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility patent application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility patent application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility patent application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC) join. This can include applying a matching row determination module 2558 via access to a dictionary structure 5016, In some embodiments, unlike hash maps generated during query execution for access in conjunction with executing other types of JOIN operations (e.g. as described in U.S. Utility application Ser. No. 18/266,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 25A:
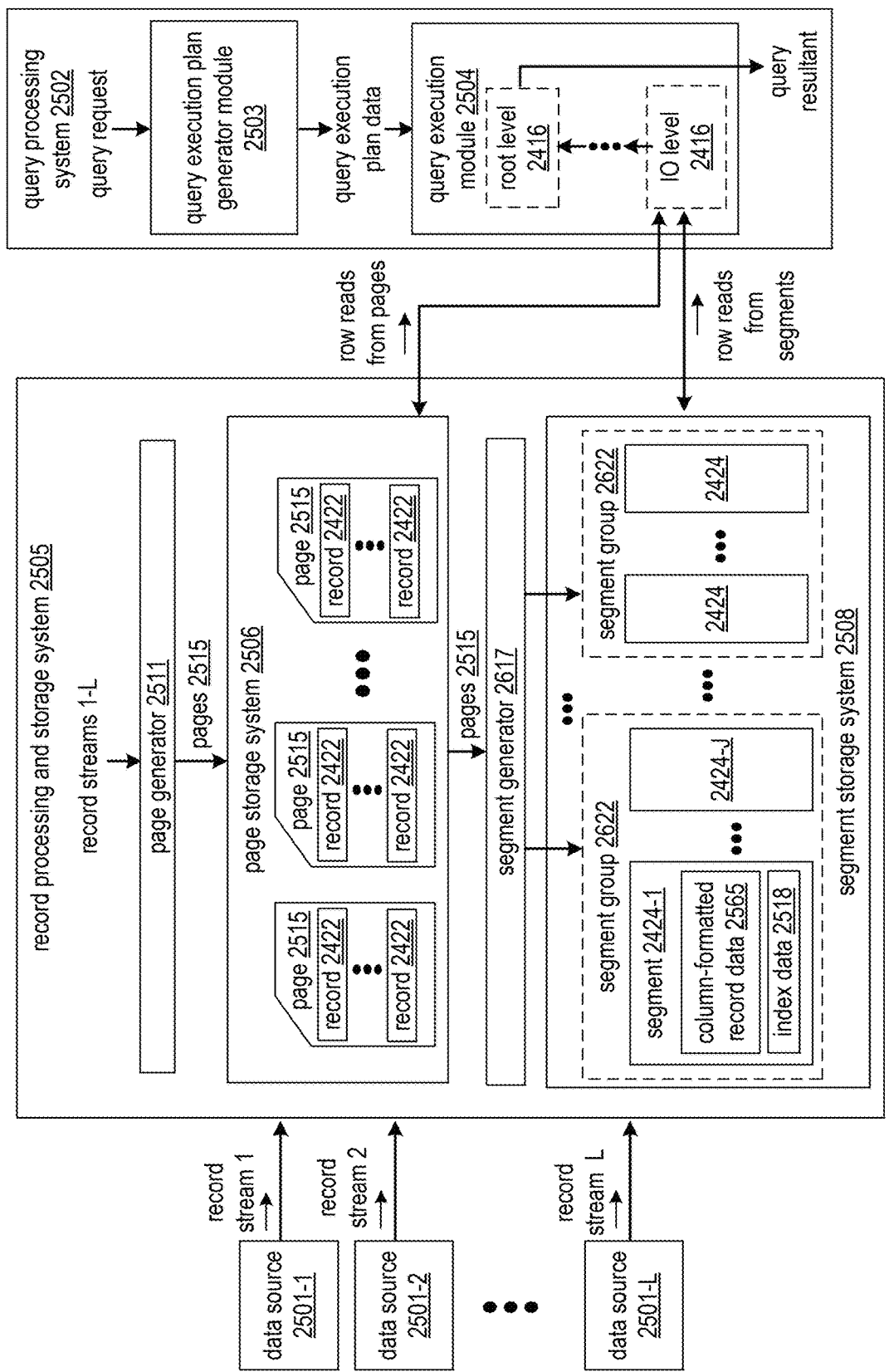
FIGS. 25A-25B are schematic block diagrams of embodiments of a database system that includes a record processing and storage system in accordance with various embodiments.
Figure 25B:
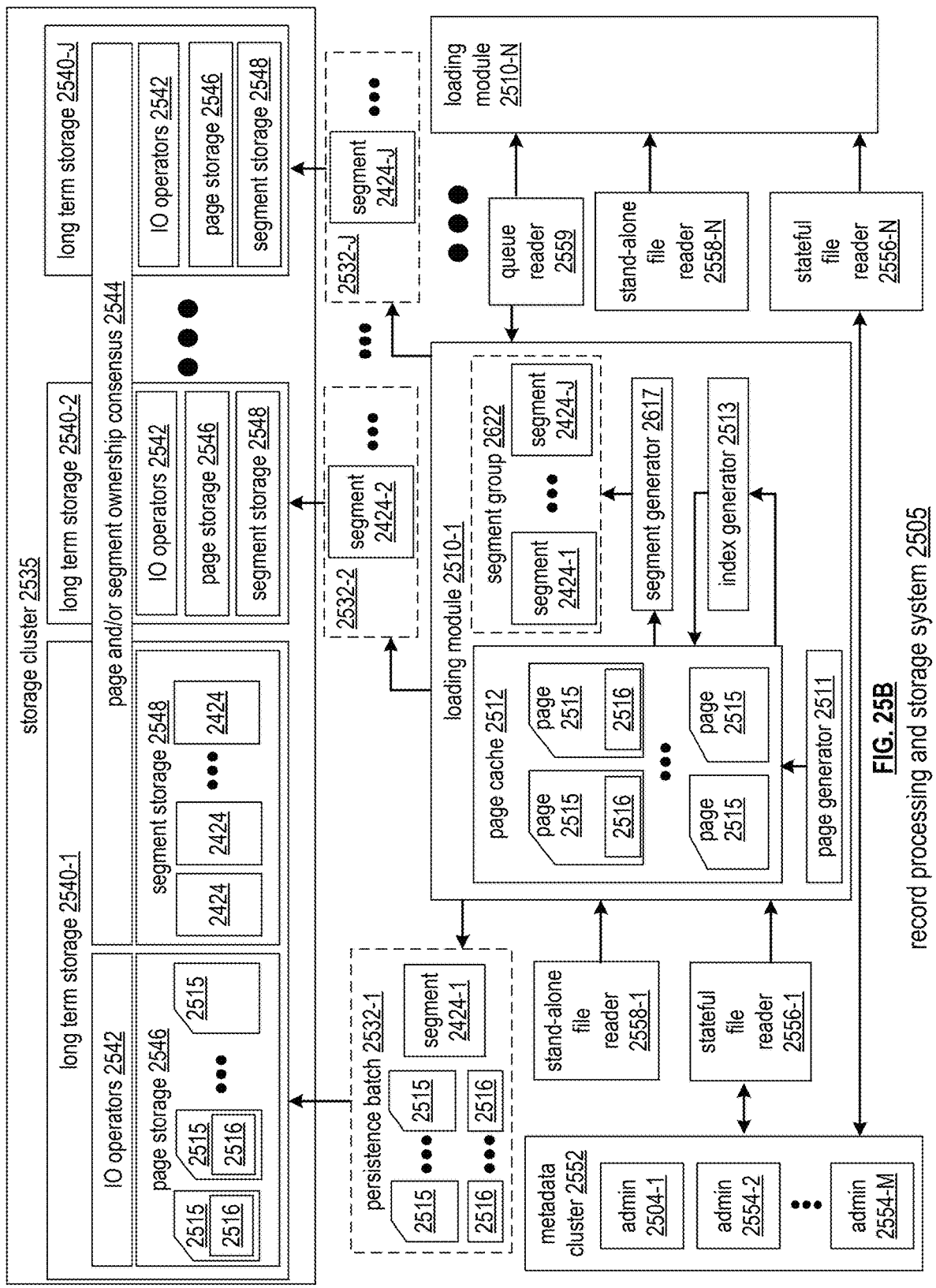
Figure 25C:
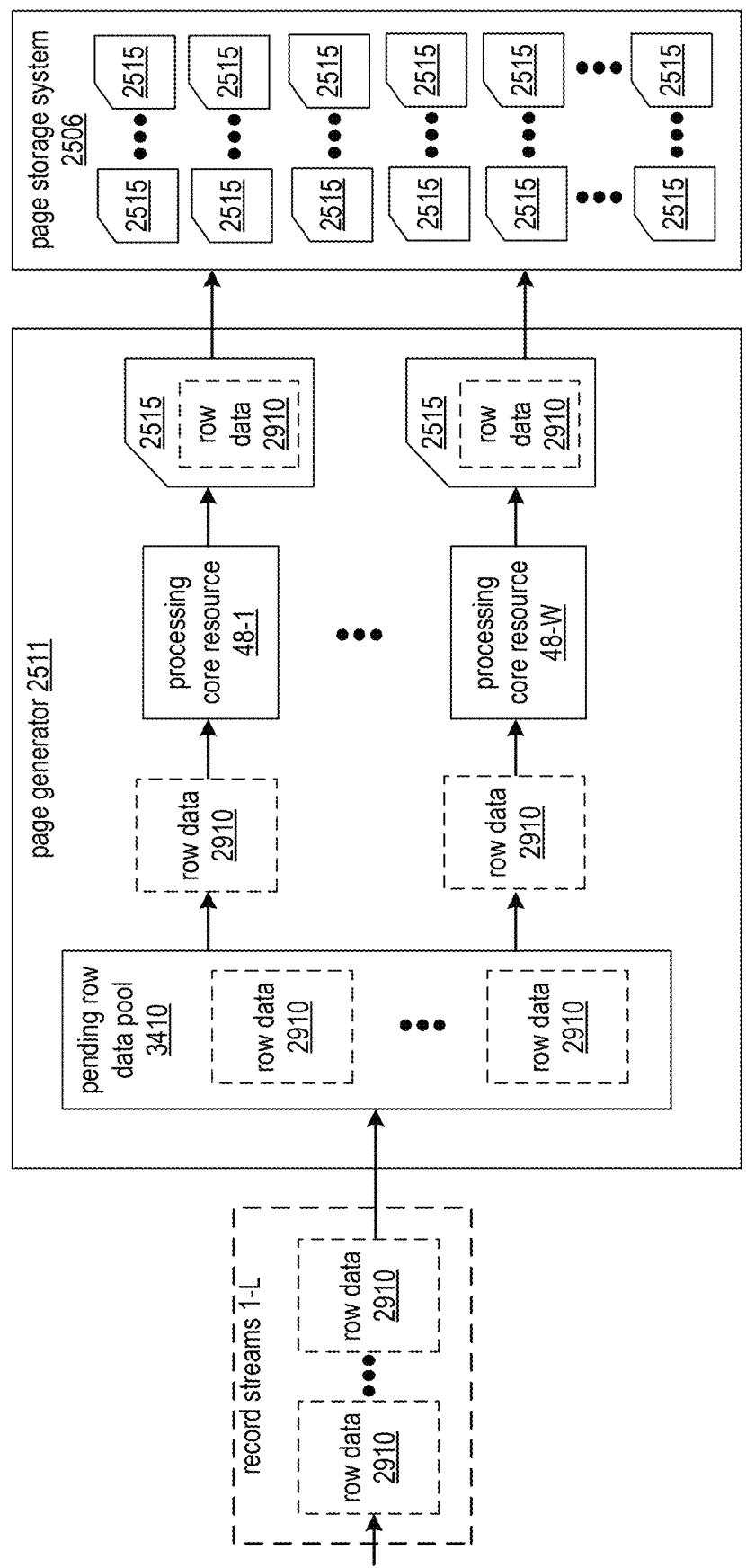
FIG. 25C is a is a schematic block diagram of an embodiment of a page generator in accordance with various embodiments.

FIGS. 25A-25C illustrate embodiments of a database system 10 operable to execute queries indicating join expressions based on implementing corresponding join processes via one or more join operators. Some or all features and/or functionality of FIGS. 25A-25C can be utilized to implement the database system 10 of FIGS. 24A-24I when executing queries indicating join expressions. Some or all features and/or functionality of FIGS. 25A-25C can be utilized to implement any embodiment of the database system 10 described herein.

FIG. 25A illustrates an embodiment of a database system 10 that implements a record processing and storage system 2505. The record processing and storage system 2505 can be operable to generate and store the segments 2424 discussed previously by utilizing a segment generator 2617 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2617 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 37 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words. delaying the grouping of rows into segments as long as possible increases the chances of having sufficient numbers of records with same and/or similar cluster keys to group together in segments. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2617 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2617 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2617, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2617, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2617; transfer of segments 2424 to the segment storage system 2508 once generated by the segment generator 2617; communication of query execution plan data to the query execution module 2504, such as the plurality of nodes 37 of the corresponding query execution plan 2405; reading of records by the query execution module 2504, such as IO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

The record processing and storage system 2505 and/or the query processing system 2502 of FIG. 25A, and/or any other embodiment of record processing and storage system 2505 and/or the query processing system 2502 described herein, can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the record processing and storage system 2505 and/or the query processing system 2502 can each be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the record processing and storage system 2505 and/or the query processing system 2502 at a massive scale.

Some or all functionality performed by the record processing and storage system 2505 and/or the query processing system 2502 as described herein cannot practically be performed by the human mind, particularly when the database system 10 is implemented to store and perform queries against records at a massive scale as discussed previously. In particular, the human mind is not equipped to perform record processing, record storage, and/or query execution for millions, billions, and/or trillions of records stored as many Terabytes, Petabytes, and/or Exabytes of data. Furthermore, the human mind is not equipped to distribute and perform record processing, record storage, and/or query execution as multiple independent processes, such as hundreds, thousands, and/or millions of independent processes, in parallel and/or within overlapping time spans.

Some or all features and/or functionality of FIG. 25A can be performed via at least one node 37 in conjunction with system metadata, applied across a plurality of nodes 37, for example, where at least one node 37 participates in some or all features and/or functionality of FIG. 25A based on receiving and storing the system metadata in local memory of the at least one node 37 as configuration data, and/or based on further accessing and/or executing this configuration data to implement some or all functionality of the record processing storage system and/or to implement some or all functionality of the query processing system as part of its database functionality accordingly. Performance of some or all features and/or functionality of FIG. 25A can optionally change and/or be updated over time, and/or a set of nodes participating in executing some or all features and/or functionality of FIG. 25A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of loading modules 2510-1-2510-N. Each loading module 2510 can be implemented via its own processing and/or memory resources. For example, each loading module 2510 can be implemented via its own computing device 18, via its own node 37, and/or via its own processing core resource 48. The plurality of loading modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each loading modules 2510 to receive one or more of the record streams 1-L received from the data sources 2501-1-2501-L as illustrated in FIG. 25A. For example, each loading module 2510 receives a distinct subset of the entire set of records received by the record processing and storage system 2505 at a given time.

Each loading module 2510 can receive records 2422 in one or more record streams via its own stateful file reader 2556 and/or stand-alone file reader 2558. Each loading module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given loading module 2510 is implemented via its own computing device 18 and/or node 37, the same computing device 18 and/or node 37 can optionally be utilized to implement the stateful file reader 2556, and/or each stand-alone file reader 2558 communicating with the given loading module 2510.

Each loading module 2510 can implement its own page generator 2511, its own index generator 2513, and/or its own segment generator 2617, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of loading modules 2510 as illustrated in FIG. 25B. Each page generator 2511 of FIG. 25B can process its own incoming records 2422 to generate its own corresponding pages 2515.

As pages 2515 are generated by the page generator 2511 of a loading module 2510, they can be stored in a page cache 2512. The page cache 2512 can be implemented utilizing memory resources of the loading module 2510, such as memory resources of the corresponding computing device 18. For example, the page cache 2512 of each loading module 2010-1-2010-N can individually or collectively implement some or all of the page storage system 2506 of FIG. 25A.

The segment generator 2617 of FIG. 25A can similarly be implemented as a plurality of segment generators 2617 of a corresponding plurality of loading modules 2510 as illustrated in FIG. 25B. Each segment generator 2617 of FIG. 25B can generate its own set of segments 2424-1-2424-J included in one or more segment groups 2622. The segment group 2622 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2617 of a loading module 2510 can access the page cache 2512 of the loading module 2510 to convert the pages 2515 previously generated by the page generator 2511 into segments. In some cases, each segment generator 2617 requires access to all pages 2515 generated by the segment generator 2617 since the last conversion process of pages into segments. The page cache 2512 can optionally store all pages generated by the page generator 2511 since the last conversion process, where the segment generator 2617 accesses all of these pages generated since the last conversion process to cluster records into groups and generate segments. For example, the page cache 2512 is implemented as a write-through cache to enable all previously generated pages since the last conversion process to be accessed by the segment generator 2617 once the conversion process commences.

In some cases, each loading module 2510 implements its segment generator 2617 upon only the set of pages 2515 that were generated by its own page generator 2511, accessible via its own page cache 2512. In such cases, the record grouping via clustering key to create segments with the same or similar cluster keys are separately performed by each segment generator 2617 independently without coordination, where this record grouping via clustering key is performed on N distinct sets of records stored in the N distinct sets of pages generated by the N distinct page generators 2511 of the N distinct loading modules 2510. In such cases, despite records never being shared between loading modules 2510 to further improve clustering, the level of clustering of the resulting segments generated independently by each loading module 2510 on its own data is sufficient, for example, due to the number of records in each loading module's 2510 set of pages 2515 for conversion being sufficiently large to attain favorable levels of clustering.

In such embodiments, each loading modules 2510 can independently initiate its own conversion process of pages 2515 into segments 2424 by waiting as long as possible based on its own resource utilization, such as memory availability of its page cache 2512. Different segment generators 2617 of the different loading modules 2510 can thus perform their own conversion of the corresponding set of pages 2515 into segments 2424 at different times, based on when each loading modules 2510 independently determines to initiate the conversion process, for example, based on each independently making the determination to generate segments. Thus, as discussed herein, the conversion process of pages into segments can correspond to a single loading module 2510 converting all of its pages 2515 generated by its own page generator 2511 since its own last the conversion process into segments 2424, where different loading modules 2510 can initiate and execute this conversion process at different times and/or with different frequency.

In other cases, it is ideal for even more favorable levels of clustering to be attained via sharing of all pages for conversion across all loading modules 2510. In such cases, a collective decision to initiate the conversion process can be made across some or all loading modules 2510, for example, based on resource utilization across all loading modules 2510. The conversion process can include sharing of and/or access to all pages 2515 generated via the process, where each segment generator 2617 accesses records in some or all pages 2515 generated by and/or stored by some or all other loading modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple loading modules 2510. As discussed herein, the conversion process of pages into segments can optionally correspond to multiple loading modules 2510 converting all of their collectively generated pages 2515 since their last conversion process into segments 2424 via sharing of their generated pages 2515.

An index generator 2513 can optionally be implemented by some or all loading modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-$x$ of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a loading module 2510 and can utilize its index generator 2513 to generate index data 2516 for a particular page 2515 in response to having query execution plan data indicating that records 2422 be read the particular page from the page cache 2512 of the loading module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each loading modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from loading modules 2510 to storage cluster 2535 and/or to facilitate sending of data from storage cluster 2535 to loading modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-$z$ of FIG. 6 can receive pages 2515, corresponding index data 2516, and/or segments 2424 from its own set of loading modules 2510-1-2510-N, where the record processing and storage system 2505 of FIG. 25B can include $z$ sets of loading modules 2510-1-2510-N that each generate pages 2515, segments 2524, and/or index data 2516 for storage in its own corresponding storage cluster 35.

The processing and/or memory resources utilized to implement each long term storage 2540 can be distinct from the processing and/or memory resources utilized to implement the loading modules 2510. Alternatively, some loading modules can optionally share processing and/or memory resources long term storage 2540, for example, where a same computing device 18 and/or a same node 37 implements a particular long term storage 2540 and also implements a particular loading modules 2510.

Each loading module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a loading module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a loading module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2617. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a loading module 2510 maintains storage of pages 2515 via page cache 2512, even if they are sent to storage cluster 2535 in persistence batches 2532. This can enable the segment generator 2617 to efficiently read pages 2515 during the conversion process via reads from this local page cache 2512. This can be ideal in minimizing page movement, as pages do not need to be retrieved from long term storage 2540 for conversion into segments by loading modules 2510 and can instead be locally accessed via maintained storage in page cache 2512. Alternatively, a loading module 2510 removes pages 2515 from storage via page cache 2512 once they are determined to be successfully stored in long term storage 2540. This can be ideal in reducing the memory resources required by loading module 2510 to store pages, as only pages that are not yet durably stored in long term storage 2540 need be stored in page cache 2512.

Each long term storage 2540 can include its own page storage 2546 that stores received pages 2515 generated by and received from one or more loading modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more loading modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the loading module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a loading module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and/or segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and/or segment ownership consensus 2544 can include one or more versions of ownership data, for example, that is generated via execution of a consensus protocol mediated via the set of long term storage 2540-1-2540-J. The page and/or segment ownership consensus 2544 can dictate that every record is owned by exactly one long term storage 2540 via access to either a page 2515 storing the record or a segment 2424 storing the record, but not both. The page and/or segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and/or segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and/or segment ownership consensus 2544. For example, the long term storage 2540 can be solely responsible for durably storing the records utilized in query executions. In such embodiments, the cached and/or temporary storage of pages and/or segments of loading modules 2510, such as pages 2515 in page caches 2512, are not read for query executions via accesses to storage resources of loading modules 2510.

Some or all features and/or functionality of FIG. 25B can be performed via at least one node 37 in conjunction with system metadata applied across a plurality of nodes 37, for example, where at least one node 37 participates in some or all features and/or functionality of FIG. 25B based on receiving and storing the system metadata in local memory of the at least one node 37 as configuration data and/or based on further accessing and/or executing this configuration data to implement some or all functionality of a loading module 2510, to implement some or all functionality of a file reader, and/or to implement some or all functionality of the storage cluster 2535 as part of its database functionality accordingly. Performance of some or all features and/or functionality of FIG. 25B can optionally change and/or be updated over time, and/or a set of nodes participating in executing some or all features and/or functionality of FIG. 25B can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25C illustrates an example embodiment of a page generator 2511. The page generator 2511 of FIG. 25C can be utilized to implement the page generator 2511 of FIG. 25A, can be utilized to implement each page generator 2511 of each loading module 2510 of FIG. 25B, and/or can be utilized to implement any embodiments of page generator 2511 described herein.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can be transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a loading module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each loading module 2510 can have its own pending row data pool 3410. Alternatively, multiple loading modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each loading module 2510 has its own plurality of processing core resources 48-1-48-W, where the processing core resources 48-1-48-W of a given loading module 2510 is implemented via the set of processing core resources 48 of one or more nodes 37 utilized to implement the given loading module 2510. As another example, the plurality of processing core resources 48-1-48-W are each implemented by a corresponding one of the set of each loading module 2510-1-2510-N, for example, where each loading module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received overtime. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding loading module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Some or all features and/or functionality of FIG. 25C can be performed via at least one node 37 in conjunction with system metadata applied across a plurality of nodes 37, for example, where at least one node 37 participates in some or all features and/or functionality of FIG. 25C based on receiving and storing the system metadata in local memory of the at least one node 37 as configuration data and/or based on further accessing and/or executing this configuration data to implement some or all functionality of a loading module 2510, to implement some or all functionality of page generator 2511 and/or page storage system 2506 as part of its database functionality accordingly. Performance of some or all features and/or functionality of FIG. 25C can optionally change and/or be updated over time, and/or a set of nodes participating in executing some or all features and/or functionality of FIG. 25C can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 25D:
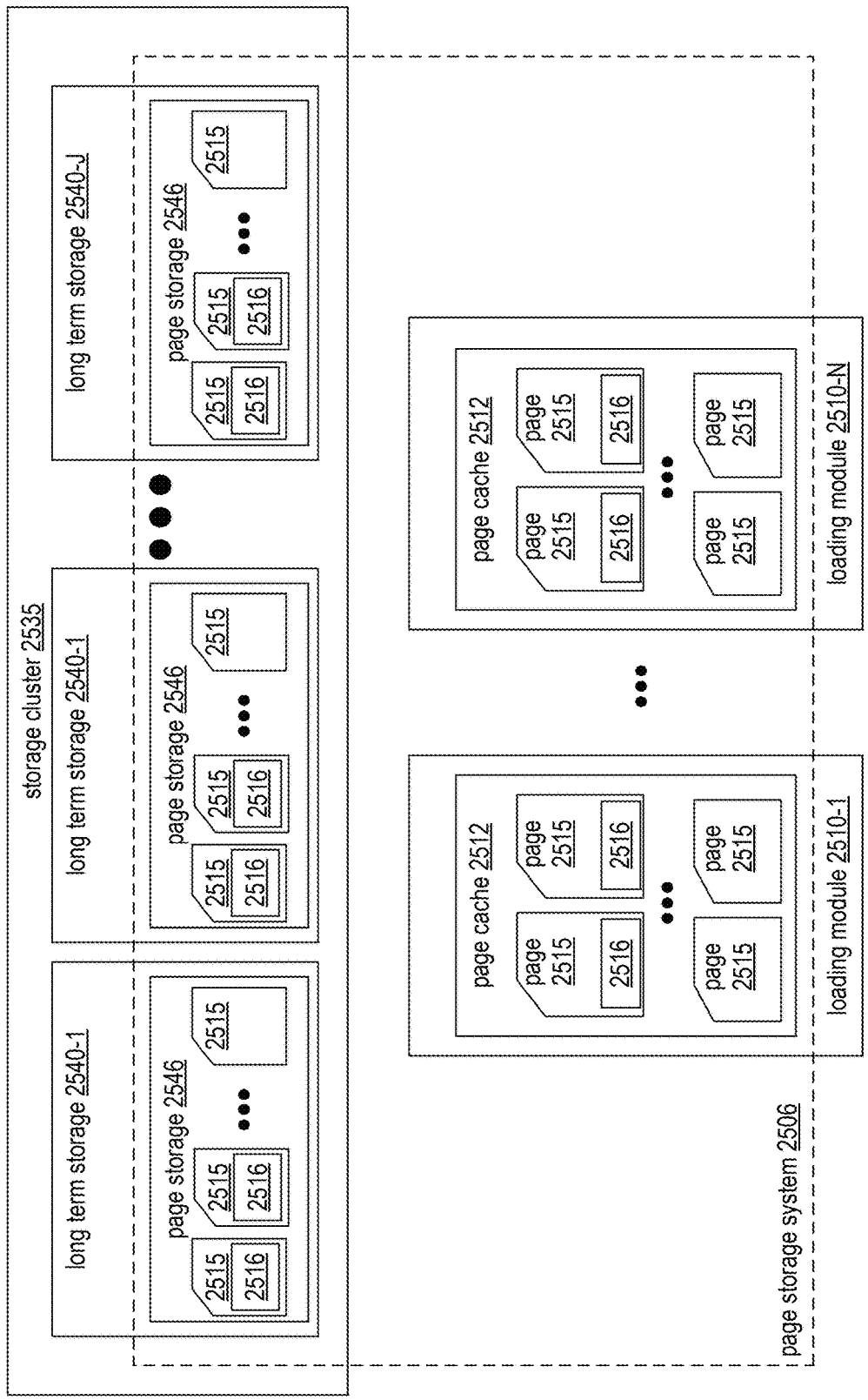
FIG. 25D is a schematic block diagram of an embodiment of a page storage system of a record processing and storage system in accordance with various embodiments.
Figure 25E:
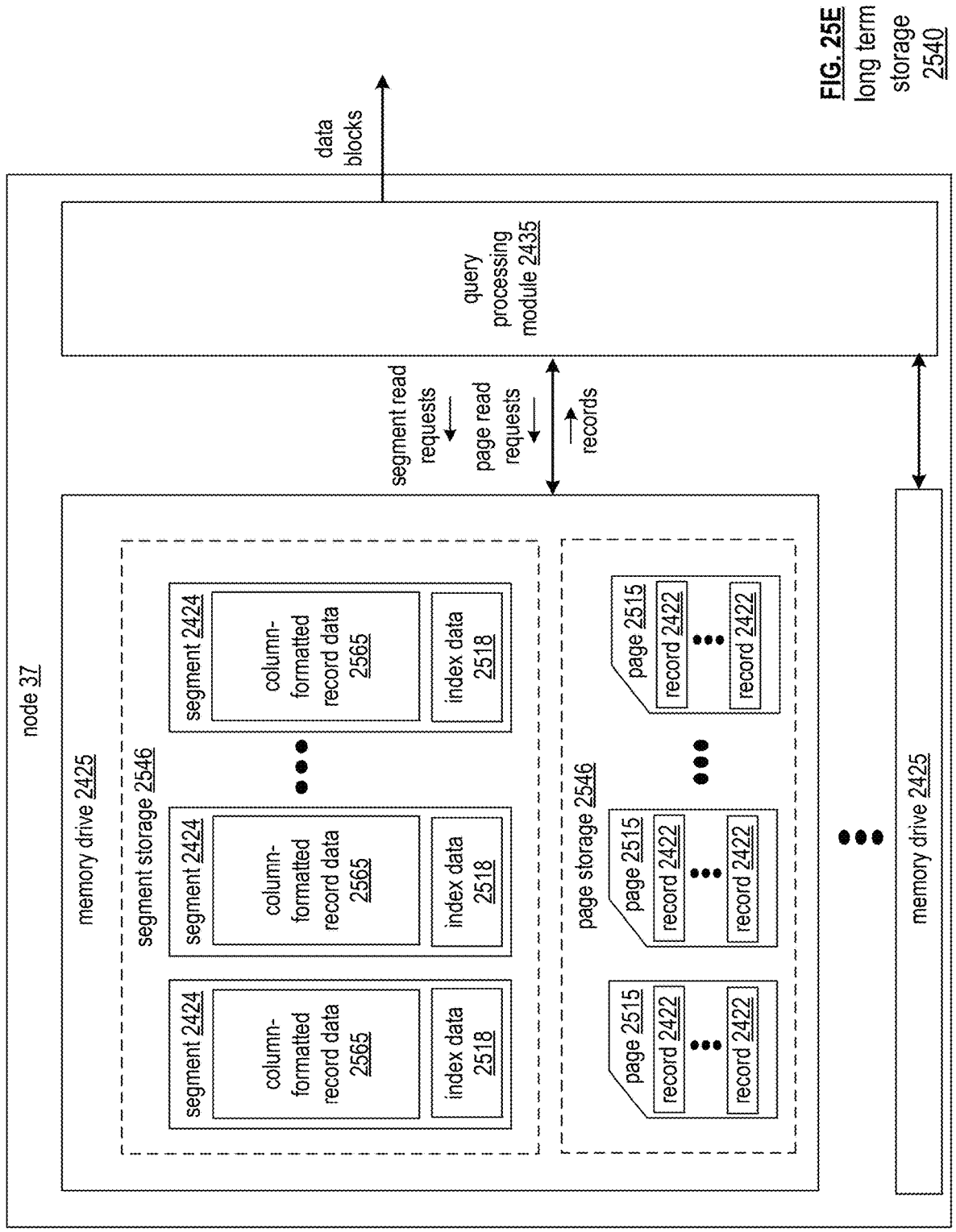
FIG. 25E is a schematic block diagram of a node that implements a query processing module that reads records from segment storage and page storage in accordance with various embodiments.

FIG. 25D illustrates an example embodiment of the page storage system 2506. As used herein, the page storage system 2506 can include page cache 2512 of a single loading module 2510; can include page caches 2512 of some or all loading module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-z; and/or can include any other memory resources of database system 10 that are utilized to temporarily and/or durably store pages.

Some or all features and/or functionality of FIG. 25D can be performed via at least one node 37 in conjunction with system metadata applied across a plurality of nodes 37, for example, where at least one node 37 participates in some or all features and/or functionality of FIG. 25D based on receiving and storing the system metadata in local memory of the at least one node 37 as configuration data and/or based on further accessing and/or executing this configuration data to implement some or all functionality of a loading module 2510 and/or a given long term storage 2540 as part of its database functionality accordingly. Performance of some or all features and/or functionality of FIG. 25D can optionally change and/or be updated over time, and/or a set of nodes participating in executing some or all features and/or functionality of FIG. 25D can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the IO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the IO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and/or segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Some or all features and/or functionality of FIG. 25E can be performed a given node 37 in conjunction with system metadata applied across a plurality of nodes 37, for example, where the given node 37 performs some or all features and/or functionality of FIG. 25E based on receiving and storing the system metadata in local memory of the at least one node 37 as configuration data, and/or based on further accessing and/or executing this configuration data to implement some or all functionality of the given node 37 of FIG. 25E as part of its database functionality accordingly. Performance of some or all features and/or functionality of FIG. 25E can optionally change and/or be updated over time based on the system metadata applied across the plurality of nodes 37 being updated over time and/or based on nodes on updating their configuration data stored in local memory to reflect changes in the system metadata based on receiving data indicating these changes to the system metadata.

In some embodiments, some or all features and/or functionality of loading new data (e.g. as new pages and/or new segments), for example, via one or more loading modules 2510 and/or via record processing and storage system 2505 as described herein implements some or all features and/or functionality of loading modules, record processing and storage system, and/or any loading of data for storage and access in query execution as disclosed by: U.S. Utility application Ser. No. 18/355,497, entitled "TRANSFER OF A SET OF SEGMENTS BETWEEN STORAGE CLUSTERS OF A DATABASE SYSTEM", filed Jul. 20, 2023; U.S. Utility application Ser. No. 18/308,954, entitled "QUERY EXECUTION DURING STORAGE FORMATTING UPDATES", filed Apr. 28, 2023; and/or U.S. Utility application Ser. No. 18/313,548, entitled "LOADING QUERY RESULT SETS FOR STORAGE IN DATABASE SYSTEMS", filed May 28, 2023; which are hereby incorporated herein by reference in its entirety and made part of the present U.S. Utility patent application for all purposes.

In some embodiments, some or features and/or functionality of loading data, for example, via one or more loading modules 2510 and/or via record processing and storage system 2505 as described herein, can implement processing of a corresponding message stream via a plurality of feed receiver modules in a fault tolerant manner as disclosed by U.S. Utility application Ser. No. 17/119,311, entitled "FAULT-TOLERANT DATA STREAM PROCESSING", filed Dec. 11, 2020, which hereby incorporated herein by reference in its entirety and made part of the present U.S. Utility patent application for all purposes.

In some embodiments, some or all features and/or functionality of parallelized execution of tasks via a plurality of nodes, assigning different tasks to different nodes for in parallel, handling of node outages and facilitating reassignment of tasks, and/or other handling of node outages and/or execution of tasks can be implemented via some or all features and/or functionality of assigning, executing, and/or reassigning tasks as disclosed by: U.S. Utility application Ser. No. 18/482,939, entitled "PERFORMING SHUT-DOWN OF A NODE IN A DATABASE SYSTEM" filed Oct. 9, 2023. which is hereby incorporated herein by reference in its entirety and made part of the present U.S. Utility patent application for all purposes. In some embodiments, some or all tasks described herein are loading-based tasks performed in conjunction with loading data, for example, via loading modules 2510 via record processing and storage system 2505, where such tasks are optionally assigned to nodes 37 implemented as loading modules 2510.

In various embodiments, assigning, monitoring, and/or execution of tasks in parallel as described herein can be in accordance with applying a distributed tasks framework. The distributed tasks framework and/or corresponding assigning, monitoring, and/or execution tasks can be implemented via maintaining of corresponding state data, for example, in conjunction with implementing a consensus protocol via a plurality of nodes as described herein and/or via implementing some or all features and/or functionality as updating of configuration data as disclosed herein.

Figure 26A:
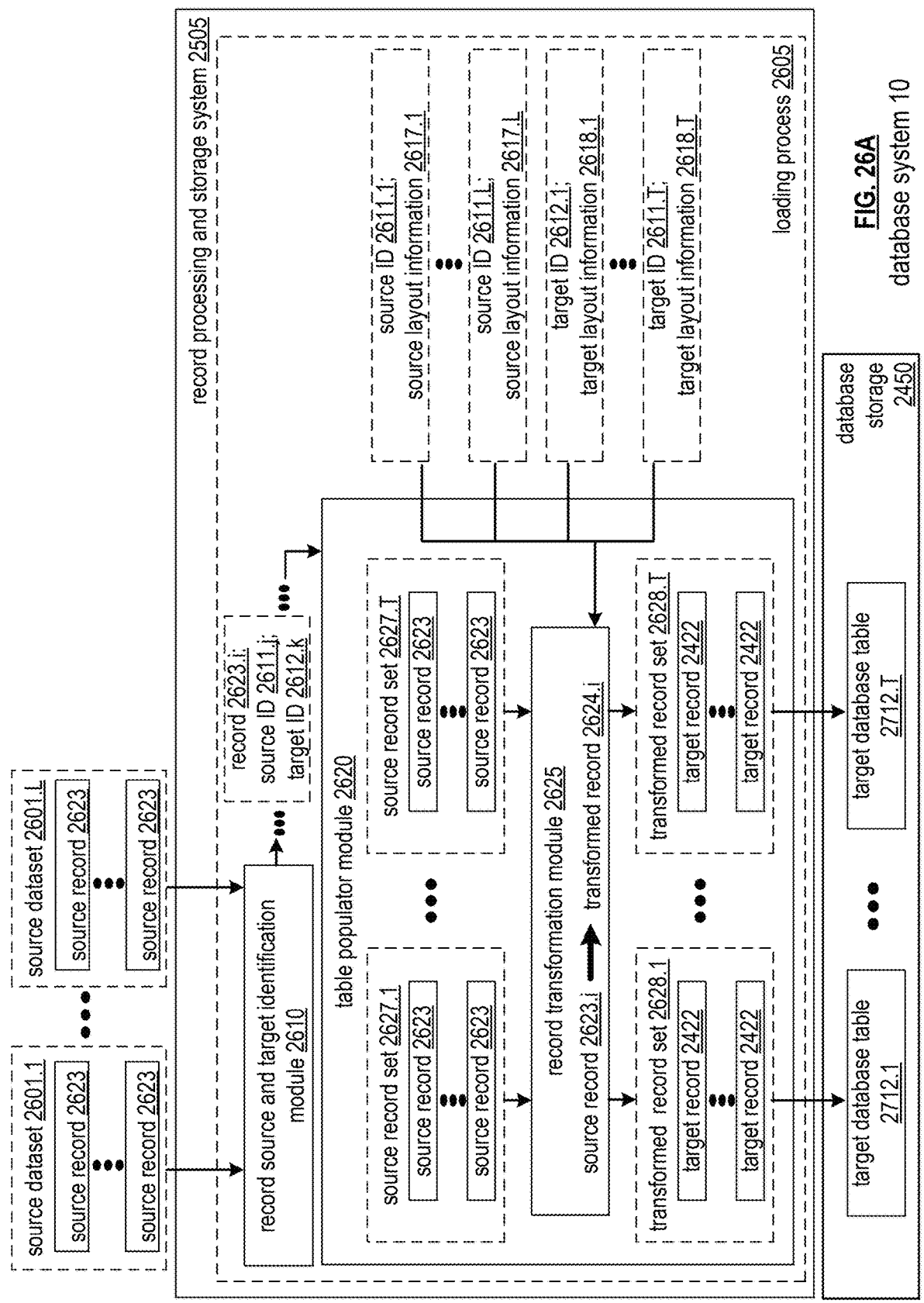
FIG. 26A is a schematic block diagram of a record processing and storage system that performs a loading process based on implementing a record source and target identification module and a table populator module that implements a record transformation module in accordance with various embodiments.
Figure 26B:
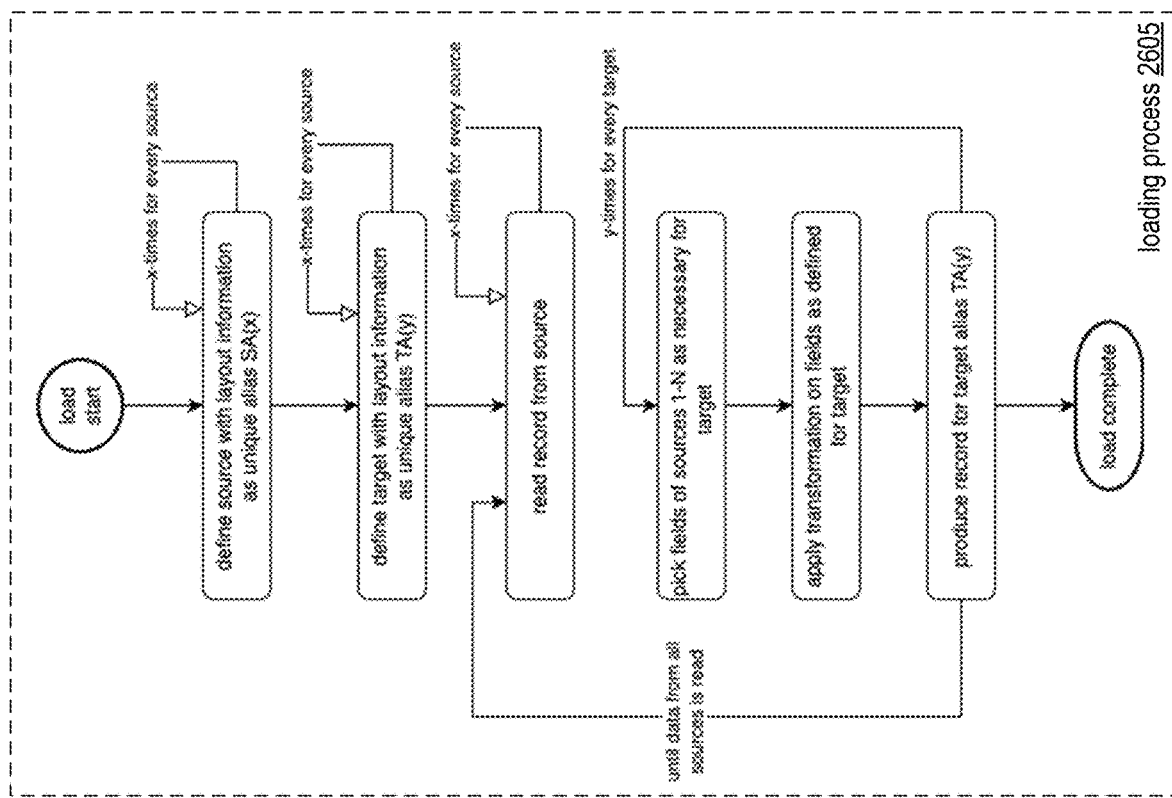
FIG. 26B illustrates an example logical flow implemented in performing a loading process in accordance with various embodiments.

FIGS. 26A-26B illustrate embodiments of a record processing and storage system 2505 that performs a loading process 2605 to process a set of source datasets to generate a set of transformed record sets each for storage in a corresponding target database tables. Some or all features and/or functionality of the record processing and storage system 2505 and/or loading process 2605 of FIGS. 26A-26B can implement any embodiment of record processing and storage system 2505 and/or loading process 2605 described herein. Some or all features and/or functionality of processing source data sets to generate and store transformed record sets of FIGS. 26A-26B can implement any receipt, processing, transformation, loading, and/or storage of data described herein. Some or all features and/or functionality of FIGS. 26A-26B can implement any embodiment of database system 10 described herein.

In some embodiments, loading data to database system 10 can take a significant amount of time. For example, depending on the layout of source data, it can be necessary to perform two or more load operations on different datasets that are later joined, for example, to produce necessary reports. In some cases, some of these reports may even work on subsets of the original datasets, making the initial load operations time and resource consuming, even when only a fraction would be necessary. This problem can become worse, for example, if data resides in different source locations or even different types of data sources, such as files or stream applications (e.g. Apache Kafka).

Some or all of these issues can be alleviated via processing data from one or more source datasets for storage in one or more target tables in one load operation (e.g. one load process 2605, and/or one corresponding loading task), for example, via implementing some or all functionality of FIGS. 26A-26B. Processing data from one or more source datasets for storage in one or more target tables in one load operation can improve the technology of database systems to increase the efficiency of loading data, even when data is received from multiple sources of multiple types.

Each source dataset 2601 of a set of source datasets 2601.1-2601.L processed via a given loading process 2605 can be defined via a corresponding source identifier (ID) 2611 (e.g. a unique symbolic name/alias that is specified and/or that references the source) and corresponding source layout information 2617 (e.g. information about the structure of the data in the source necessary to identify records and/or reference different parts of a record as fields, where the fields optionally each have a unique symbolic name and/or are referenced by number). Each given source dataset 2601 can include a plurality of source records 2623 (e.g. implemented via some or all features and/or functionality of target record 2422, for example, corresponding to data of records 2422 prior to being transformed into these records for storage via a record transformation module 2625), for example, in accordance with a corresponding layout in accordance with the source layout information 2617 for the given source dataset. Different source datasets 2601 can have same or different numbers of records 2623. The set of source datasets 2601.1-2601.L can optionally correspond to/be received from the set of data sources 2501-1-2501-L of FIG. 25A.

Each target database table 2712 of a set of target database tables 2712.1-2712.T to which some or all data of some or all source datasets is to be stored in can similarly be specified via a corresponding target identifier (ID) 2612 (e.g. a unique symbolic name/alias that is specified and/or that references the target) and corresponding target layout information 2618 (e.g. information about the schema of the corresponding target database table 2712, such as the columns of the target are named using a corresponding symbolic name, which can match symbolic names of corresponding fields included in the source layout information).

In some embodiments, if multiple source are used that have different numbers of source records, defaults can be applied, for example, on the target level and/or via derived values, for example, based on available field values of other sources. In some embodiments, the mechanism of aliases can be expanded to system computed source data, such as the time a records was loaded and/or or the number of the records or other source related information like filename. In such embodiments, case, the alias can be utilized (e.g. based on being necessary) to avoid collisions between source/target fields/columns and the name of the computed value (e.g. if they exist in source/target).

The record transformation module 2625 can further process the source record sets to generate the transformed record sets based on applying a specification linking source fields of difference aliases with target columns of different aliases, for example, allowing the specification of additional transformation operations. This can be based on implementing some or all features and/or functionality of FIGS. 27A-27G and/or otherwise accessing information specifying how/which transformation operations be performed to generate a given transformed record 2624 from a given record 2623.

As illustrated in FIG. 26A, a record source and target identification module 2610 can be utilized to identify a source identifier 2611 and target identifier 2612 for each source record 2623 of a given source dataset 2601. where a source identifier 2611.$j$ assigned to a given record 2623.$i$ identifies that record 2623.$i$ is included in a particular source dataset 2601.$j$ of the set of source datasets 2601.1-2601.L, and/or where a target identifier 2612.$k$ assigned to the given record 2623.$i$ identifies that record 2623.$i$ is destined for a particular target database table 2712.k of the set of target database tables 2712.1-2712.T.

Each record 2623 can be processed via a table populator module 2620 to determine a plurality of source record sets 2627.1-2627.T, each corresponding to one of the set of target database tables 2712.1-2712.T, based on the target identifier mapped to each record 2623 (e.g. record 2623.i is included in source record set 2627.k destined for target database table 2712.k based on having target identifier 2612k).

Different source record sets 2627 can have same or different numbers of records 2623. In some or all cases, all source records of a given source dataset 2601 can be destined for a same target database table 2712 and can thus be included in a same source record set 2627. In some or all cases, different source records of a given source dataset 2601 can optionally be destined for different target database table 2712 and can thus be included in different source record sets 2627. One or more given source record sets 2627 can include source records from multiple different source datasets 2601, for example, based on some or all records of these different source datasets being destined for the same table to which records of a given source record set 2627 are destined.

A record transformation module 2625 can generate each of a set of transformed record sets 2628.1-2628.T from a corresponding one of the set of source record sets 2627.1-2627.T. Each transformed record set 2628 can include a plurality of target records 2422, for example, implemented as and/or based on transformed records 2624 generated from source records 2623 of a corresponding source record set. The records 2422 can be stored in (e.g. added to) the corresponding target database table accordingly via being stored in database storage 2450. For example, records 2422 of a given transformed record set 2628 are stored in pages 2515 and/or sets of multiple such pages are converted into sets of segments 2424 for the corresponding table 2712 each stored via a memory drive of a corresponding node 37, for example, in conjunction with implementing some or all features and/or functionality of FIGS. 24A-25E.

Generating each given transformed record 2624.i from a given source record 2623.i can include applying corresponding source information 2617.j and corresponding target layout information 2618k, based on the given source record 2623.i having the source identifier 2611.j and the target identifier 2618k. For example, a given source record set 2627.k may include records 2623 from various sources, where generating a first given transformed record for the given target database table 2712.k can include performing a first transformation (e.g. first types/arrangement of one or more transformation operations) to a first corresponding source record 2623 of the source record set 2627.k based on the first corresponding source record 2623 being from a first source dataset 2601, while generating a second given transformed record for the given target database table 2712.k can include performing a second transformation (e.g. second types/arrangement of one or more transformation operations different from the first types/arrangement of one or more transformation operations) to the second corresponding source record 2623 of the source record set 2627.k based on the second corresponding source record 2623 being from a second source dataset 2601 different from the first source dataset 2601 (e.g. based on the second source dataset 2601 having different source layout information from that of the first source dataset rendering records 2623 having different layouts/structuring requiring different transformations being applied to generate target records having the schema for the target table 2712).

A particular transformation j,k) to be applied to generate a transformed record 2624 destined for a particular transformed record set 2628.k from a source record 2623 from source dataset 2501.j can be dictated by the source layout information 2617.j and target layout information 2617k, and can involve a corresponding types/arrangement of one or more transformation operations dictated by the source layout information 2617.j and target layout information 2617.k. In some embodiments, determining and/or applying the types/arrangement of one or more transformation operations defining a particular transformation (j,k) to generate a transformed record 2624 destined for a particular transformed record set 2628.k from a source record 2623 from source dataset 2501.j can be based on applying corresponding transformation graph data 2715 defined for transforming source data 2711 into target data 2712 via implementing some or all features and/or functionality of FIGS. 27A-27G (e.g. source data 2711 includes some or all fields of a given source record 2623 and/or target data 2712 includes some or all columns of a given target record 2422).

FIG. 26B illustrates an example logic flow performed to implement loading process 2605. Some or all features and/or functionality of the loading process 2605 of FIG. 26B can implement the loading process of FIG. 26A and/or any embodiment of loading process 2605 and/or corresponding loading of data to database system 10 described herein.

Each source can be defined with layout information as a unique alias SA(x) (e.g. each source record 2623 of a given source dataset 2601 having x records 2623 is defined via a unique alias SA, for example, indicating the source ID 2611 of the given source dataset 2601). Each target can be defined with layout information as unique alias TZ(y) (e.g. each source record 2623 of a given source dataset 2601 having x records 2623 is further defined via a unique alias TA, for example, indicating the target ID 2612 of the given target database table 2712 to which the source record 2623 is destined). Each record 2623 can be read from a given source dataset 2601 in conjunction with loading records of the source dataset 2601 (e.g. x source record 2623 are read from a given source dataset 2601 having x records 2623).

For each given target database table 2712, in reading each given record 2623 from one or more source datasets 2601 having records 2623 destined for the given target database table 2712 (e.g. y records total across one or more source datasets 2601 are destined for the given target database table, for example, based on all having target identifiers 2612 identifying the given target database table), fields are selected as necessary for the target and the transformation is applied to these selected fields as necessary for the target (e.g. based on applying the source layout information 2617 for the source dataset identified via the source ID 2611 of the given record 2623 and further applying the target layout information 2618 for the given target database table 2712) to produce the record 2422 for the given target alias TA(y) (e.g. denoting the given target database table 2712). This process can continue for each given target database table 2712, for example, until all data from all sources are read.

Figure 26C:
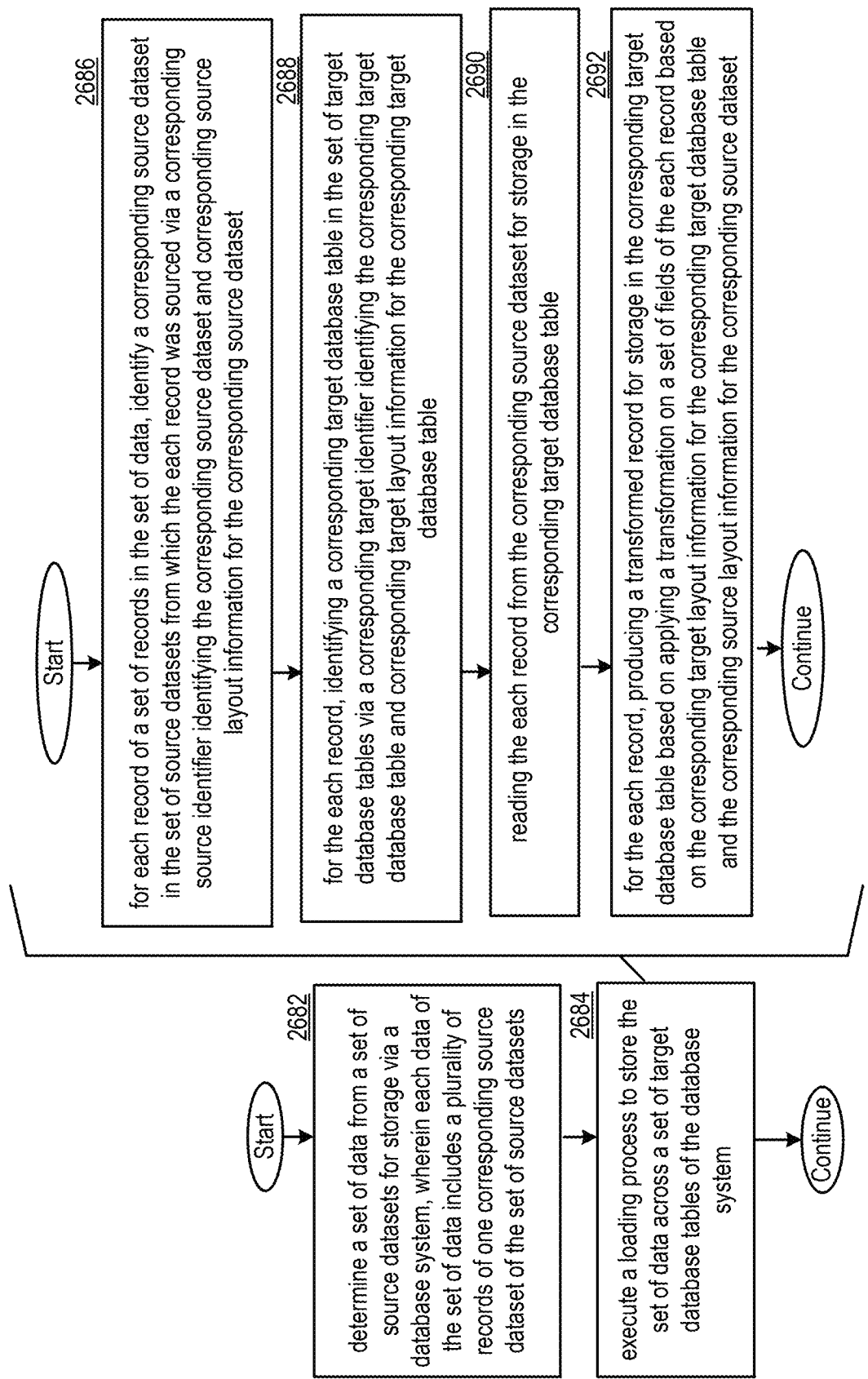
FIG. 26C is a logic diagram illustrating a method for execution in accordance with various embodiments.

FIG. 26C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26C, for example, based on participating in execution of a query being executed by the database system 10. Some or all of the method of FIG. 26C can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 26C based on implementing a corresponding plurality of processing core resources 48.1-48.W. Some or all of the steps of FIG. 26C can optionally be performed by any other one or more processing modules of the database system 10. Some or all of the steps of FIG. 26C can be performed to implement some or all of the functionality of the database system 10 as described in conjunction with FIGS. 26A-26C, for example, by implementing some or all of the functionality of record processing and storage system 2505, database storage system 2405, loading process 2605, record populator module 2620, and/or record transformation module 2625. Some or all steps of FIG. 26C can be performed by database system 10 in accordance with other embodiments of the database system 10 and/or nodes 37 discussed herein. Some or all of the steps of FIG. 26C can be performed in conjunction with performing some or all steps of any other method described herein.

Step 2682 includes determining a set of data from a set of source datasets for storage via a database system, wherein each data of the set of data includes a plurality of records of one corresponding source dataset of the set of source datasets. Step 2684 includes executing a loading process to store the set of data across a set of target database tables of the database system.

Performing step 2684 can include performing some or all of steps 2686, 2688, 2690, and/or 2692. For example, some or all of steps 2686, 2688, 2690, and/or 2692 are performed for each record of a set of records in the set of data. Step 2686 includes identifying a corresponding source dataset in the set of source datasets from which the each record was sourced via a corresponding source identifier identifying the corresponding source dataset and corresponding source layout information for the corresponding source dataset. Step 2688 includes identifying a corresponding target database table in the set of target database tables via a corresponding target identifier identifying the corresponding target database table and corresponding target layout information for the corresponding target database table. Step 2690 includes reading the each record from the corresponding source dataset for storage in the corresponding target database table. Step 2692 includes producing a transformed record for storage in the corresponding target database table based on applying a transformation on a set of fields of the each record based on the corresponding target layout information for the corresponding target database table and the corresponding source layout information for the corresponding source dataset.

In various examples, the corresponding source layout information for each corresponding source dataset in the set of source datasets indicates: structuring of records within the each corresponding source dataset utilized to read a corresponding plurality of source records from the each corresponding source dataset; and/or structuring of fields within the each corresponding source dataset utilized to identify corresponding values of the set of fields of the each record.

In various examples, the corresponding target layout information for each corresponding target database table in the set of target database tables indicates a set of columns of the each corresponding target database table. In various examples, applying the transformation to records of the plurality of records identifying the each corresponding target database table is based on populating the set of columns for the each of the records for storage in the each corresponding target table based on values of a set of fields of the each of the records.

In various examples, the set of source datasets includes a plurality of source datasets that each include corresponding plurality of source records. In various examples, the plurality of records includes a plurality of corresponding pluralities of source records across the plurality of source datasets.

In various examples, executing the loading process includes, for each source dataset of the set of source datasets, processing each source dataset by processing each of the corresponding plurality of source records included in the each source dataset based on: identifying the corresponding source dataset; identifying the corresponding target database table; and/or reading each of the corresponding plurality of source records.

In various examples, a first source dataset of the set of source datasets includes a first corresponding plurality records that includes a first number of records. In various examples, a second source dataset of the set of source datasets includes a second corresponding plurality records that includes a second number of records. In various examples, the first number of records is different from the second number of records.

In various examples, a first source dataset of the set of source has first corresponding source layout information. In various examples, a second source dataset of the set of source datasets has second corresponding source layout information. In various examples, the first corresponding source layout information is different from the second corresponding source layout information.

In various examples, the first corresponding source layout information is different from the second corresponding source layout information based on the first source dataset having a first set of fields, the second source dataset having a second set of fields, and/or the first set of fields being different from the second set of fields. In various examples, the first set of fields is different from the second set of fields based on: the first set of fields having a different number of fields from the second set of fields; at least some of first set of fields having different data types from the second set of fields; the first set of fields having a different ordering from the second set of fields; and/or the first set of fields having a first set of names different from a second set of names of the second set of fields.

In various examples, the method further includes receiving each of the set of source datasets. In various examples, the first corresponding source layout information is different from the second corresponding source layout information based on the first source dataset being received from a first source location storing the first source dataset and the second source dataset being received via accessing a second source location storing the second source dataset. In various examples, the first source location is different from the second source location. In various examples, the first corresponding source layout information is different from the second corresponding source layout information based on the first source dataset being received via a first data input mechanism and the second source dataset being received based on being sent via a second data input mechanism, wherein the first data input mechanism is different from the second data input mechanism.

In various examples, the first corresponding source layout information is different from the second corresponding source layout information based on the first source dataset being received via the first data input mechanism and the second source dataset being received based on being sent via the second data input mechanism. In various examples, the first data input mechanism corresponds to a file-based data input mechanism based on the first source dataset being received in at least one file. In various examples, the second data input mechanism corresponds to a stream-based data input mechanism based on the second source dataset being received in at least one data stream.

In various examples, the stream-based data input mechanism is implemented utilizing a Kafka stream application (e.g. via implementing Apache Kafka).

In various examples, the set of source datasets includes a plurality of target database tables. In various examples, each target database table of the plurality of database target tables has a corresponding plurality of target records identified for storage in the each target database table. In various examples, the plurality of records includes a plurality of corresponding pluralities of target records across the plurality of target database tables.

In various examples, executing the loading process includes, for each target database table of the set of target database tables, identifying the corresponding plurality of target records for storage in the each target database table based on identifying ones of the plurality of records having the corresponding target identifier, and, for each of the corresponding plurality of target records identified for storage in the each target database table: identifying set of fields; and/or applying the transformation to the set of fields to produce a corresponding transformed record for storage.

In various examples, a first target database table of the set of target database tables has first corresponding target layout information. In various examples, a second target database table of the set of target database tables has second corresponding target layout information. In various examples, the first corresponding target layout information is different from the second corresponding target layout information based on the first target database table having a first set of columns, the second target database table having a second set of columns, and the first set of columns being different from the second set of columns. In various examples, the first set of columns is different from the second set of columns based on: the first set of columns having a different number of columns from the second set of columns; at least some of first set of columns having different data types from the second set of columns; the first set of columns having a different ordering from the second set of columns; and/or the first set of columns having a first set of names different from a second set of names of the second set of columns.

In various examples, executing the loading process to store the set of data across the set of target database tables of the database system is further based on selecting, for the each record, the set of fields as a subset of a plurality of fields of the each record based on processing the corresponding target layout information for the corresponding target database table and the corresponding source layout information for the corresponding source dataset to determine ones of the plurality of fields corresponding to columns of a set of columns of the corresponding target database table.

In various examples, executing the loading process is further based on: maintaining load error tracking data in accordance with error handling configuration data; when a record-level error occurs during processing of a corresponding record of the set of data, updating the load error tracking data to indicate the record-level error for the corresponding record and/or foregoing further processing of the corresponding record and proceeding with processing of a next record of the set of data; when a file-level error occurs during processing of a corresponding file of the set of data, updating the load error tracking data to indicate the file-level error for the corresponding file; and/or foregoing further processing of the corresponding file and proceeding with processing of a next file of the set of data; and/or communicating the load error tracking data for access by a user entity.

In various examples, the method further includes segregating a plurality of files of the set of data into a plurality of work units based on a work unit target size. In various examples, the loading process is performed via a set of parallelized loading modules to process the plurality of work units for storage in the database system via processing a plurality of sets of loading batches that collectively include the plurality of work units based on, for each set of loading batches of the plurality of sets of loading batches: selecting the each set of loading batches of the plurality of sets of loading batches based on selecting each loading batch of the each set of loading batches based on a corresponding target number of work units per batch determined for the each set of loading batches; assigning the each set of loading batches for processing by the set of loading modules based on assigning the each loading batch to a corresponding one of the set of loading modules; and/or in response to processing of a first loading batch of the set of loading batches being completed by a corresponding one of the set of loading modules, when at least one work unit of the plurality of work units has not yet been included in any loading batch assigned to any of the set of loading modules, initiating selection and assignment of a subsequent set of loading batches of the plurality of sets of loading batches.

In various examples, the method further includes: generating a plurality of subtasks for processing a corresponding plurality of portions of the set of data via a load type-based subtask generation process based on a load type of the set of source datasets; and/or assigning each of the plurality of subtasks to a corresponding node of a plurality of nodes of the database system for execution. In various examples, the loading process is executed based on execution of the plurality of subtasks via the plurality of nodes based on the plurality of nodes applying at least one of: a node availability handling strategy or a load error handling strategy.

In various embodiments, any one of more of the various examples listed above are implemented in conjunction with performing some or all steps of FIG. 26C. In various embodiments, any set of the various examples listed above can be implemented in tandem, for example, in conjunction with performing some or all steps of FIG. 26C, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26C, for example, in conjunction with further implementing any one or more of the various examples described above.

In various embodiments, the operational instructions, when executed by the at least one processor, cause the database system to determine a set of data from a set of source datasets for storage via a database system, wherein each data of the set of data includes a plurality of records of one corresponding source dataset of the set of source datasets and execute a loading process to store the set of data across a set of target database tables of the database system based on, for each record of a set of records in the set of data: identifying a corresponding source dataset in the set of source datasets from which the each record was sourced via a corresponding source identifier identifying the corresponding source dataset and corresponding source layout information for the corresponding source dataset; identifying a corresponding target database table in the set of target database tables via a corresponding target identifier identifying the corresponding target database table and corresponding target layout information for the corresponding target database table; reading the each record from the corresponding source dataset for storage in the corresponding target database table; and/or producing a transformed record for storage in the corresponding target database table based on applying a transformation on a set of fields of the each record based on the corresponding target layout information for the corresponding target database table and the corresponding source layout information for the corresponding source dataset.

FIGS. 27A-27G illustrate embodiments of a record transformation module 2625 that generates target data from source data via applying transformation graph data. Some or all features and/or functionality of the record transformation module 2625 of FIGS. 27A-27G can implement any embodiment of record transformation module 2625, record processing and storage system 2505 and/or loading process 2605 described herein. Some or all features and/or functionality of processing source data to generate and store transformed data of FIGS. 27A-27G can implement any receipt, processing, transformation, loading, and/or storage of data described herein. Some or all features and/or functionality of FIGS. 27A-27G can implement any embodiment of database system 10 described herein.

In various embodiments, loading data into database system 10 involves reading data from different sources having different encodings, different endianness, and/or different charset than the target platform. In addition, transformation operations may be parts of the loading process.

In some embodiments, information regarding the encoding, endianness, and/or charset (or other information regarding the layout/configuration data) can be denoted as source layout information 2617 for a corresponding source. In some embodiments, this information regarding the encoding, endianness, and/or charset (or other information regarding the layout/configuration data) can be provided via a corresponding user entity (e.g. configured via user input), for example, where source layout information 2617 is optionally configured via user input. The information regarding the encoding, endianness, and/or charset can otherwise be indicated in corresponding information, for example, with corresponding details with details about the format that should be loaded and/or some additional input options.

In some embodiments, minimal user input/predetermined information is provided for transformation operations that may be required in transforming source data to target data. However, most transformation operations rely on arguments with a specific type, which often require an additional transformation operation (e.g. type casts). The same applies if no transformation operations are specified, but source data needs to be converted to match the databases target format (e.g. based on source layout information 2617 and target layout information 2618 for the respective source and target).

FIGS. 27A-27G present embodiments of a database system 10 that handles such transformations required in loading source data to a target table via implementing a record transformation module 2625 that applies transformation graph data 2715 to convert given source data 2711 to corresponding target data 2712.

Figure 27A:
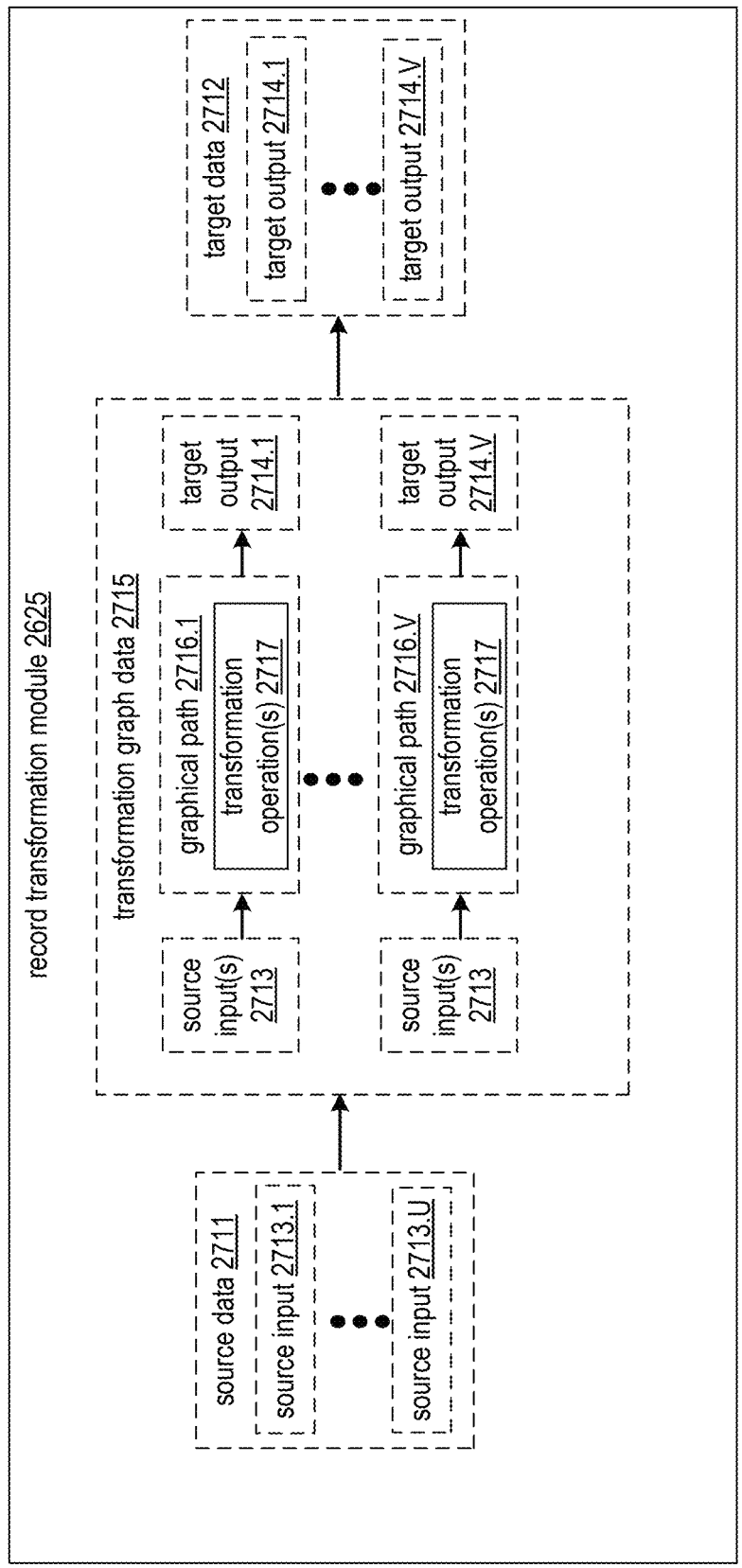
FIG. 27A is a schematic block diagram of a record transformation module that generates target data from source data via applying transformation graph data that includes a plurality of transformation operations in at least one graphical path in accordance with various embodiments.

As illustrated in FIG. 27A, transformation graph data 2715 can be implemented via one or more graphical paths 2716.1-2716.V, each indicating a graphical arrangement of particular transform operations 2717 indicating ordering in which the transform operations 2717 be applied to one or more source inputs 2713 of the source data 2711 to render generation of a given target output 2714.

A given target output 2714 can be a function of a single source input 2713 or multiple source inputs 2713. A given source input 2713 can optionally be involved in generating multiple different target outputs 2714 as input to multiple different graphical paths 2716. Alternatively, in some embodiments, a given source input 2713 is only ever input to no more than one target output 2714.

In some embodiments, the source data 2711 can be implemented as a given source record 2623, a particular portion of a source record 2623 (e.g. one or more given fields of source record 2623). In some embodiments, the source data 2711 can have one or more source inputs 2713.1-2713.U (e.g. some or all inputs 2723 corresponding to one or more different values of different fields for the given record 2623 being transformed, and/or some or all inputs 2723 correspond to constant values).

In some embodiments, the target data 2712 can be implemented as a given target record 2422 and/or a particular portion of a given target record 2422 (e.g. one or more given columns of target record 2422). In some embodiments, the target data 2712 can have one or more target outputs 2714.1-2714.V (e.g. some or all outputs 2724 corresponding to one or more different values of different columns for the given record 2422 being generated). V can be the same or different from U. V and/or U can be equal to one, or can be greater than one.

In some embodiments, given transformation graph data 2715 corresponds to a particular arrangement of transformation operations 2717 for implementing a particular transformation (j,k) transforming source data 2711 (e.g. records 2623) of a given source dataset 2601.j to target data 2712 (e.g. records 2422) of a given target database table 2712k, in accordance with their respective source layout information 2617.j and target layout information 2618k, respectively. Different transformation graph data 2715 can be generated to implement respective transformations for other source datasets and/or other target tables.

Figure 27B:
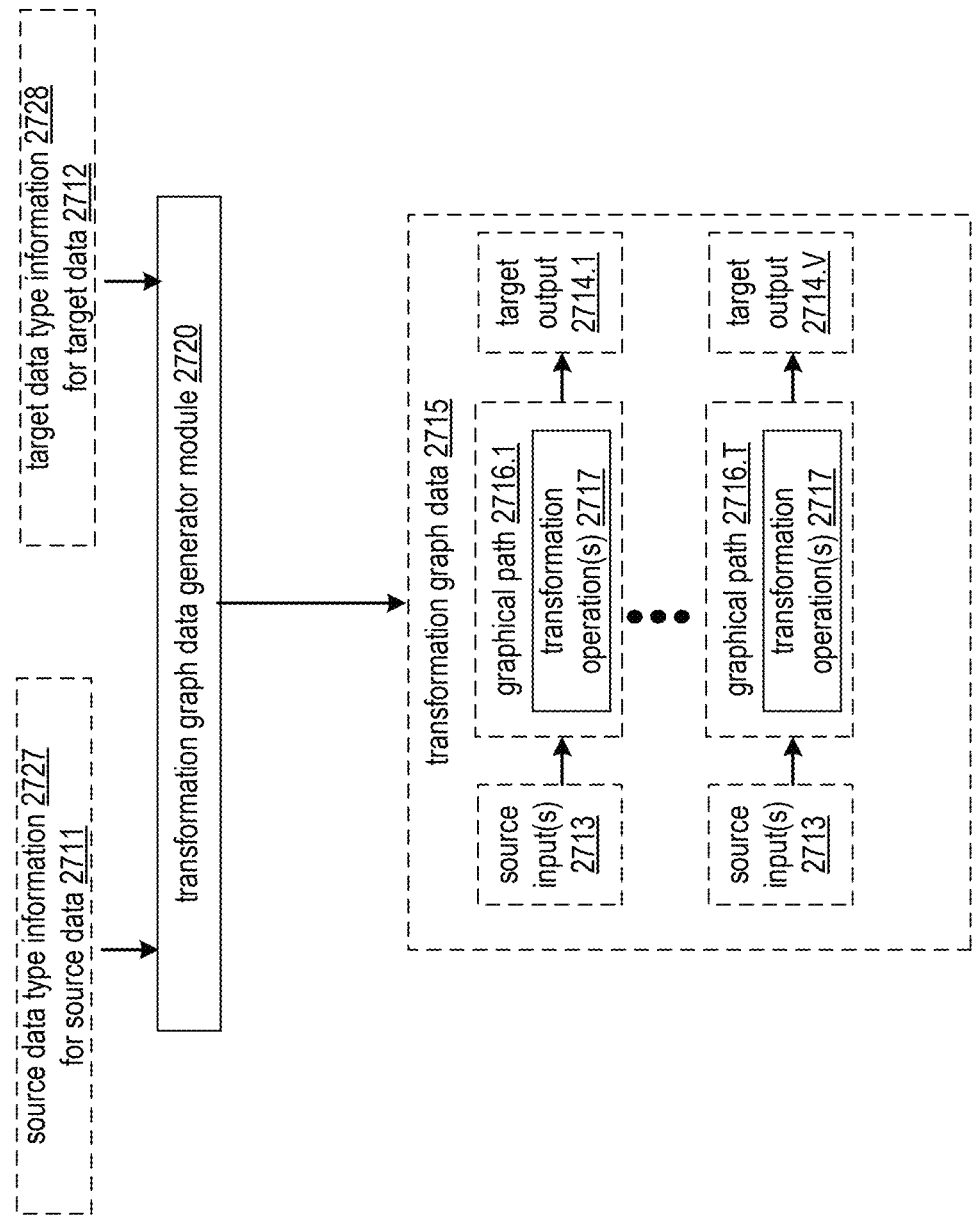
FIG. 27B is a schematic block diagram of a transformation graph data generator module that generates transformation graph data based on source data type information and target data type information in accordance with various embodiments.

As illustrated in FIG. 27B, a transformation graph data generator module 2720 can be implemented to generate transformation graph data 2715 based on source data type information 2727 for source data 2711 (e.g. data type for each target input 2713) and target data type information 2728 for target data 2712 (e.g. data type for each target output 2714). The source data type information 2727 and/or the target data type information 2728 can be configured via user input and/or can otherwise be determined (e.g. for a given source dataset and/or given target table). The source data type information 2727 can optionally be included in and/or can optionally be implemented in a same or similar fashion as source layout information 2617, where the source data type information 2727 optionally corresponds to a given source dataset 2601. The target data type information 2728 can optionally be included in and/or can optionally be implemented in a same or similar fashion as target layout information 2618, where the target data type information 2728 optionally corresponds to a given target database table 2712.

Figure 27C:
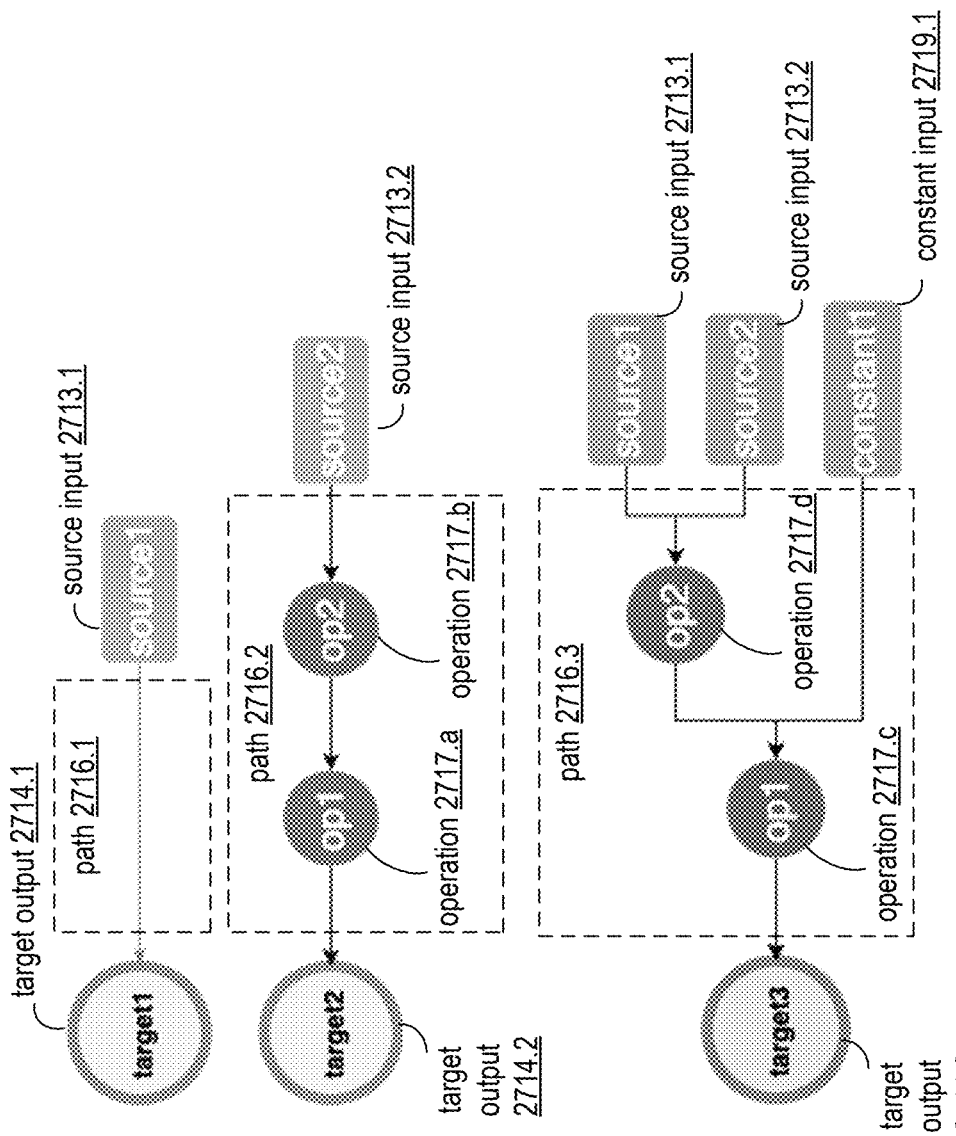
FIG. 27C illustrates example transformation graph data that includes a plurality of graphical paths from source input to target output in accordance with various embodiments.

FIG. 27C illustrates example graphical paths 2716 of one or more transformation graph data 2715. A given graphical path 2716 can define the path from source to target as a graph, which might have multiple graph nodes along the path representing corresponding transformation operations. Example path 2617.1 has no nodes, denoting no transformation operations 2717 are required to generate target output 2714.1 from source input 2713.1 (e.g. set target output 2714.1 as source 2713.1). Example path 2617.2 includes two serialized graphical nodes denoting serial performance of operations 2717.b and 2717.a upon source input 2713.2 to render target output 2714.2 (e.g. target output 2712.2 equals operation_a(operation_b(source input 2713.2))). As transformation operations might use more than one input, the graph can expand and become a tree of nodes, as illustrated in example path 2713.3 from source inputs 2713.3 and 2713.4 to target output 2714.3 via tree arrangement of graphical nodes for operations 2717.c and 2717.d (e.g. target output 2717.3 equals operation_c (operation_d (source input 2717.3, source input 2717.4), constant input 2719.1)).

The source inputs 2713.1 and 2714.2 for path 2716.3 can optionally be implemented as source inputs 2713.1 and 2713.2 of paths 2716.1 and 2716.2, respectively (e.g. based on source inputs 2713.1 and 2714.2 being "reused" in generating target output 2714.3 in addition to being used to generate target outputs 2714.1 and 2714.2, respectively). Alternatively, the source inputs 2713.1 and 2714.2 for path 2716.3 are optionally different from source inputs 2713.1 and 2714.2 of paths 2716.1 and 2716.2, respectively (e.g. are some different source inputs 2717.3 and 2717.4 based on none of the source inputs being "reused" in generating multiple target outputs).

Figure 27D:
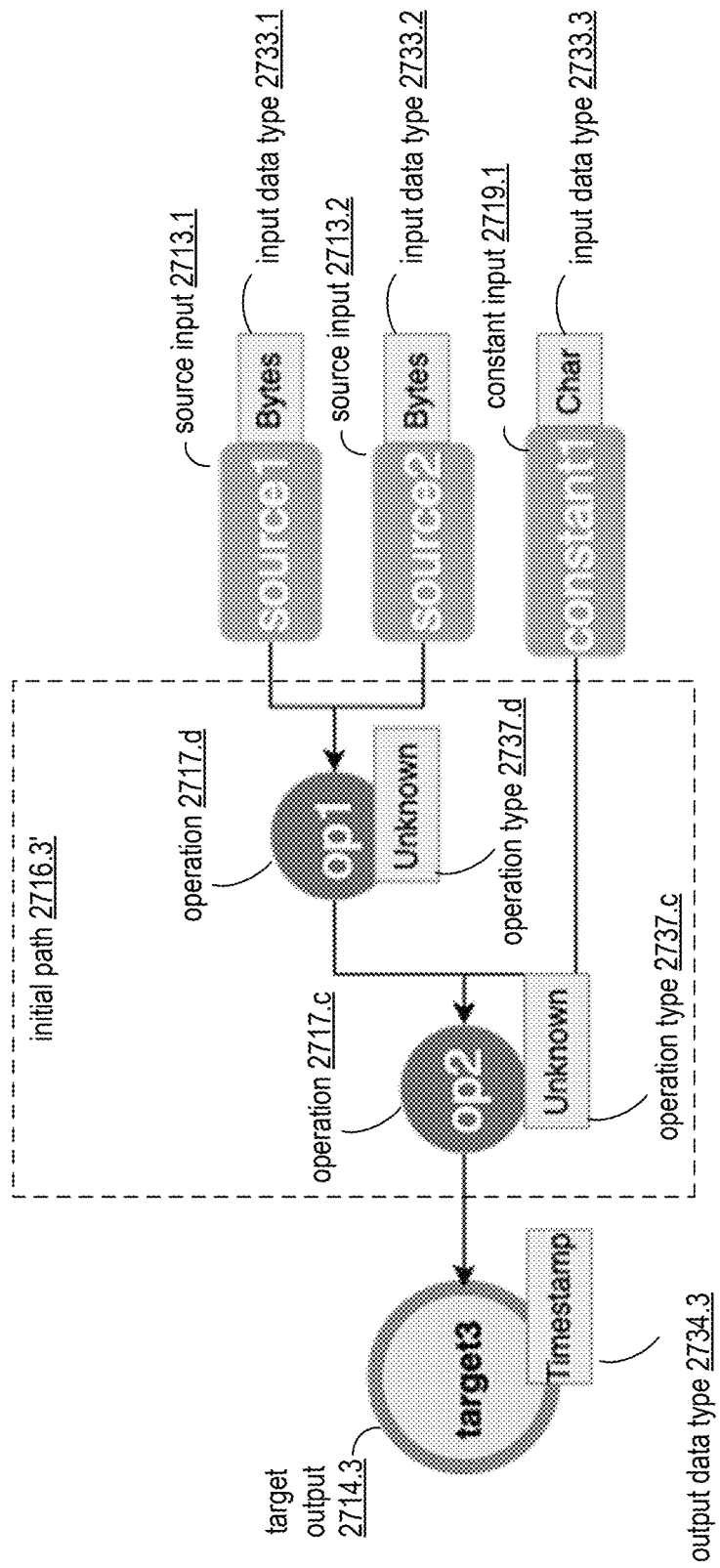
FIG. 27D illustrates example initial transformation graph data that includes an initial graphical path having a plurality of operations of unknown operation type in accordance with various embodiments.

FIG. 27D illustrates initial transformation graph data 2715' which can be ultimately transformed into transformation graph data 2715. For example, within a given path 2716, initially, only the types for the graph node representing the target (e.g. a column) and the source(s) (e.g. one or more corresponding fields in the source data) are typically known (E.g. indicated in the target data type information 2728 and source data type information 2727 respectively). Corresponding operation type information can be attached to every graph node along the path. Initially, they can be UNKNOWN (e.g. "missing" due to not yet being assigned). Each graph node along the patch can further have a corresponding identifier (e.g. name, such as "op1" and "op2" or other identifying names). The transformation graph data generator module 2720 can be implemented to generate each graphical path 2716 from corresponding initial paths based on selecting the operator types for any unknown operator types, which can optionally involve setting a given operator having a missing type as multiple operators required to fulfil the corresponding transformation from input to output).

In the example of FIG. 27D, initial path 2713.3' (e.g. corresponding to an initial path created for graphical path 2713.3 of FIG. 27C) indicates that: input data type 2733.1 for source input 2713.1 corresponds to a bytes data type; input data type 2733.2 for source input 2713.2 also corresponds to the bytes data type; input data type 2733.3 for constant input 2719.1 corresponds to a char data type; output data type 2734.3 for target output 2713.2 corresponds to a timestamp data type; operation type 2737.c for operation 2717.c is unknown (e.g. missing); operation type 2737.d for operation 2717.d is also unknown (e.g. missing).

Figure 27E:
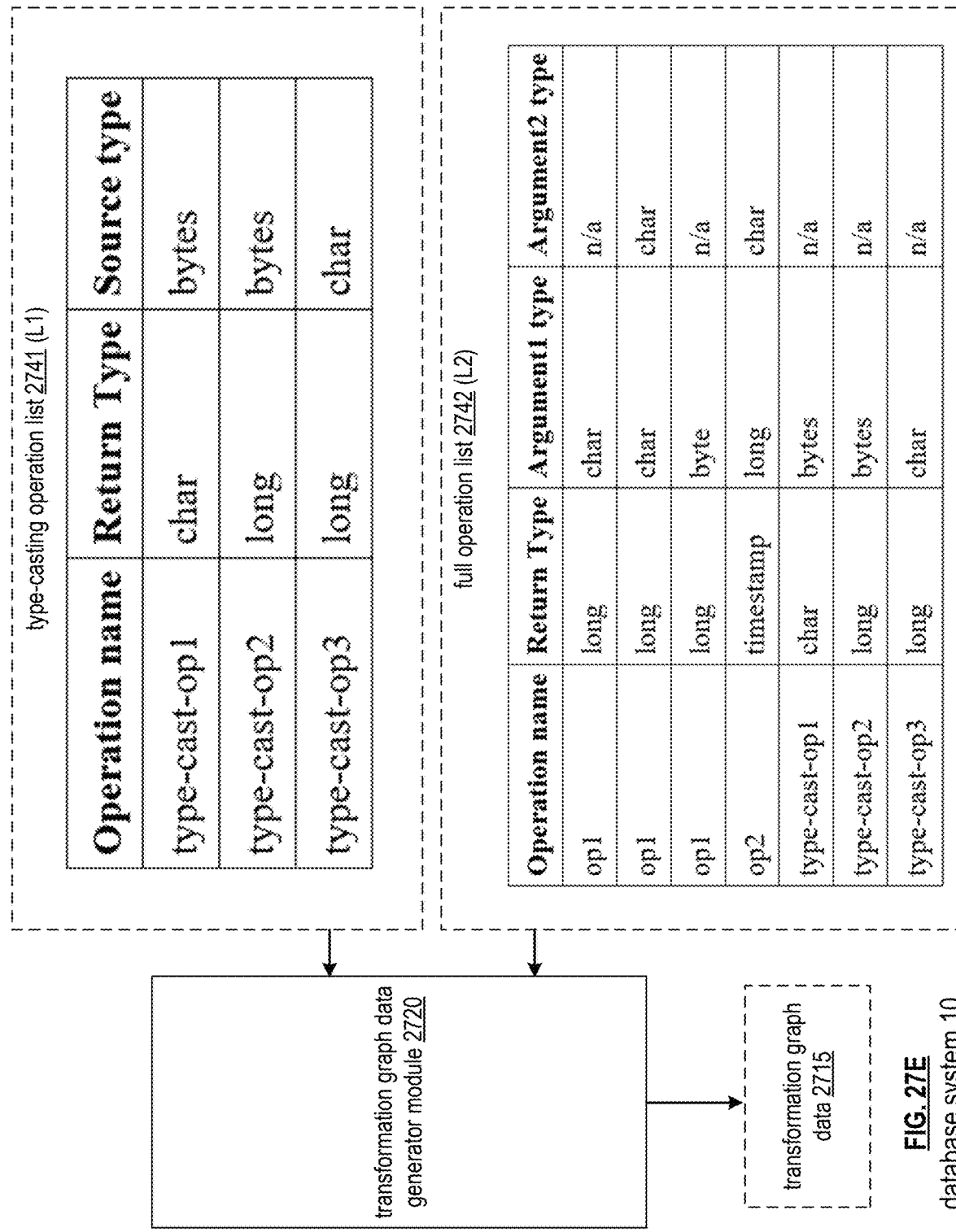
FIG. 27E is a schematic block diagram of a transformation graph data generator module that generates transformation graph data based on an example type-casting operation list and an example full operation list in accordance with various embodiments.

FIG. 27E illustrates an embodiment of transformation graph data generator module 2720 that generates transformation graph data 2715 via applying a type-casting operation list 2741 (L1) and/or a full operation list 2742 (L2). List L1 can contains operations that use argument only and can be used to transition from a source data type to a target data type. The list 2741 of FIG. 27E can correspond to an example list L1, where other embodiments include different lists (e.g. longer lists with more operations and/or operations having different names). A second list (L2) can contain all operations that are supported by the loading system (e.g. including the operations of the first list). Note that some operations (e.g. op1) are duplicated based on having a given return type, despite having different "versions" supporting different input arguments.

For example, the transformation graph data generator module 2720 can determine the missing operations op1 and op2 of FIG. 27D based on these lists. For example, operation 2717.c is ultimately selected as performance of operation op2 having return type timestamp and arguments 1 and 2 of type long and char; and/or operation 2717.d is ultimately selected as performance of an arrangement of three operations: (1) operation op1 having return type long (e.g. to render generation of input for the selected operation op2 based on op2 requiring the long type as its input) and arguments 1 and 2 of type char and char, which is applied to two char inputs generated via two additional operations (2) and (3): (2) a type-cast-op-1 applied to source input 2713.1, based on source input 2713.1 having the byte input type required as source type of type-cast-op-1, to generate first char input to op1 as its output; (3) type-cast-op-1 applied to source input 2713.2, based on source input 2713.2 having the byte input type required as source type of type-cast-op-1, to generate first char input to op1 as its output.

Figure 27F:
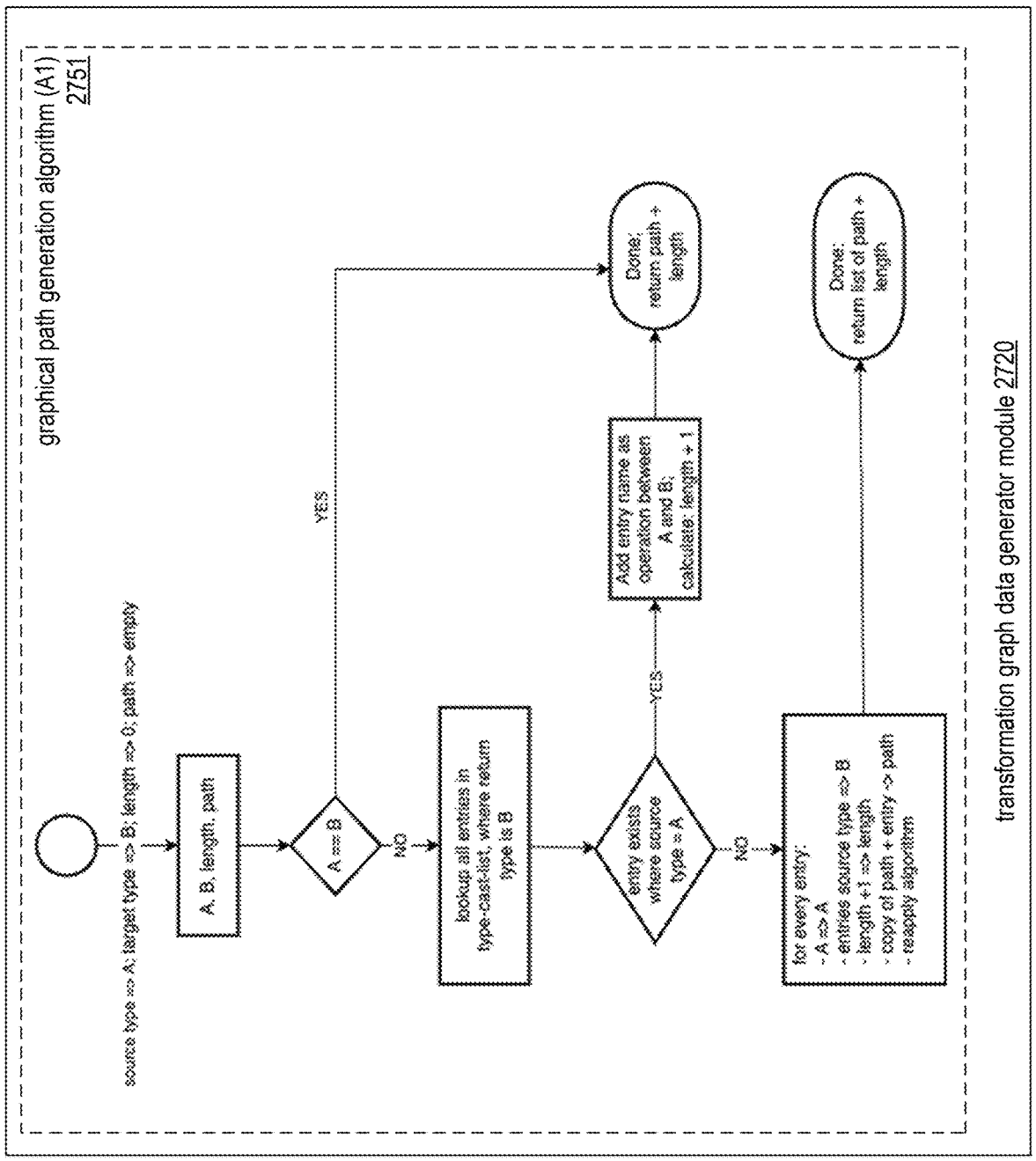
FIG. 27F illustrates an example logical flow of a graphical path generation algorithm implemented by transformation graph data generator module in accordance with various embodiments.
Figure 27G:
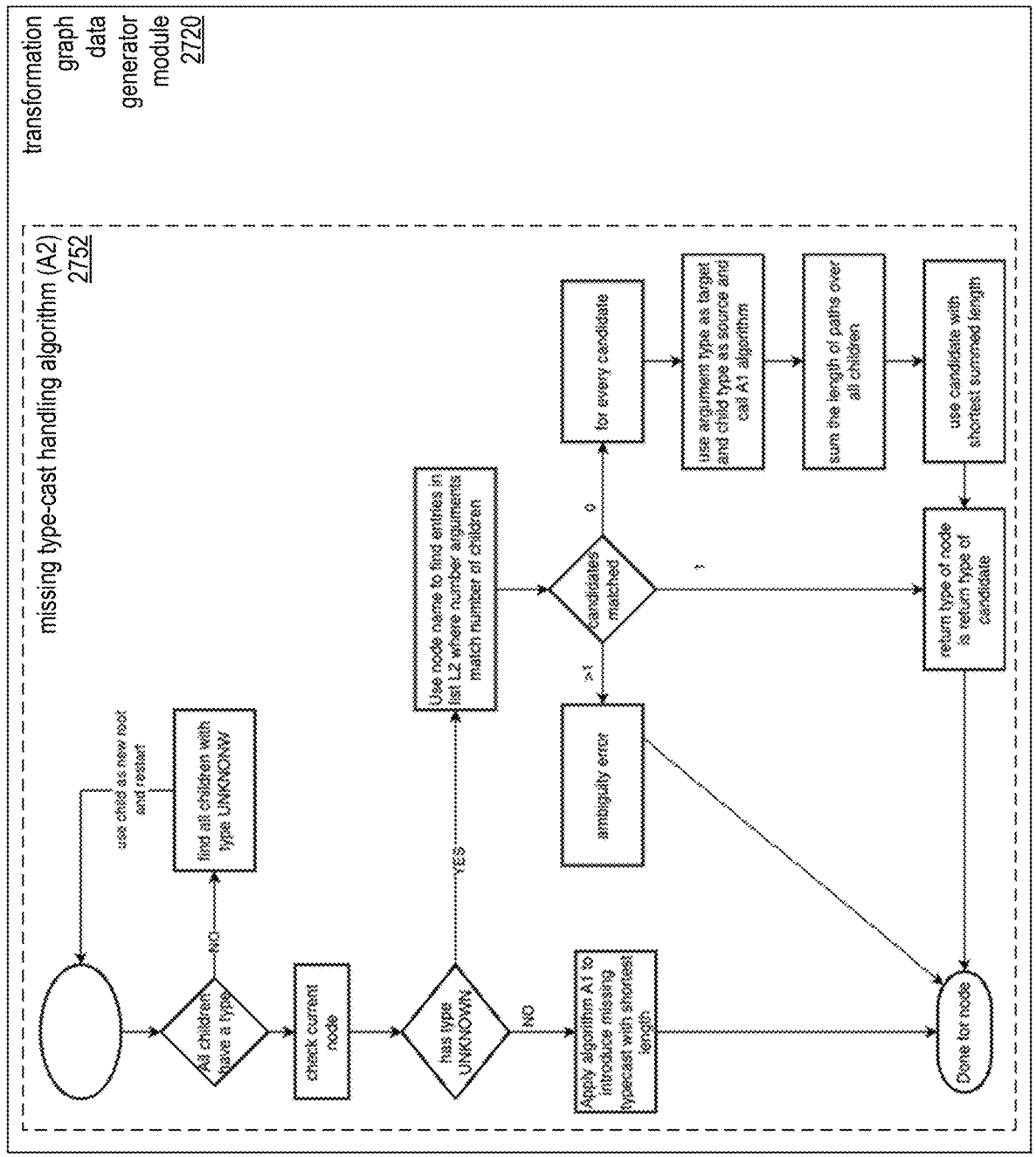
FIG. 27G illustrates an example logical flow of a missing type-cast handling algorithm implemented by transformation graph data generator module in accordance with various embodiments.

Generating some or all graphical paths 2716 (and populating any unknown operators with one or more operators from list L1 and/or L2 can generated via transformation graph data generator module 2720 based on performing a set of corresponding algorithms, which can include executing some or all logic of a graphical path generation algorithm 2751 (A1) of FIG. 27F and/or executing some or all logic of a missing type-cast handling algorithm 2762 (A2) of FIG. 27G.

A graphical path generation algorithm 2751 can be executed via performing some or all logic of algorithm A1 of FIG. 27F to generate a list of paths each having a corresponding length (e.g. via a corresponding recursive process). This graphical path generation algorithm A1 can be performed to generate an initial path 2716 from given source input(s) 2713 having some known type A to given target output 2714 having some known type B (e.g. having known data types dictated by source data type information 2727 and/or target data type information 2728). The path in the list having the shortest length can be selected as the initial path 2716' from the given source input to given target output. The returned path can have some or all operator nodes set as type UNKNOWN.

A missing type-cast handing algorithm 2752 can be executed via performing some or all logic of algorithm A2 FIG. 27G to process an initial path 2716' (e.g. selected via execution of graphical path generation algorithm 2751 of FIG. 27F) to introduce missing typecasts for nodes with unknown type to render generation of the corresponding graphical path no longer having unknown types, which can be implemented as graphical path 2716 in transformation graph data 2715 applied via record transformation module 2625 accordingly.

Performing the missing type-cast handing algorithm 2752 can include, first, starting at the top graph node of the given input path (e.g. initial path 2716') to find all children nodes with UNKNOWN type, where the child as new top (e.g. restart). When all children have a type, and when the current node has a type algorithm A1 is applied to introduces missing typecasts with shortest length. When the current node has UNKNOWN type, node name can be utilized to lookup candidates in list (L2), where number of arguments match the number of children. In this lookup, if only one candidate matches where arguments have same type as children nodes, the return type of node is the return type of the candidate; if multiple candidates match, then error out, and if no candidates match, then for every candidate: (1) use the arguments type and the children's type and apply A1 algorithm; (2) sum the length of introduced typecast over all children; (3) compare the summed lengths for each candidate, where candidate with lowest summed length wins; and (4) set the return type of this node to the return type of the candidate.

Figure 27H:
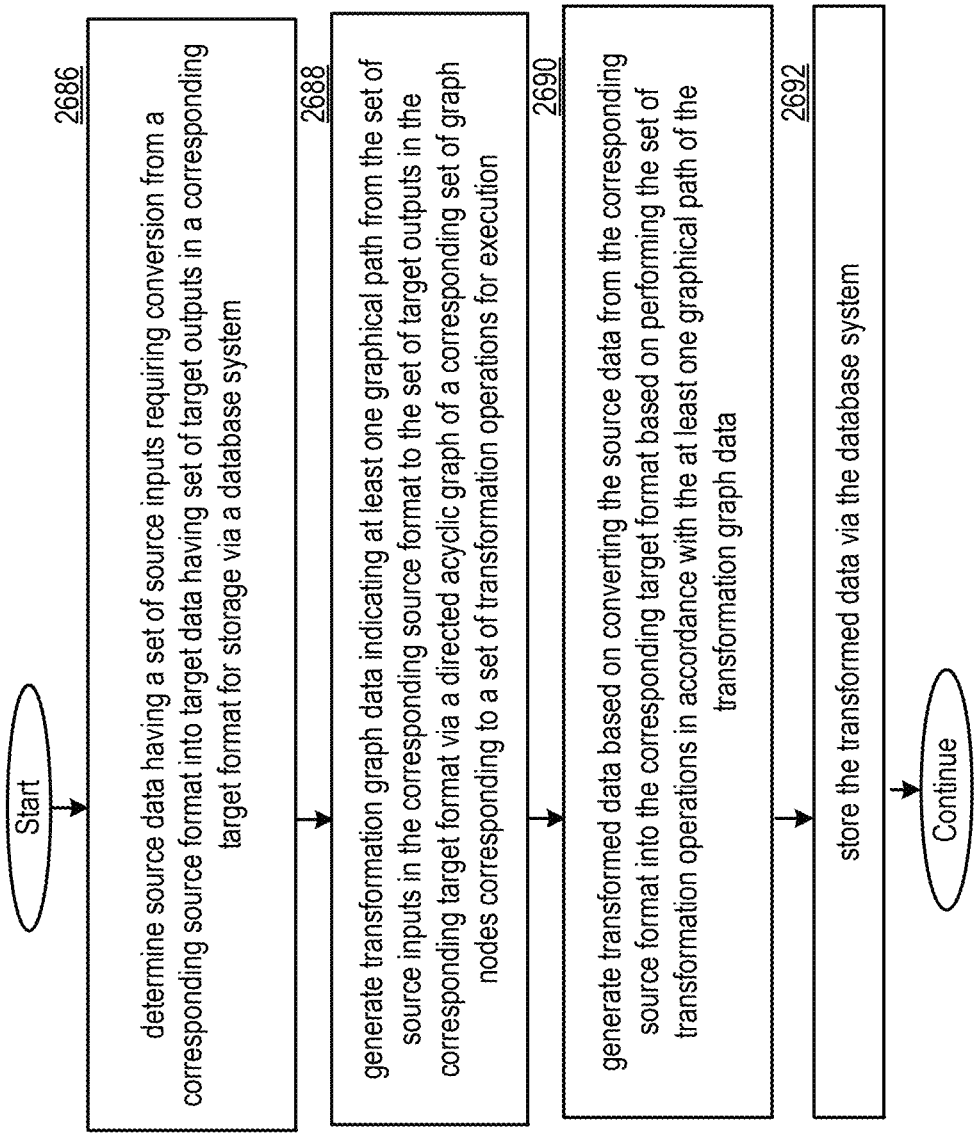
FIG. 27H is a logic diagram illustrating a method for execution in accordance with various embodiments.

FIG. 27H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27H, for example, based on participating in execution of a query being executed by the database system 10. Some or all of the method of FIG. 27H can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 27H based on implementing a corresponding plurality of processing core resources 48.1-48.W. Some or all of the steps of FIG. 27H can optionally be performed by any other one or more processing modules of the database system 10. Some or all of the steps of FIG. 27H can be performed to implement some or all of the functionality of the database system 10 as described in conjunction with FIGS. 27A-27G, for example, by implementing some or all of the functionality of record processing and storage system 2505, record transformation module 2625, the transformation graph data 2715, transformation graph data generator module 2720, loading process 2605, graphical path generation algorithm 2751, and/or typecast function determination algorithm A2. Some or all steps of FIG. 27H can be performed by database system 10 in accordance with other embodiments of the database system 10 and/or nodes 37 discussed herein. Some or all of the steps of FIG. 27H can be performed in conjunction with performing some or all steps of any other method described herein.

Step 2782 includes determining source data having a set of source inputs requiring conversion from a corresponding source format into target data having set of target outputs in a corresponding target format for storage via a database system. Step 2784 includes generating transformation graph data indicating at least one graphical path from the set of source inputs in the corresponding source format to the set of target outputs in the corresponding target format via a directed acyclic graph of a corresponding set of graph nodes corresponding to a set of transformation operations for execution. Step 2786 includes generating transformed data based on converting the source data from the corresponding source format into the corresponding target format based on performing the set of transformation operations in accordance with the at least one graphical path of the transformation graph data. Step 2788 includes storing the transformed data via the database system.

In various examples, the transformation graph data indicates a graphical path of the at least one graphical path from a single ones of the set of source inputs to a single one of the set of target outputs.

In various examples, the transformation graph data indicates a graphical path of the at least one graphical path from multiple ones of the set of source inputs to a single one of the set of target outputs.

In various examples, the transformation graph data indicates a graphical path of the at least one graphical path to at least one of the set of target outputs from a set of inputs that includes: at least one of the set of source inputs; and/or at least one constant value.

In various examples, the corresponding source format is based on each of the set of source inputs having a corresponding data type. In various examples, the corresponding target format is based on each of the set of target outputs having a corresponding data type. In various examples, the transformed data is generated based on converting data type of at least one of the set of source inputs into a corresponding one of the set of target outputs based on data type conversion being performed via corresponding execution of at least one of the set of transformation operations.

In various examples, the set of transformation operations includes a set of type-cast operations each having a single corresponding argument of a corresponding first data type. In various examples, output generated via execution of each of the set of type-cast operations has a corresponding second data type converted from the corresponding first data type.

In various examples, the set of transformation operations includes a set of multi-argument operations each having multiple corresponding arguments each having a corresponding input data type. In various examples, output generated via execution of each of the set of the multi-argument operations has a corresponding output data type generated via processing the multiple corresponding arguments.

In various examples, generating the transformation graph data is based on, for each target output of the set of target outputs: determining a set of possible graphical paths of transformation operations to the each target output from a corresponding at least one source input of the set of source inputs; and/or selecting a shortest length path of the set of possible graphical paths for inclusion in the transformation graph data as a corresponding graphical path from the corresponding at least one source input to the each target output.

In various examples, generating the transformation graph data is based on determining each of a set of sub-paths included in the at least one graphical path based on determining the each of the set of sub-paths as a corresponding sub-path from a given source node to a given target node based on determining a set of possible graphical paths to implement the each of the set of sub-paths from the given source node to the given target node for inclusion in the transformation graph data. In various examples, determining the set of possible graphical paths to implement the each of the set of sub-paths from the given source node to the given target node for inclusion in the transformation graph data is based on generating initialized path data from the given source node to the given target node that includes: a source data type initialized as a corresponding source data type of the given source node; a target data type initialized as a corresponding target data type of the given target node; a path length for a given possible graphical path initialized as zero; and/or a path corresponding to the given possible graphical path initialized as an empty set of graph nodes. In various examples, determining the set of possible graphical paths to implement the each of the set of sub-paths from the given source node to the given target node for inclusion in the transformation graph data is further based on performing a graphical path generation algorithm upon the initialized path data. In various examples, the graphical path generation algorithm is configured to process input path data based on: determining whether the source data type is the same as the target data type; when the source data type is the same as the target data type, returning the path data; and/or, when the source data type is not the same as the target data type: determining a set of possible type-cast operations having an output data type corresponding the target data type; and determining whether any of the set of possible type-cast operations has an input argument data type corresponding to the source data type. In various examples, the graphical path generation algorithm is configured to process input path data further based on, when the source data type is not the same as the target data type and when one of the set of possible type-cast operations has the input argument data type corresponding to the source data type: updating the path length of the path data as one and updating the path of the path data to include the one of the set of possible type-cast operations; and returning the path data. In various examples, the graphical path generation algorithm is configured to process input path data further based on, when the source data type is not the same as the target data type and when none of the set of possible type-cast operations has the argument data type corresponding to the source data type, generating, for each of the set of possible type-cast operations having an output data type corresponding the target data type, updated path data from the input path data and recursively reapplying the graphical path generation algorithm upon the updated path data generated for the each of the set of possible type-cast operations. In various examples, the updated path data is generated from the input path data to include: the source data type set as the source data type of the input path data; the target data type set as a corresponding input argument data type of the each of the set of possible type-cast operations; the path length set as one more than the path length of the input path data; and/or the path set as the path of the input path data appended with the each of the set of possible type-cast operations. In various examples, the set of possible graphical paths includes paths indicated by all path data returned via performance of the graphical path generation algorithm upon the initialized path data.

In various examples, generating the transformation graph data includes: generating initial transformation graph data that indicating at least one initial graphical path from the set of source inputs in the corresponding source format to the set of target outputs in the corresponding target format via an initial corresponding set of graph nodes that includes at least one node corresponding to a transformation operation of an unknown type; and/or generating updated transformation graph data that indicating the at least one initial graphical path from the set of source inputs in the corresponding source format to the set of target outputs in the corresponding target format via the corresponding set of graph nodes based on determining a corresponding transformation operation type for the at least one node of the initial transformation graph data.

In various examples, generating the updated transformation graph data includes performing a missing type-cast handling algorithm upon each initial graphical path of the initial transformation graph data having a top node initialized as a last operator serially after all other operators in the initial graphical path configured to emit corresponding target output. In various examples, the missing type-cast handling algorithm is configured to process an input graphical path based on determining whether any child nodes the top node, corresponding to transformation operations performed serially before the top node, of the input graphical path corresponds to the transformation operation of the unknown type. In various examples, the missing type-cast handling algorithm is configured to process an input graphical path based on, when at least one child node corresponds to the transformation operation of the unknown type: determining an updated graphical path for each child node in the at least one child node that includes the child node as the top node; and/or recursively reapplying the missing type-cast handling algorithm upon the updated graphical path for the each child node. In various examples, the missing type-cast handling algorithm is configured to process an input graphical path based on, when no child node corresponds to the transformation operation of the unknown type: determining whether the top node corresponds to the transformation operation of the unknown type; when the top node does not correspond to the transformation operation of the unknown type, performing a graphical path generation algorithm upon path data corresponding to the top node to determine a corresponding sub-path to implement the top node; and, when the top node corresponds to the transformation operation of the unknown type, determining a set of possible operations having a number of arguments matching a number of child nodes in a set of child nodes of the top node. In various examples, the missing type-cast handling algorithm is configured to process an input graphical path further based on, when no child node corresponds to the transformation operation of the unknown type, when the top node corresponds to the transformation operation of the unknown type, and when exactly one of the set of possible operations has a corresponding set of arguments having a corresponding argument types matching data types for the set of child nodes: setting the exactly one of the set of possible operations to implement the top node. In various examples, the missing type-cast handling algorithm is configured to process an input graphical path further based on, when no child node corresponds to the transformation operation of the unknown type, when the top node corresponds to the transformation operation of the unknown type, and when none of the set of possible operations has a corresponding set of arguments having the corresponding argument types matching the data types for the set of child nodes, for each one of the set of possible operations, performing a graphical path generation algorithm upon path data corresponding to a path from each of the corresponding argument types of the each one of the set of possible operations to a corresponding data type of the set of child nodes to determine a candidate set of per-child; determining a summed path length of paths across all of the candidate set of per-child sub-paths to determine a summed length for the each one of the set of possible operations; identifying one candidate set of per-child sub-paths of a plurality of candidate set of per-child sub-paths generated for the set of possible operations having a lowest summed path; and/or utilizing the one candidate set of per-child as a corresponding set of sub-paths to implement the top node.

In various examples, the set of source inputs corresponds to a set of fields of a source dataset that includes the source data. In various examples, the set of target outputs corresponds to a set of columns of a target database table of the database system. In various examples, the transformed data is stored in the target database table.

In various examples, the source data includes a plurality of source rows having a corresponding set of source values for the set of fields. In various examples, the transformed data includes a plurality of target rows, each having a corresponding set of target values generated based on performing the set of transformation to the set of source values of a corresponding source row of the plurality of source rows in accordance with the transformation graph data.

In various examples, the transformed data is generated for storage in accordance with executing a load operation to load the source data into a target database table of the database system.

In various examples, the transformed data is generated and stored in conjunction with performing a loading process. In various examples, performing the loading process is based on, for each record of a set of records in a set of data that includes the source data: identifying a corresponding source dataset from which the each record was sourced via a corresponding source identifier identifying the corresponding source dataset and corresponding source layout information for the corresponding source dataset; identifying a corresponding target database table via a corresponding target identifier identifying the corresponding target database table and corresponding target layout information for the corresponding target database table; and/or reading the each record from the corresponding source dataset for storage in the corresponding target database table, wherein the transformed data is generated as a transformed record produced for storage in the corresponding target database table.

In various examples, the method further includes: maintaining load error tracking data in accordance with error handling configuration data; when a record-level error occurs during processing of a corresponding record of the source data, updating the load error tracking data to indicate the record-level error for the corresponding record and/or foregoing further processing of the corresponding record and proceeding with processing of a next record of the source data; when a file-level error occurs during processing of a corresponding file of the source data, updating the load error tracking data to indicate the file-level error for the corresponding file and/or foregoing further processing of the corresponding file and proceeding with processing of a next file of the source data; and communicating the load error tracking data for access by a user entity.

In various examples, the transformed data is generated and stored in conjunction with performing a loading process. In various examples, the method further includes segregating a plurality of files of the source data into a plurality of work units based on a work unit target size. In various examples, the loading process is performed via a set of parallelized loading modules to process the plurality of work units for storage in the database system via processing a plurality of sets of loading batches that collectively include the plurality of work units based on, for each set of loading batches of the plurality of sets of loading batches: selecting the each set of loading batches of the plurality of sets of loading batches based on selecting each loading batch of the each set of loading batches based on a corresponding target number of work units per batch determined for the each set of loading batches; assigning the each set of loading batches for processing by the set of loading modules based on assigning the each loading batch to a corresponding one of the set of loading modules; and/or in response to processing of a first loading batch of the set of loading batches being completed by a corresponding one of the set of loading modules, when at least one work unit of the plurality of work units has not yet been included in any loading batch assigned to any of the set of loading modules, initiating selection and assignment of a subsequent set of loading batches of the plurality of sets of loading batches.

In various examples, the method further includes: generating a plurality of subtasks for processing a corresponding plurality of portions of the source data via a load type-based subtask generation process based on a load type of the source data; and/or assigning each of the plurality of subtasks to a corresponding node of a plurality of nodes of the database system for execution. In various examples, the transformed data is stored based on execution of the plurality of subtasks via the plurality of nodes based on the plurality of nodes applying at least one of: a node availability handling strategy or a load error handling strategy.

In various embodiments, any one of more of the various examples listed above are implemented in conjunction with performing some or all steps of FIG. 27H. In various embodiments, any set of the various examples listed above can be implemented in tandem, for example, in conjunction with performing some or all steps of FIG. 27H, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 27H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 27H, for example, in conjunction with further implementing any one or more of the various examples described above.

In various embodiments, the operational instructions, when executed by the at least one processor, cause the database system to: determine source data having a set of source inputs requiring conversion from a corresponding source format into target data having set of target outputs in a corresponding target format for storage via a database system; generate transformation graph data indicating at least one graphical path from the set of source inputs in the corresponding source format to the set of target outputs in the corresponding target format via a directed acyclic graph of a corresponding set of graph nodes corresponding to a set of transformation operations for execution; generate transformed data based on converting the source data from the corresponding source format into the corresponding target format based on performing the set of transformation operations in accordance with the at least one graphical path of the transformation graph data; and/or store the transformed data via the database system.

Figure 28A:
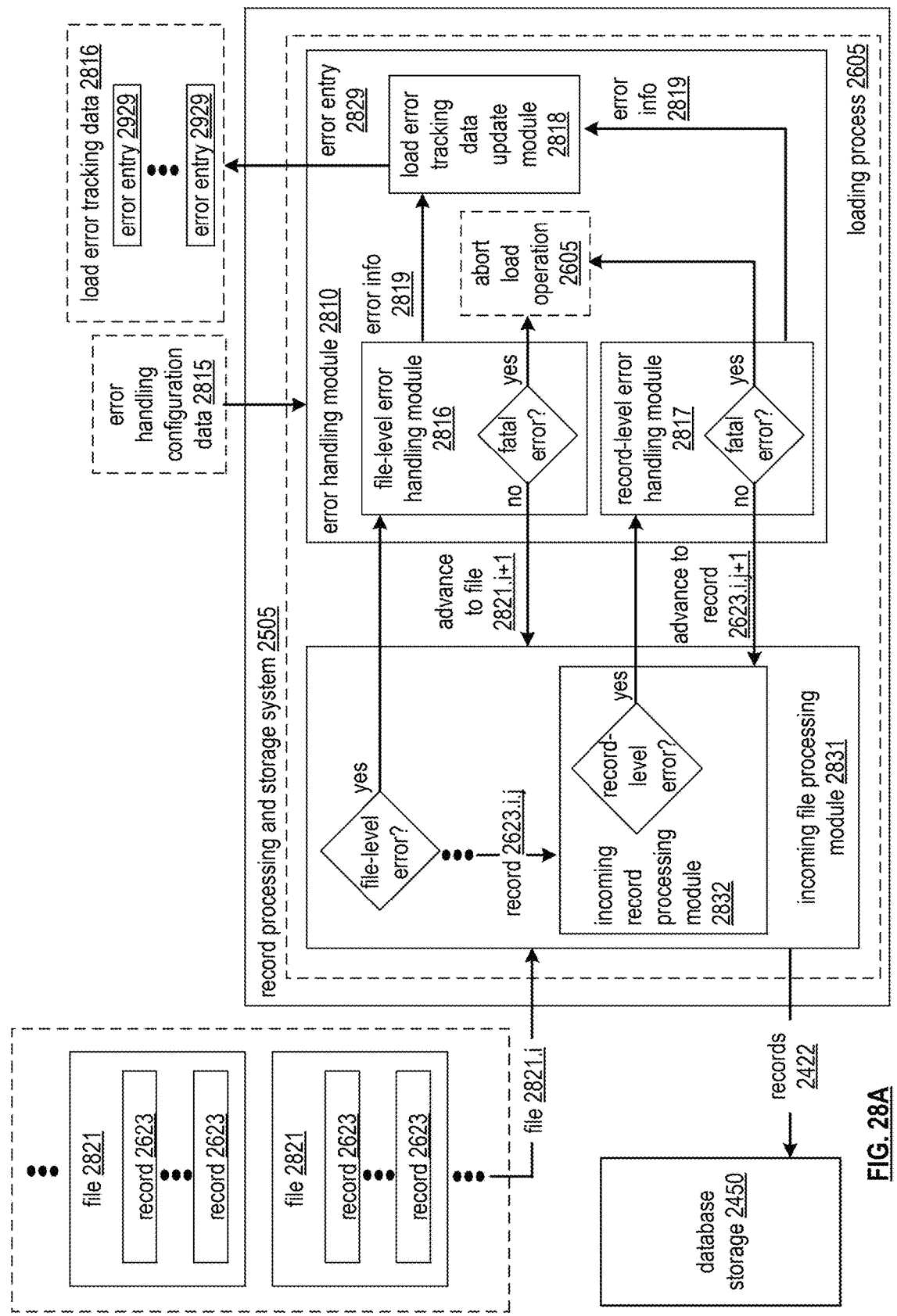
FIG. 28A is a schematic block diagram of a record processing and storage system that performs a loading process based on implementing an incoming file processing module and an error handling module in accordance with various embodiments.
Figure 28B:
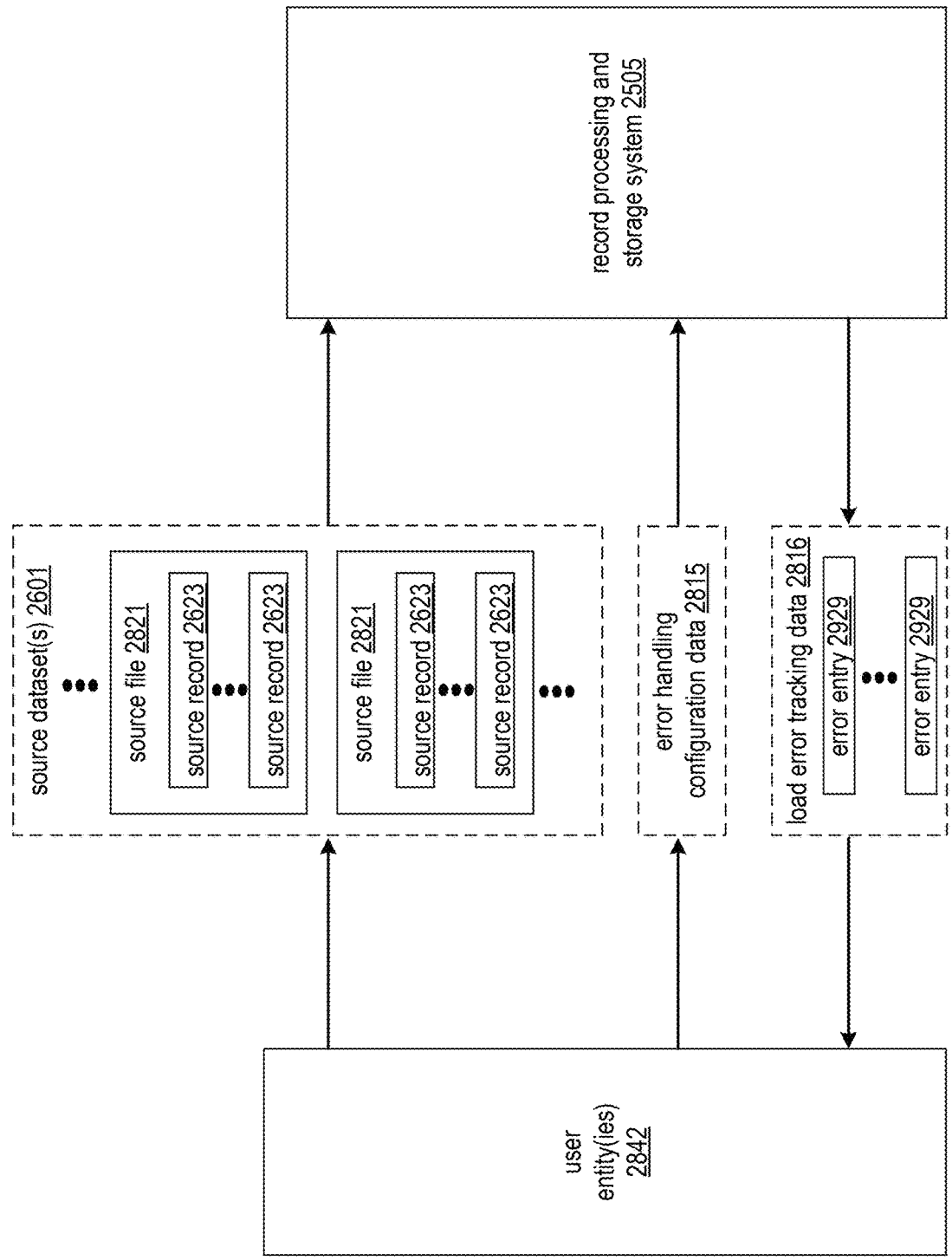
FIG. 28B is a schematic block diagram illustrating communication of source datasets, error handling configuration data, and load error tracking data between record processing and storage system and at least one user entity.

FIGS. 28A-28B illustrate embodiments of a record processing and storage system 2505 that performs a loading process 2605 to process a plurality of files that each include a plurality of records for storage based on performing error handling when encountering record-level errors and/or file-level errors in accordance with error handling configuration data, and/or based on maintaining load error tracking data based on encountering the record-level errors and/or the file-level errors. Some or all features and/or functionality of the record processing and storage system 2505 and/or loading process 2605 of FIGS. 28A-28B can implement any embodiment of record processing and storage system 2505 and/or loading process 2605 described herein. Some or all features and/or functionality of processing and storing records included in files of FIGS. 28A-28B can implement any receipt, processing, transformation, loading, and/or storage of data described herein. Some or all features and/or functionality of FIGS. 28A-28B can implement any embodiment of database system 10 described herein.

In some embodiments of loading process 2605, by default, a corresponding pipeline (e.g. implemented via record transformation module 2625, such as via one or more graphical paths 2716) will stop processing and fail immediately upon seeing an error. It can be preferred in some cases to prevent such errors from blocking the execution of the rest of the load. It can also be preferred to enable user configuration of which/how many errors are acceptable before load failure, and/or to render logging of errors for viewing/access by users (e.g. corresponding one or more same or different user entities).

FIGS. 28A-28B present embodiments of record processing and storage system 2505 where such error handling and logging is performed, which can improve the technology of database systems based on increasing transparency and enhancing usability based on making error tracking and handling more visible and/or more configurable by users of the database system 10.

As illustrated in FIG. 28A a plurality of files 2821 that each include a plurality of records 2623 can be received/accessed by database system 10 for loading (e.g. the plurality of files 2821 correspond to one or more source datasets 2601). A given file 2821.$i$ can be processed via an incoming file processing module 2831 enabling to processing of its records 2623, where a given record 2623.$i.j$ of the given file 2821.$i$ is processed via an incoming record processing module 2832 of the incoming file processing module 2831. As files are processed, records 2422 can be generated from records 2623 (e.g. via implementing record transformation module 2625).

During processing of files 2821 and/or individual records 2623 within files 2821, file-level errors and/or record level errors can be encountered and handled via an error handling module 2810, which can implement corresponding error handling in accordance with error handling configuration data 2815 to implement: a file-level error handling module 2816 to handle file-level errors; and/or a record-level error handling module 2817 to handle record-level errors. For example, a non-fatal record-level error of a given record 2623.$i.j$ can be handled via advancing to a next record 2623.$i.j$+1 in the given file 2821.$i$ (e.g. skipping the given record 2623), and/or a non-fatal file-level error of a given file 2821.$i$ can be handled via advancing to a next file 2821.$i$+1 (e.g. skipping remaining processing of remaining records in the given file). A fatal record-level error and/or fatal file-level error can be handled via aborting the load operation (e.g. foregoing processing of any remaining records/files). Furthermore, as errors are encountered, corresponding error information 2819 can be processed via a load error tracking data update module 2818 to render population of load error tracking data 2816 with error entries 2929 indicating corresponding error information 2819 (e.g. one error entry 2929 is logged per error encountered). The error handling configuration data 2815 (e.g. configured via user input and/or received from/configured by user entity) can indicate: which errors/corresponding conditions correspond to fatal errors vs. non-fatal errors; what the error information 2819 indicate; whether error entries 2929 be generated for all errors, for only fatal errors, or for errors meeting other configured specifications; configured thresholds dictating how many errors be handled before aborting a query; where/how load error tracking data 2816 be sent/stored/made accessible; etc.

FIG. 28B illustrates communication between one or more user entities 2842 and record processing and storage system 2505. One or more user entities 2842 can be responsible for sending, and/or otherwise facilitating loading from a corresponding location, of one or more source datasets 2601 that include the plurality of source files 2821 of FIG. 28A to be loaded by record processing and storage system 2505. The same or different one or more user entities 2842 can be responsible for configuring and/or sending the error handling configuration data 2815, dictating how errors in loading the source dataset(s) 2601 be handled, for processing by record processing and storage system 2505. The record processing and storage system 2505 can generate, send to the one or more same or different user entities 2842, and/or otherwise make accessible to the one or more same or different user entities 2842, the load error tracking data 2816.

Such users can correspond to one or more same or different user entities, which can be: user entities corresponding to external requesting entities 2912 that request queries; user entities corresponding to data sources 2501 that load their data to the system for use in query execution; user entities corresponding to administrators of the database system that ensure loading is performed properly and/or that handle errors; user entities corresponding to humans; user entities corresponding to automated entities, such as one or more computing devices and/or server systems, that automatically handle errors and/or automatically present improvements automatically to reduce future errors; user entities within database system 10; user entities external to database system 10, and/or other user entities.

In some embodiments, users can configure their load to tolerate record-level or file-level errors to prevent such errors from blocking the execution of the rest of the load. If a record-level error is encountered (e.g. one record has a corrupted field that cannot be transformed), the load can skip the problem record and continue processing the next record. If a file-level error is encountered (e.g. a file is corrupted and cannot be decompressed), the load can skip the problem file and continue processing the next file.

In some embodiments, when an error is encountered during a loading process 2605, the details of the error are made accessible by the user, enabling the user to access the details of that error so they can identify and respond to it. For example, in the case of a record-level error, the user may even need to reload the problem record via a different pipeline to process it properly. This need is amplified and complicated when a load can encounter multiple (perhaps even hundreds or thousands of) errors.

In some embodiments, the load error tracking data 2816 is accessible via one or more one or more places (e.g. if they configure their load to put error information in those places via error handling configuration data 2815). For example, a user can access error information about their load via a persistent system catalogue table (e.g. "sys.pipeline_errors" and/or other persistent system table implemented as a table 2712 of database system 10 where error entries 2929 are records 2422 of the table 2712 and/or where the table 2712 is query-able via query requests for execution as described herein) and/or in an optional error sink (e.g. one or more targets, such as a "BAD_DATA_TARGET" of the pipeline and or any target, for example, implemented via at least one Apache Kafka topic, at least one local file target, at least one S3 file target, and/or at least one other type(s) of target.

In some embodiments, by default, all errors the load encounters are loaded to the designated persistent system catalogue table (e.g. sys.pipeline_errors). When a corresponding extractor engine pipeline (e.g. implemented via one or more loading modules 2510 of loading process 2505, for example, via execution of record transformation module 2625 and/or corresponding graphical path(s) 2716 of transformation graph data 2715) encounters an error, it can add the error to the current batch of errors. In some embodiments, if there are enough errors in the batch to reach a flush threshold (e.g. configured in error handling configuration data 2815 or otherwise predetermined), and/or if the extractor engine pipeline is completing, extractor engine can send the error information to a metadata layer (e.g. a rolehostd metadata layer, and/or other metadata layer, for example, where the error information is stored in system metadata implemented). In some embodiments, the metadata layer can then forward the error information to a stream loader (e.g. loading module 2510), and the stream loader will load the error information to the designated persistent system catalogue table (e.g. a designated table 2712 stored via in database storage 2450), for example, where one record will be loaded for each error.

In some embodiments, the user can configure (e.g. in error handling configuration data) to only load the final (fatal) error be logged via a corresponding error entry 2929 in load error tracking data, for example, if desired for performance reasons and/or memory reasons, and/or can configure that only a proper subset of errors meeting particular criteria be logged vs. logging of every error.

The user can access and/or process the information in the load error tracking data to identify and analyze errors their load encountered. This can be useful when developing and testing a new pipeline and/or when identifying corrupted source data from a load that tolerates errors. Some or all of such analysis can optionally be performed via an automated process via database system 10 and/or can be performed via query execution by database system 10 of one or more queries against the table 2712 implementing a designated persistent system catalogue table storing the load error tracking data 2816.

In some embodiments, when an error sink and/or corresponding target (e.g. BAD_DATA_TARGET) is configured and the extractor engine pipeline encounters a record-level error, that error will be loaded to that target. For example, the corresponding target can receive both metadata about the error (e.g. location, error message, error type) and/or the bytes of the record that produced the error (e.g. so that the bad record can be loaded from the target if desired). For example, when the target is implemented via an Apache Kafka topic, the bytes are the Kafka record, and the metadata is produced to Kafka as header values. Record-level errors can be identified by error entry class (e.g. they are implemented as an instance of "RecordBasedErrorEntry"). In some embodiments, the "bad" records inducing errors can be loaded using another pipeline that sources from the BAD_DATA_TARGET in order to complete their original load or otherwise process the bad records.

In some embodiments, when the load encounters a record-level error, the record-level error handling module 2817 can be implemented via applying some or all of the following logic:

First, the error count is incremented (e.g. via the extractor engine);

Second, the error is logged (e.g. via load error tracking data update module 2818). For example, "logging" an error includes adding it to extractor engine's in memory error target (e.g. the extractor engine keeps track of a configurable number of errors per pipeline in memory. This list of in-memory errors can be queried via extractor engine's REST API, for example, as long as the corresponding pipeline exists). The error can be added to the current batch of errors to be sent to sys.pipeline_errors or other persistent table, and/or the error can be to the BAD_DATA_TARGET or other target (e.g. if the pipeline is configured with a BAD_DATA_TARGET).

Third, if the error count from the first step exceeds the error limit of the pipeline (e.g. configured when starting the pipeline, for example, indicated by error handling configuration data 2815), then recovery will not occur, processing will halt at the errored record, and/or the load will fail. If the error count is below the error limit, then the errored record will be rolled back and processing will continue with the next record.

In some embodiments, when the load encounters a file-level error, the file-level error handling module 2816 can be implemented via applying some or all of the following logic:

First, if the error occurs before tokenization, then the error will be propagated downstream (e.g. towards the tokenization phase). Pre-tokenization processing (e.g. extracting files, decompressing files) can continue with the next file.

Second, at the tokenization phase, if the load is not configured to tolerate file-level errors, then recovery will not occur, processing will halt at the errored file, and/or the load will fail. If the load is configured to tolerate file-level errors, then the errored file will be marked as errored, and any further data from the file will be ignored at the tokenization phase; the error handling proceeds to the third step.

Third, the error is logged (e.g. via load error tracking data update module 2818). For example, "logging" an error includes adding it to extractor engine's in memory error target, adding the error to the current batch of errors to be sent to sys.pipeline_errors or other persistent table, and loading the error to the BAD_DATA_TARGET or other target (e.g. if the pipeline is configured with a BAD_DATA_TARGET, and/or the file-level error is such that the error occurs on a specific record that can be captured, such as an unrecoverable record tokenization error; the error occurs on a specific record, but the occurrence of the error means that no records following the errored record in the file can be successfully tokenized, since the successful detection of the beginning of the next record depends on the successful detection of the end of the current record).

Fourth, any partial record data from the errored file is discarded, and/or processing will continue with the next file. In some embodiments, any records from the errored file that were completely tokenized before the error was accounted for in step two are unaffected and proceed to transformation.

Figure 28C:
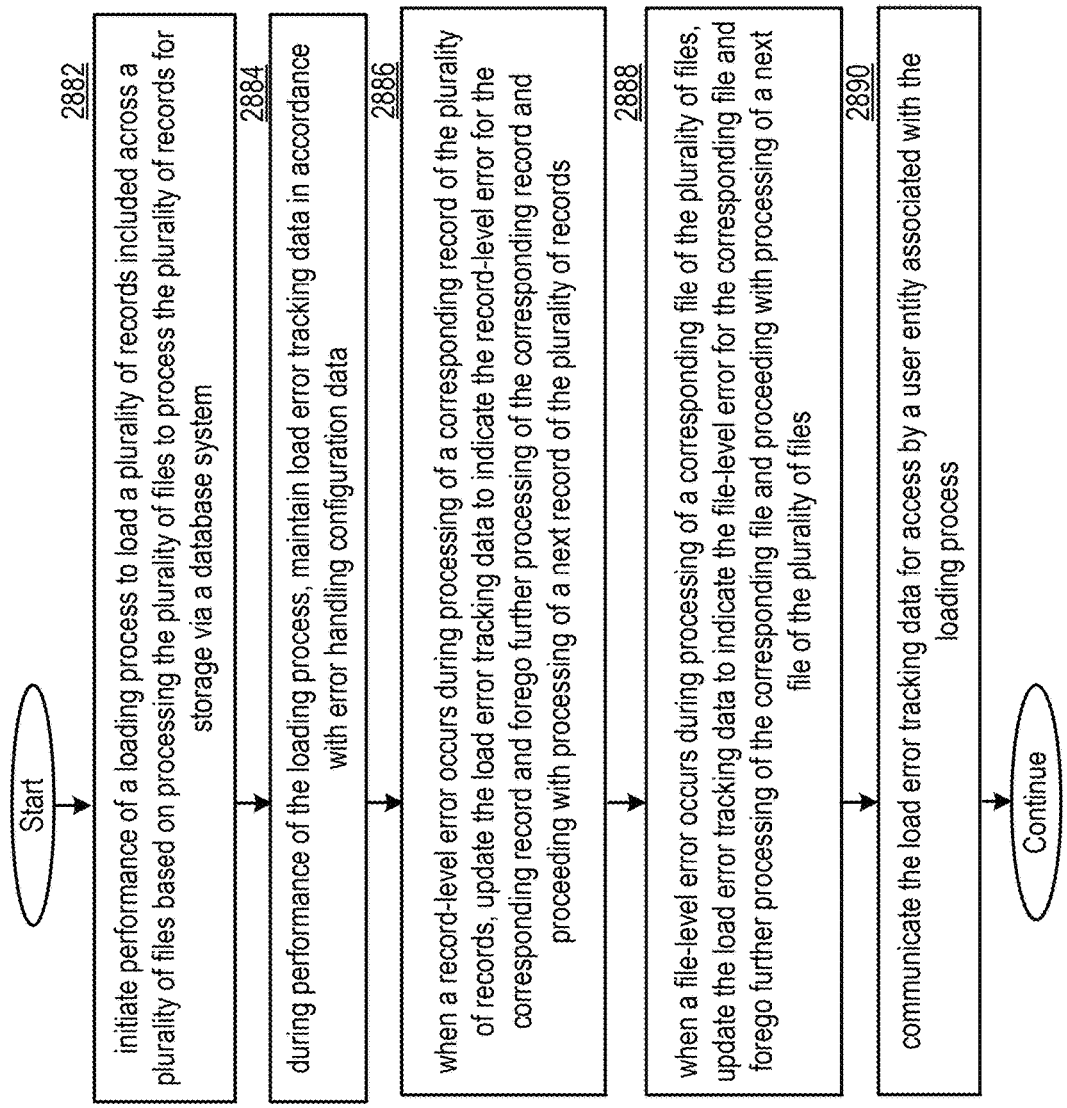
FIG. 28C is a logic diagram illustrating a method for execution in accordance with various embodiments.

FIG. 28C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28C, for example, based on participating in execution of a query being executed by the database system 10. Some or all of the method of FIG. 28C can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 28C based on implementing a corresponding plurality of processing core resources 48.1-48.W. Some or all of the steps of FIG. 28C can optionally be performed by any other one or more processing modules of the database system 10. Some or all of the steps of FIG. 28C can be performed to implement some or all of the functionality of the database system 10 as described in conjunction with FIGS. 28A-28B, for example, by implementing some or all of the functionality of record processing and storage system 2505, loading process 2605, incoming file processing module 2831, error handling module 2810, error handling configuration data 2815, load error tracking data 2816, and/or database storage 2450. Some or all steps of FIG. 28C can be performed by database system 10 in accordance with other embodiments of the database system 10 and/or nodes 37 discussed herein. Some or all of the steps of FIG. 28C can be performed in conjunction with performing some or all steps of any other method described herein.

Step 2882 includes initiating performance of a loading process to load a plurality of records included across a plurality of files based on processing the plurality of files to process the plurality of records for storage via a database system. Step 2884 includes, during performance of the loading process, maintaining load error tracking data in accordance with error handling configuration data. Step 2886 includes, when a record-level error occurs during processing of a corresponding record of the plurality of records: updating the load error tracking data to indicate the record-level error for the corresponding record; and/or foregoing further processing of the corresponding record and proceeding with processing of a next record of the plurality of records. Step 2888 includes, when a file-level error occurs during processing of a corresponding file of the plurality of files: updating the load error tracking data to indicate the file-level error for the corresponding file; and/or foregoing further processing of the corresponding file and proceeding with processing of a next file of the plurality of files. Step 2890 includes communicating the load error tracking data for access by a user entity associated with the loading process.

In various examples, the error handling configuration data is generated based on being configured by the user entity via user input. In various examples, the method further includes receiving the error handling configuration data after the error handling configuration data is generated.

In various examples, performance of the loading process is aborted prior to completion of the loading process based on a fatal error occurring during performance of the loading process. In various examples, less than all of the plurality of records are loaded via the loading process due to the loading process being aborted prior to completion of the loading process.

In various examples, the fatal error occurs after a plurality of non-fatal errors corresponding to at least one of: at least one record-level error occurring during processing of at least one corresponding record of the plurality of records prior to the fatal error; or at least one file-level error occurring during processing of at least one corresponding file of the plurality of files prior to the fatal error.

In various examples, the error handling configuration data indicates a configured threshold number of errors. In various examples, the plurality of non-fatal errors includes the configured threshold number of errors. In various examples, none of the plurality of non-fatal errors render aborting of the loading process based on a number of errors included in the plurality of non-fatal errors not exceeding the configured threshold number of errors, and wherein the fatal error occurs based on a total number of errors in a total set of errors that includes the fatal error and the plurality of non-fatal errors exceeding the threshold number of errors.

In various examples, the configured threshold number of errors corresponds to a configured threshold number of record-level errors. In various examples, the method further includes: during performance of the loading process, further maintaining a record-level error count; and incrementing the error count when the record-level error occurs during processing of the corresponding record of the plurality of records. In various examples, a first-encountered plurality of record-level errors corresponds to the plurality of non-fatal errors based on the error count not exceeding the configured threshold number of record-level errors in response to incrementing the error count for each of the first-encountered plurality of record-level errors. In various examples, a last-encountered record-level error corresponds to the fatal error based on the error count exceeding the configured threshold number of record-level errors in response to incrementing the error count for the last-encountered record-level error.

In various examples, the error handling configuration data indicates logging of only the fatal error rendering aborting of the loading process. In various examples, the load error tracking data is only updated when the fatal error occurs.

In various examples, the error handling configuration data indicates any file-level errors encountered during performance of the loading process correspond to fatal errors. In various examples, the loading process is aborted prior to the completion of the loading process based on the file-level error occurring during performance of the loading process.

In various examples, the method further includes: initiating performance of a second loading process to load a second plurality of records included across a second plurality of files based on processing the second plurality of files to process the second plurality of records for storage via the database system; during performance of the second loading process, maintaining second load error tracking data; and/or communicating the second load error tracking data. In various examples, performance of the second loading process completes based on no fatal errors occurring during performance of the second loading process. In various examples, the second load error tracking data indicates at least one non-fatal error occurring during the second loading process.

In various examples, the second load error tracking data is maintained in accordance with second load error tracking data that is different from the load error tracking data. In various examples the second load error tracking data is generated via a second user entity. In various examples, the second load error tracking data communicated to the second user entity. In various examples, the second user entity is the same as the user entity. In various examples, the second user entity is different from the user entity.

In various examples, at least one file-level error occurring during processing of at least one corresponding file of the plurality of files includes at least one corresponding record-level error during processing of at least one corresponding record included within the at least one corresponding file. In various examples, updating the load error tracking data to indicate the at least one file-level error includes updating the load error tracking data to indicate the at least one record-level error.

In various examples, the method further includes, when the file-level error occurs during processing of the corresponding file of the plurality of files and when the file-level error occurs mid-file after a subset of records included in the file were processed: maintaining ones of the subset of records for storage in the database system that were fully processed successfully despite the file-level error occurring; and/or discarding partial record data any other ones of the subset of records not fully processed successfully due to the file-level error occurring.

In various examples, the load error tracking data includes a plurality of error tracking records of a corresponding error tracking table accessible by the user entity. In various examples, updating the load error tracking data when the record-level error occurs for the corresponding record includes updating the corresponding error tracking table to include a new error tracking record indicating the corresponding record.

In various examples, communicating the load error tracking data includes sending accumulated error information included in the load error tracking data to a metadata layer. In various examples, the metadata layer forwards the accumulated error information for processing via a second loading process operable to load the accumulated error information as corresponding error tracking records of a corresponding error tracking table. In various examples, the metadata layer stores the load error tracking data as state data mediated in conjunction with a consensus protocol.

In various examples, the error handling configuration data indicates a configured threshold number of errors per tracking data batch. In various examples, the method further includes, when the load error tracking data includes the configured threshold number of errors per tracking data batch after a corresponding plurality of updates of the load error tracking data: flushing the load error tracking data as a corresponding batch of load error tracking data for access by the user entity.

In various examples, the load error tracking data is communicated via a plurality of corresponding batches of load error tracking data generated during the loading process.

In various examples, communicating the load error tracking data is based on loading the load error tracking data to a corresponding target implemented via least one of: a corresponding Apache Kafka topic; a corresponding local file target; or a corresponding S3 file target.

In various examples, performing the loading process is further based on, for each record of the plurality of records: identifying a corresponding source dataset from which the each record was sourced via a corresponding source identifier identifying the corresponding source dataset and corresponding source layout information for the corresponding source dataset; identifying a corresponding target database table via a corresponding target identifier identifying the corresponding target database table and corresponding target layout information for the corresponding target database table; reading the each record from the corresponding source dataset for storage in the corresponding target database table; and/or producing a transformed record for storage in the corresponding target database table.

In various examples, the method further includes: generating a plurality of subtasks for processing a corresponding plurality of portions of the plurality of files via a load type-based subtask generation process based on a load type of the plurality of files; and/or assigning each of the plurality of subtasks to a corresponding node of a plurality of nodes of the database system for execution. In various examples, the loading process is performed based on execution of the plurality of subtasks via the plurality of nodes based on the plurality of nodes applying at least one of: a node availability handling strategy or a load error handling strategy.

In various embodiments, any one of more of the various examples listed above are implemented in conjunction with performing some or all steps of FIG. 28C. In various embodiments, any set of the various examples listed above can be implemented in tandem, for example, in conjunction with performing some or all steps of FIG. 28C, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 28C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 28C, for example, in conjunction with further implementing any one or more of the various examples described above.

In various embodiments, the operational instructions, when executed by the at least one processor, cause the database system to: initiate performance of a loading process to load a plurality of records included across a plurality of files based on processing the plurality of files to process the plurality of records for storage via a database system; during performance of the loading process, maintain load error tracking data in accordance with error handling configuration data; when a record-level error occurs during processing of a corresponding record of the plurality of records, update the load error tracking data to indicate the record-level error for the corresponding record and/or forego further processing of the corresponding record and proceeding with processing of a next record of the plurality of records; when a file-level error occurs during processing of a corresponding file of the plurality of files, update the load error tracking data to indicate the file-level error for the corresponding file and/or forego further processing of the corresponding file and proceeding with processing of a next file of the plurality of files; and/or communicate the load error tracking data for access by a user entity associated with the loading process.

Figure 29A:
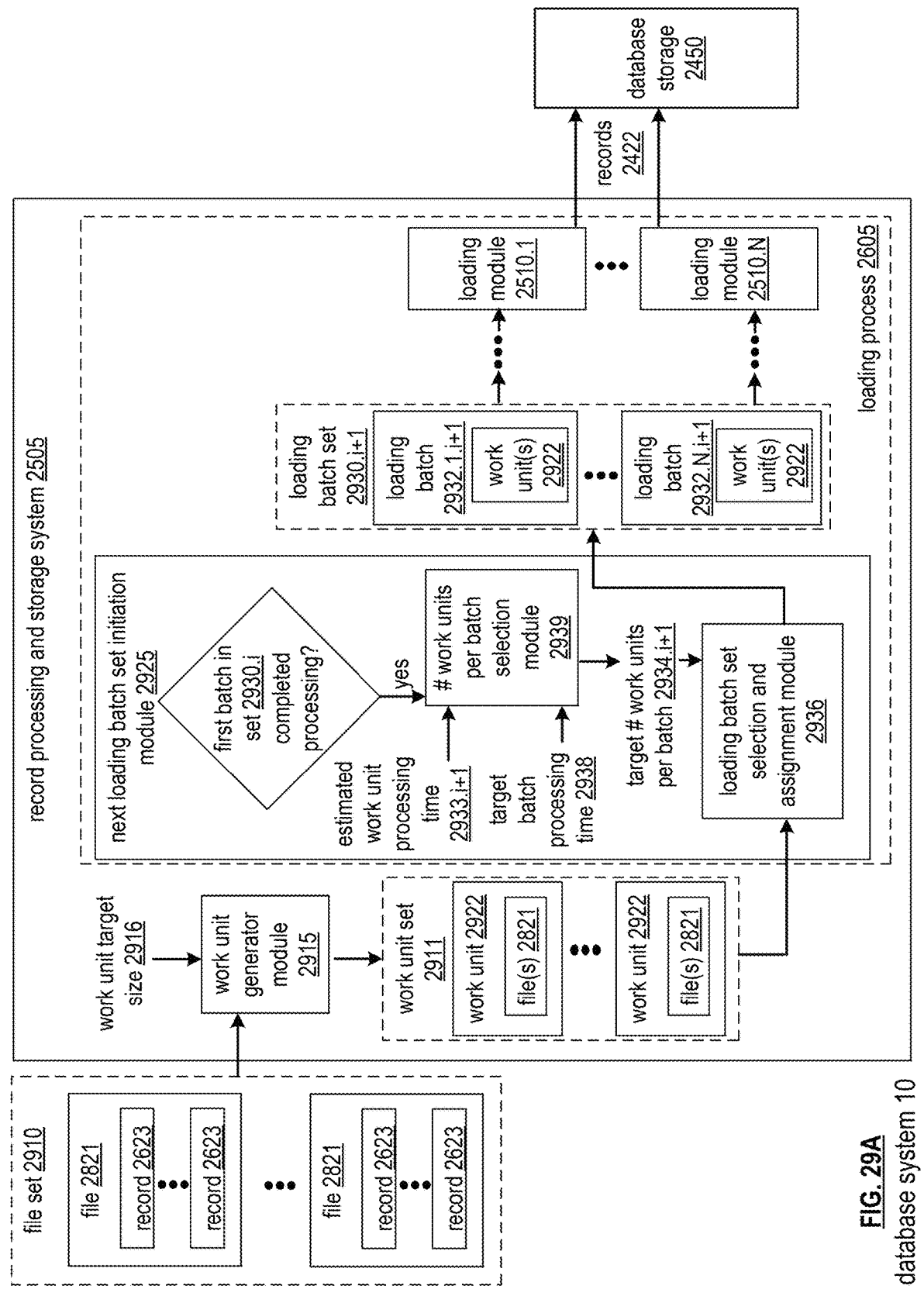
FIG. 29A is a schematic block diagram of a record processing and storage system that performs a loading process based on implementing a work unit generator module, a next loading batch set initiation module, and a plurality of loading modules in accordance with various embodiments.

FIG. 29A illustrates an embodiment of a record processing and storage system 2505 that performs a loading process

2605 to process a plurality of files that each include a plurality of records for storage based on generating a plurality of work units in accordance with a work unit target size, and generating a plurality of loading batch sets for assignment to a set of loading modules for processing over time, for example, based on adapting a target number of work units per batch based on updates to estimated work unit processing time during processing. Some or all features and/or functionality of the record processing and storage system 2505, loading process 2605, and/or loading modules 2510 of FIG. 29A can implement any embodiment of record processing and storage system 2505, loading process 2605, and/or loading modules 2510 described herein. Some or all features and/or functionality of processing and storing records included in files of FIG. 29A can implement any receipt, processing, transformation, loading, and/or storage of data described herein. Some or all features and/or functionality of FIG. 29A can implement any embodiment of database system 10 described herein.

In various embodiments of database system 10, when a file load is performed using multiple loaders (e.g. multiple loading modules 2510), it can be ideal to implement a means of splitting the files into batches such that each loader is engaged for the majority of the load. If some N number of files is assigned to each batch (e.g. with each batch being loaded by one task, and all the tasks being created up front), it can be possible to run into a scenario where all the larger files will be assigned to one batch, and that one batch will be oversized, leading to one loader having to perform 90% of the load while the other loaders are idle for most of that time. This can lead to the appearance of a "tail" in the load, where one loader is left processing a long tail of files.

Use of distributed tasks to orchestrate the load can help ameliorates this situation: tasks aren't assigned to loaders up front, so if there are enough tasks, then faster loaders will naturally execute more tasks, reducing the length of the tail. However, if the load consists of less than (number of loaders)*N number of files, and/or if the load is split into less tasks than loaders, then the problem can still persist.

FIG. 29A presents a solution to this problem that improves the technology of database systems based on rendering more efficient loading of data via a plurality of loaders. This can include dispersing the files into batches based on their file sizes, dynamically size these batches to adapt to the current conditions (e.g. of the cluster, network, and other aspects of the load environment), and/or not creating all the tasks up front.

As illustrated in FIG. 29A, the record processing and storage system 2505 can be operable to process a given file set 2910 (e.g. a bulk set of files determined up front, which can be optionally implemented a portion of or the entirety of one or more source datasets 2601, where the records in each file are optionally implemented as source records 2623) that includes a plurality of files 2821 that each include a plurality of records. A work unit generator module 2915 can generate a work unit set 2911 that includes a plurality of work units 2922 generated from the plurality of files, where each work unit 2922 includes a set of one or more files 2821 based on a work unit target size 2916 (e.g. target number of bytes/target number of records), where work units 2922 are built to meet/be as close to the work unit target size 2916 as possible. This can include different work units having different numbers of files 2821 based on different files 2821 being different sizes (e.g. one work unit has a few large files, another work unit has many small files, both work units have close to the same number of bytes close to the work unit target size 2916). Generating work units 2922 can be based on keeping files whole (e.g. a given file is placed in exactly one work unit).

As a particular example, after listing files at the start of a load as file set 2910, the files can be distributed up front into work units with a work unit target size 2916 of S bytes, for example, where S=(least common multiple of the numbers of cores for the loaders used)*(average size of files in this load), for example, where number of cores corresponds to processing core resources 48 of nodes 37 implementing the loading modules 2510.1-2510.N. Each work unit should contain at least one file. Since the work units should be approximately evenly sized, they can be utilized as the unit by which batches are measured.

The loading process 2605 can be implemented after the work unit set 2911 is created upfront by implementing a next loading batch set initiation module 2925 that implements a loading batch set selection and assignment module 2936 to assign a given set of loading batches 2932.1-2932.N of a given loading batch set 2930.

For example, a given loading batch set 2930 includes only N loading batches 2932 (e.g. assigned via N corresponding tasks, such as N subtasks 3037.1-3037.N), where each of the N loading modules 2510 is thus assigned one of these batches 2932. A first loading batch 2930.1 can includes a first set of loading batches set of loading batches 2932.1.1-2932.1.N assigned to the N loading modules 2510.1-2510.N. Each of these N initial batches can be configured to include a same number of work units, such as exactly one work unit for the for the first loading batch processed by each loading module consists of one work unit (e.g. each task should process about S bytes worth of files).

The next loading batch set initiation module 2925 can determine when the first batch in a given (e.g. current) batch set 2930.$i$ has completed processing by a corresponding loading module 2510 (e.g. a corresponding task is completed by the corresponding loading module), where the next loading batch set 2930.$i$+1 of N batches to be assigned across the N loading modules is determined only once a first loading batch 2932.$j.i$ in the given set 2930.$i$ has completed processing.

A number of work units per batch selection module 2939 can be implemented to configure a target number of work units per batch 2934 for the next batch set 2930.$i$+1 enabling batches 2932 to have sizes that change dynamically over time. For example, an estimated work unit processing time 2933.$i$+1 for a current/upcoming time frame can be estimated based on current conditions, how long the most recent batch set took to process, changes to the network/memory/processing/storage/nodes of the system, etc. The target number of work units per batch 2934.$i$+1 to be applied in generating the next loading batch set 2930.$i$+1 can be generated as a function of configured work unit processing time 2933.$i$+1 (e.g. as an inverse function of estimated work unit processing time 2933.$i$+1. For example, all N loading batches 2932.$i$+1.1-2932.$i$+1.N can have a number of work units 2922 equal to and/or close to the target number of work units per batch 2934.$i$+1 selected based on the estimated work unit processing time 2933.$i$+1. As the estimated work unit processing time 2933 changes over time, the target number of work units per batch 2934 (and thus actual number of work units per batch) can change accordingly to adapt loading batch sizes to changing of conditions during the loading process 2605. As a particular example, the number of work units per batch selection module 2939 can generate the target number of work units per batch 2934.$i$+1 such that a target batch processing time 2938 is expected to be met, based on the estimated work unit processing time (e.g. include a number of work units in the batch such that processing time of the new batches is expect to get as close to target batch processing time 2938 as possible).

This process of generating loading batch sets 2930 to all have a number of work units configured based on the target number of work units per batch 2934 selected for the given loading batch set 2930 can continue until all work units of work unit set 2911 are assigned in loading batches.

As a particular example, once the first of the N tasks completes for a given loading batch set 2930.$i$, the next loading batch set initiation module 2925 can be implemented to:

First, recalculate the number of work units W (e.g. target number of work units per batch 2934) that should be in a batch as target number of work units per batch 2934.$i$+1, for example, such that each task has a predicted execution time of T, where T is some configurable value (e.g. target batch processing time 2938), for example, that defaults to 10 minutes or some other default. This can be based on applying the assumption that W is proportional to task execution time. This first step can be performed via implementing the number of work units per batch selection module 2939.

Second, create another set of N tasks (e.g. n loading batches 2932.1-2932.N). Each of these tasks should load a batch that consists of W work units (e.g. target number of work units per batch 2934). For example, each loading batch 2932/corresponding task should process about S*W bytes worth of files. This second step can be performed via implementing loading batch set selection and assignment module 2936.

Third, once the first of these new tasks completes, repeat the first and second step for this new set of N tasks. For example, the recalculation of W and task creation is only performed once per set of tasks (e.g. once per loading batch set 2930).

These first, second, and third steps can be repeated until there are no work units left. This implementation can limit the length of the tail to be about T (e.g. target batch processing time 2938).

Figure 29B:
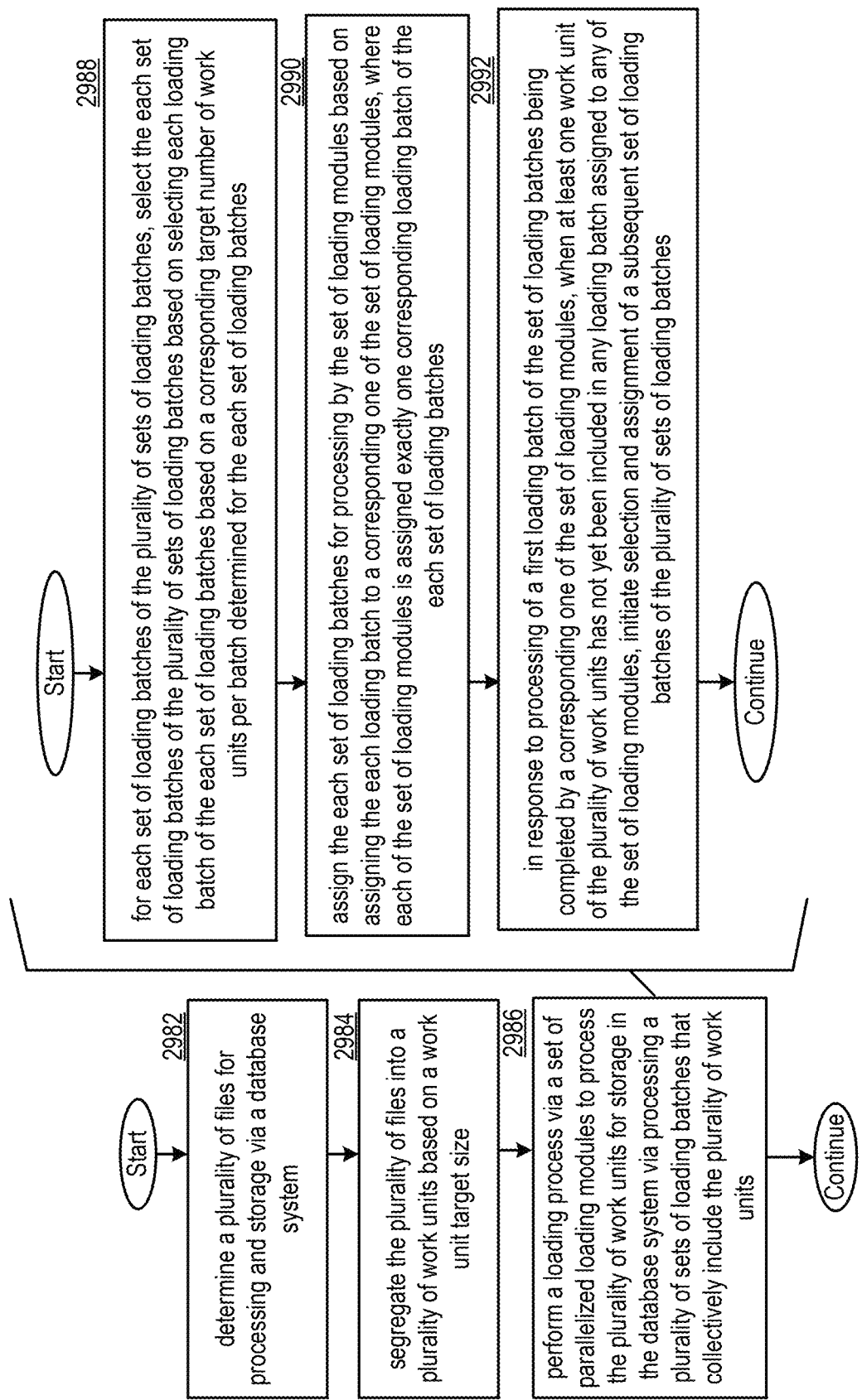
FIG. 29B is a logic diagram illustrating a method for execution in accordance with various embodiments.

FIG. 29B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29B, for example, based on participating in execution of a query being executed by the database system 10. Some or all of the method of FIG. 29B can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 29B based on implementing a corresponding plurality of processing core resources 48.1-48.W. Some or all of the steps of FIG. 29B can optionally be performed by any other one or more processing modules of the database system 10. Some or all of the steps of FIG. 29B can be performed to implement some or all of the functionality of the database system 10 as described in conjunction with FIG. 29A, for example, by implementing some or all of the functionality of record processing and storage system 2505, loading process 2605, next loading batch set initiation module 2925, word unit generator module 2915, work unit set 2911, work units 2922, database storage 2450, and/or loading modules 2510.1-2510.W. Some or all steps of FIG. 29A can be performed by database system 10 in accordance with other embodiments of the database system 10 and/or nodes 37 discussed herein. Some or all of the steps of FIG. 29B can be performed in conjunction with performing some or all steps of any other method described herein.

Step 2982 includes determining a plurality of files for processing and storage via a database system. Step 2984 includes segregating the plurality of files into a plurality of work units based on a work unit target size. Step 2986 includes performing a loading process via a set of parallelized loading modules to process the plurality of work units for storage in the database system via processing a plurality of sets of loading batches that collectively include the plurality of work units.

Performing step 2986 can include performing some or all of steps 2988, 2990, and/or 2992. For example, steps 2988, 2990, and/or 2992 are performed for each set of loading batches of the plurality of sets of loading batches. Performing step 2988 includes selecting the each set of loading batches of the plurality of sets of loading batches based on selecting each loading batch of the each set of loading batches based on a corresponding target number of work units per batch determined for the each set of loading batches. Step 2990 includes assigning the each set of loading batches for processing by the set of loading modules based on assigning the each loading batch to a corresponding one of the set of loading modules. In various examples, each of the set of loading modules is assigned exactly one corresponding loading batch of the each set of loading batches. Step 2992 includes, in response to processing of a first loading batch of the set of loading batches being completed by a corresponding one of the set of loading modules, when at least one work unit of the plurality of work units has not yet been included in any loading batch assigned to any of the set of loading modules: initiating selection and assignment of a subsequent set of loading batches of the plurality of sets of loading batches.

In various examples, a first set of loading batches of the plurality of sets of loading batches is selected and assigned before all other sets of loading batches of the plurality of sets of loading batches, wherein the corresponding target number of work units per batch determined for the first set of loading batches is equal to one work unit per batch. In various examples, each loading batch of the first set of loading batches includes exactly one corresponding work unit based on the corresponding target number of work units per batch determined for the first set of loading batches being equal to one work unit per batch.

In various examples, at least two different ones of the set of loading batches of the plurality of sets of loading batches have different corresponding target number of work units per batch. In various examples, a first corresponding number of work units included each of a first set of loading batches is based on a first corresponding target number of work units. In various examples, a second corresponding number of work units included each of a second set of loading batches is based on a second corresponding target number of work units. In various examples, the first corresponding number of work units is different from the second corresponding number of work units based on the first corresponding target number of work units being different from the second corresponding target number of work units.

In various examples, all loading batches included in a corresponding set of loading batches of the plurality of sets of loading batches include a same number of work units equal to the corresponding target number of work units per batch determined for the corresponding set of loading batches.

In various examples, processing the plurality of sets of loading batches that collectively include the plurality of work units is further based on, for each set of loading batches of the plurality of sets of loading batches, in response to processing of the first loading batch of the set of loading batches being completed, when at least one work unit of the plurality of work units has not yet been included in any loading batch assigned to any of the set of loading modules: selecting an updated target number of work units per batch for the subsequent set of loading batches. In various examples, selecting each subsequent set of loading batches of the plurality of sets of loading batches is based on selecting each loading batch of the subsequent set of loading batches based on the updated target number of work units per batch selected for the subsequent set of loading batches in response to processing of the first loading batch of a prior set of loading batches being completed.

In various examples, the updated target number of work units per batch for the subsequent set of loading batches is selected based on a target execution time per batch.

In various examples, the updated target number of work units per batch for the subsequent set of loading batches is further selected based on determining a predicted execution time per work unit as a function of current conditions influencing processing of loading batches via at least one of the set of parallelized loading modules.

In various examples, processing of all other loading batches of the each set of loading batches are completed after completion of processing of the first loading batch of the each set of loading batches. In various examples, selection and assignment of the subsequent set of loading batches of the plurality of sets of loading batches is only initiated in response to the completion of processing of the first loading batch of the set of loading batches and not in response to completion of processing of any other loading batches of the each set of loading batches.

In various examples, the target work unit size corresponds to a target number of bytes.

In various examples, the method further includes selecting the target work unit size as a function of: a number of parallelized processing core resources in a set of parallelized processing core resources implemented by at least one of the set of parallelized loading modules, wherein the at least one of the set of parallelized loading modules processes corresponding loading batches to which it is assigned via utilizing the set of parallelized processing core resources; and/or a file size of at least one file of the plurality of files.

In various examples, each of the set of parallelized loading modules implements a corresponding set of parallelized processing core resources that includes a corresponding number of parallelized processing core resources. In various examples, the target work unit size is selected based on computing a product of: a least common multiple of numbers of parallelized processing core resources implemented by the set of parallelized loading modules; and/or an average file size of the plurality of files.

In various examples, at least two of the plurality of files have different file sizes. In various example, a first work unit of the plurality of work units includes a first number of files. In various examples, a second work unit of the plurality of work units includes a second number of files. In various examples, the first number of files is different from the second number of files based on: the at least two of the plurality of files having the different file sizes, and/or each of the plurality of work units being selected based on the target work unit size.

In various examples, each of the plurality of files is included in exactly one of plurality of work units, and wherein each of the plurality of work units include at least one file of the plurality of files.

In various examples, the plurality of files are segregated into the plurality of work units prior to any loading batches being selected and assigned to any loading modules.

In various examples, performing the loading process is further based on, for each record of a set of records included in the plurality of files: identifying a corresponding source dataset from which the each record was sourced via a corresponding source identifier identifying the corresponding source dataset and corresponding source layout information for the corresponding source dataset; identifying a corresponding target database table via a corresponding target identifier identifying the corresponding target database table and corresponding target layout information for the corresponding target database table; reading the each record from the corresponding source dataset for storage in the corresponding target database table; and/or producing a transformed record for storage in the corresponding target database table.

In various examples, processing of each loading batch of the set of loading batches via a corresponding one of the set of loading modules is based on: determining source data having a set of source inputs requiring conversion from a corresponding source format into target data having set of target outputs in a corresponding target format for storage via a database system; generating transformed data based on converting the source data from the corresponding source format into the corresponding target format based on performing a set of transformation operations in accordance with the at least one graphical path of transformation graph data; and/or storing the transformed data via the database system.

In various examples, executing the loading process is further based on: maintaining load error tracking data in accordance with error handling configuration data; when a record-level error occurs during processing of a corresponding record of one of the plurality of files, updating the load error tracking data to indicate the record-level error for the corresponding record and/or foregoing further processing of the corresponding record and proceeding with processing of a next record of the one of the plurality of files; when a file-level error occurs during processing of a corresponding file of the plurality of files, updating the load error tracking data to indicate the file-level error for the corresponding file and/or foregoing further processing of the corresponding file and proceeding with processing of a next file of the plurality of files; and/or communicating the load error tracking data for access by a user entity.

In various examples, the method further includes: generating a plurality of subtasks for processing a corresponding plurality of portions of the plurality of files via a load type-based subtask generation process based on a load type of the plurality of files; and/or assigning each of the plurality of subtasks to a corresponding node of a plurality of nodes of the database system for execution. In various examples, the loading process is performed via the set of parallelized loading modules based on execution of the plurality of subtasks via the plurality of nodes based on the plurality of nodes applying at least one of: a node availability handling strategy or a load error handling strategy.

In various embodiments, any one of more of the various examples listed above are implemented in conjunction with performing some or all steps of FIG. 29B. In various embodiments, any set of the various examples listed above can be implemented in tandem, for example, in conjunction with performing some or all steps of FIG. 29B, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 29B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 29B, for example, in conjunction with further implementing any one or more of the various examples described above.

In various embodiments, the operational instructions, when executed by the at least one processor, cause the database system to: determine a plurality of files for processing and storage via a database system; segregate the plurality of files into a plurality of work units based on a work unit target size; and/or perform a loading process via a set of parallelized loading modules to process the plurality of work units for storage in the database system via processing a plurality of sets of loading batches that collectively include the plurality of work units. In various embodiments, performing the loading process via the set of parallelized loading modules to process the plurality of work units for storage in the database system via processing the plurality of sets of loading batches that collectively include the plurality of work units us based on, for each set of loading batches of the plurality of sets of loading batches: selecting the each set of loading batches of the plurality of sets of loading batches based on selecting each loading batch of the each set of loading batches based on a corresponding target number of work units per batch determined for the each set of loading batches; assigning the each set of loading batches for processing by the set of loading modules based on assigning the each loading batch to a corresponding one of the set of loading modules, wherein each of the set of loading modules is assigned exactly one corresponding loading batch of the each set of loading batches; and, in response to processing of a first loading batch of the set of loading batches being completed by a corresponding one of the set of loading modules, when at least one work unit of the plurality of work units has not yet been included in any loading batch assigned to any of the set of loading modules, initiating selection and assignment of a subsequent set of loading batches of the plurality of sets of loading batches.

Figure 30A:
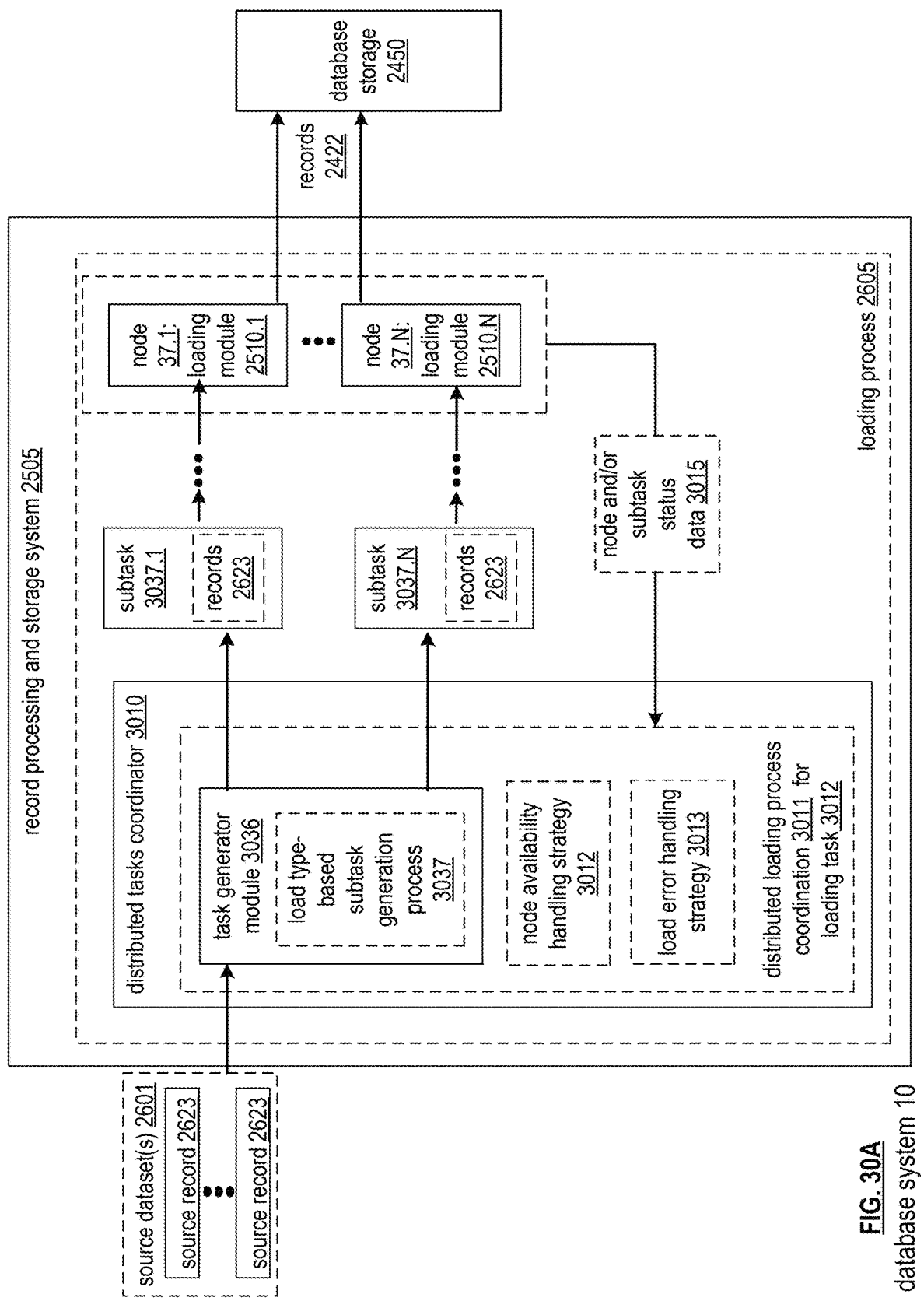
FIG. 30A is a schematic block diagram of a record processing and storage system that performs a loading process based on implementing a distributed tasks coordinator that generates a plurality of subtasks each for execution via a corresponding node of a plurality of nodes in accordance with various embodiments.
Figure 30B:
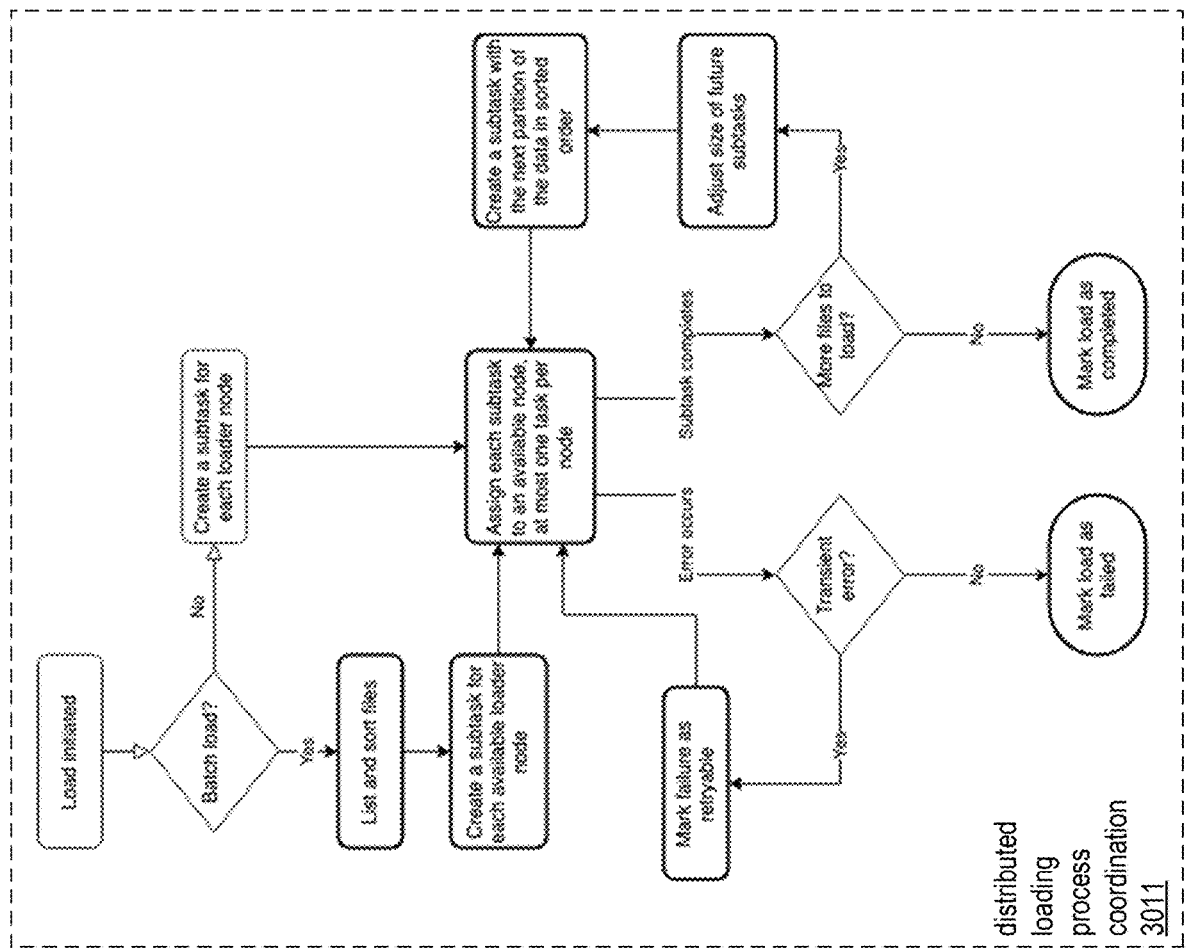
FIG. 30B illustrates an example logical flow of distributed loading processing coordination performed in conjunction with performing a loading process in accordance with various embodiments.

FIG. 30A-30B illustrate embodiments of a record processing and storage system 2505 that performs a loading process 2605 to process source records of one or more source datasets based on generating and assigning a plurality of subtasks to a plurality of nodes for execution via implementing a distributed tasks coordinator, for example, in accordance with a distributed tasks framework. Some or all features and/or functionality of the record processing and storage system 2505, loading process 2605, and/or loading modules 2510 of FIGS. 30A-30B can implement any embodiment of record processing and storage system 2505, loading process 2605, and/or loading modules 2510 described herein. Some or all features and/or functionality of nodes 37.1-37.N can implement any nodes 37 described herein, for example, via implementing any embodiment of a consensus protocol and/or task assignment and/or execution via nodes 37 described herein. Some or all features and/or functionality of processing and storing source records of one or more source datasets of FIGS. 30A-30B can implement any receipt, processing, transformation, loading, and/or storage of data described herein. Some or all features and/or functionality of FIGS. 30A-30B can implement any embodiment of database system 10 described herein.

In some embodiments, in order to quickly load data into database system 10, it can be desirable to load data using multiple nodes at the same time. However, doing this reliably can require requires that the loading process handles problems common to distributed systems (node outages, network partitions, etc.), while preserving data correctness.

FIGS. 30A-30B present embodiments that improve the technology of database systems based on being configured to handle these scenarios. This can include dividing the entire loading task 3012 (e.g. for a corresponding loading process 2605, and/or a single load operation) into subtasks (e.g. subtasks 3037). Execution of each subtask can corresponding to loading of a partition of the data, and can be executed on any available node 37 in the system (e.g. in conjunction with being implemented as a loading module 2510). The subtasks can be coordinated using a corresponding distributed tasks framework, for example, via implementing some or all features and/or functionality disclosed by U.S. Utility application Ser. No. 18/482,939, entitled "PERFORMING SHUTDOWN OF A NODE IN A DATABASE SYSTEM" in conjunction with assigning various tasks to nodes for execution in parallel. In some embodiments, once all subtasks are complete, the load can be marked as complete. If a subtask fails, we mark the load as failed.

As illustrated in FIG. 30A, record processing and storage system 2505 can implement a loading process 2605 based on processing one or more source datasets 2601 in conjunction with performing a corresponding given loading task 3012 (e.g. a given load operation and/or given loading process 2605). A distributed tasks coordinator 3010 can perform distributed loading process coordination 3011 in conjunction with assigning subtasks 3037 to nodes and handling any errors/changes in node availability as needed in conjunction with facilitating completion of the loading task 3012 as a whole, for example, based on receiving and/or processing node and/or subtask status data 3015 over time (e.g. indicating when subtasks are completed/their progress; indicating node availability/node outages; indicating errors encountered in processing records in conjunction with executing a subtask; etc.)

The distributed tasks coordinator 3010 can implement a task generator module 3036 to generate one or more sets of subtasks 3037.1-3037.N for assignment to different nodes 37.1-37.N for execution (e.g. in conjunction with nodes 37.1-37.N implementing a corresponding set of loading modules 2510.1-2510.N). For example, a given node 37 is assigned one or more subtasks 3037 over time for processing (e.g. one at a time if receiving multiple subtasks over time), where each subtask 3037 includes a corresponding set of one or more records for processing.

In some embodiments, subtasks are created and assigned based on the type of load being performed, where different types of subtasks are created for different load types in conjunction with implementing the load-type based subtask generation process. The different load types can include a batch load type and/or a continuous load type.

The batch load type can correspond to a load of a predetermined batch of files, for example, where the file(s) to be loaded are listed and sorted (e.g. based on a user-specified sort order). The load-type based subtask generation process can implement a batch load-based subtask generation process when the load type is the batch load type.

Implementing the batch load-based subtask generation process can include, initially, creating a subtask for each node in the system, where each subtask loads a partition of the files. Subtasks that are created earlier are executed earlier to render earlier loading of files that are sorted earlier than later loading of files sorted later. As subtasks complete, more subtasks can be created to load files later in the sorted order. For example, the time that earlier subtasks took to complete can be utilized to adjust the number of files in later subtasks (e.g. targeting a 10-minute duration for each subtask by default). This can include implementing some or all features and/or functionality of the next loading batch set initiation module 2925.

A given node can execute a newly created subtask once it has completed its current subtask. Because of this, each node will execute one subtask at a time. This allows parallelization of the load to the greatest possible extent while loading data approximately in sorted order.

In some embodiments, the subtasks 3037 can be configured to each indicate a corresponding loading batch 2932 for loading, where the task generator module 3036 implements some or all features and/or functionality of next loading batch set initiation module 2925 to generate sets of subtasks over time, where a given subtask 3037 indicates a given loading batch 2932 for loading, where a given set of subtasks indicates N subtasks 3037.1-3037.N for processing by the N nodes 37.1-37.N and corresponds to a given loading batch set 2930, and where subsequent sets of N subtasks are generated for subsequent loading batch sets 2930. In such embodiments, the one or more source datasets 2601 for the loading task can be implemented as the file set 2910, for example, where the bulk loading of the predefined file set 2910 of FIG. 29A corresponds to the batch loading type.

Meanwhile, the continuous load type can correspond to a load if a continuous streaming source (e.g. implemented via Apache Kafka). The load-type based subtask generation process can implement a continuous load-based subtask generation process when the load type is the continuous load type.

Implementing the continuous load-based subtask generation process can include, create one subtask for each node in the system (e.g. each of the N nodes 37.1-37.N participating in the loading task 3012). All these N subtasks 3037.1-3037.N can be executed in parallel, one on each node. Streaming data source can be responsible for rebalancing data partitions among the nodes in the system. None of the subtasks ever complete (e.g. while the streaming source is active/still emitting data); instead, execution of these subtasks can include continually polling the streaming data source for more data to load (e.g. indicating more data is requested/needed for loading).

The distributed tasks coordinator 3010 can be configured to further implement a node availability handling strategy 3012 in conjunction with performing the distributed loading process coordination 3011. For example, in order to handle situations where one or more nodes are not available (e.g. due to hardware failure or network issues), the distributed tasks framework can be applied to maintains knowledge of which nodes are available and assigns subtasks to available nodes. If a node becomes unavailable, its subtask is reassigned to a different, available node.

Implementing the node availability handling strategy 3012 can be based on detecting and responding to changes in node availability of any of the nodes 37.1-37.N to ensure that any of the nodes 37.1-37.N encountering outages/failure have their subtasks 3037 reassigned to other nodes 37 accordingly (e.g. a given node 37.x implementing loading module 2510.x fails, and is "replaced" by another node 37.y that implements this loading module 2510.x via reassignment of the corresponding subtask(s) 3037 assigned to this failed node, where the new node continues/restarts any subtasks to ensure subtasks assigned to loading module 2510.x are completed accordingly despite the node outage).

This reassigning can result in a task being executed multiple times on different nodes, in sequence or at once. The node availability handling strategy 3012 can be configured to guarantee that all data is loaded, and that no data being loaded twice. This can be based on configuring each subtask to be idempotent: if it is executed more than once, data will be deduplicated (e.g. by a rolehostd) to ensure that the exact, correct data is loaded. This can be accomplished by assigning a unique and unchanging stream source ID to each data partition (e.g. where IDs are maintained as system metadata mediated as state data in conjunction with a consensus protocol, for example, based on the IDs being managed via a metadata-layer Raft-based store).

The distributed tasks coordinator 3010 can be configured to further implement a load error handling strategy 3013 in conjunction with performing the distributed loading process coordination. For example, the loading process can fail and/or otherwise encounter errors requiring handing. Monitoring and handling of errors occurring during/failure of the loading process can be performed via implementing the load error handling strategy 3013 to ensure that all data is ultimately loaded correctly (e.g. exactly once).

Loading failure can occur due to transient or non-transient errors. Some or all network-related errors can be classified as transient errors (e.g. timeouts, connection failures, broken connections, etc.) while some or all data-related errors can be classified as non-transient errors (e.g. data transform failures or datatype mismatches).

Implementing the load error handling strategy 3013 can include, when a transient error occurs, marking the subtask in which it occurred as failed. However, this failure can be marked as retriable (e.g. based on the error being a transient error vs. a non-transient error). In response to the failed task being marked as retriable, the distributed tasks framework can randomly reassign this retriable task to an available node to be run again. In some embodiments, if the number of transient errors on a single subtask reaches a user-specified threshold, the corresponding retrying ends and the entire load is marked as failed.

Implementing the load error handling strategy 3013 can include, when a non-transient error occurs, marking the subtask in which it occurred as failed, and marking that failure as non-retriable (e.g. based on the error being a non-transient error vs. a transient error). Once the distributed tasks coordinator notices that a task has failed (e.g. and is also non-retriable), it can communicate to all nodes that their running tasks be cancelled, and the entire loading task 3012 can be marked as failed.

In some embodiments, some or all errors occurring rendering transient or non-transient failure can correspond to file-level errors or record-level errors. In some embodiments, the Implementing the load error handling strategy 3013 includes implementing some or all features and/or functionality of error handling module 2810.

In some embodiments, each subtasks 3037 is executed on a loader node (e.g. a node 37 implemented as a loading module 2510), for example, as part of a rolehostd process. In some embodiments, the rolehostd function that executes the subtask is a wrapper around a JNI call to an intra-process JVM (e.g. implemented as an "extractor engine"), which can be implemented to perform the actual work of retrieving source data and transforming it (e.g. as discussed in conjunction with execution of loading process 2605 as described herein), and then sending the transformed data back (e.g. to rolehostd) over network sockets. The extractor engine can be designed to be stateless other than its knowledge of the subtasks currently assigned to it. This can enables idempotency required for data correctness.

Each subtask can be divided into further partitions within the extractor engine. The number of partitions can correspond to a number of CPU cores available to the extractor engine (E.g. number of processing core resources 48 available on a corresponding node 37). However, the number of partitions can differ in the case of a node outage, for example, since the subtask may have been originally assigned to a node with a different CPU configuration.

FIG. 30A is a schematic block diagram of a record processing and storage system that performs a loading process based on implementing a distributed tasks coordinator that generates a plurality of subtasks each for execution via a corresponding node of a plurality of nodes in accordance with various embodiments;

FIG. 30B illustrates an example logical flow of distributed loading processing coordination performed in conjunction with performing a loading process in accordance with various embodiments. Some or all features and/or functionality of the process of FIG. 30B can implement any embodiment of loading process 2605 and/or distributed loading process coordination 3011 described herein.

A load can be initiated (e.g. in conjunction with a corresponding loading task 3012). If the load is a batch load, the files are listed and sorted, and/or a subtask is created for each available loader node 37. If the load is a continuous load, a subtasks is created for each loader node.

Figure 30C:
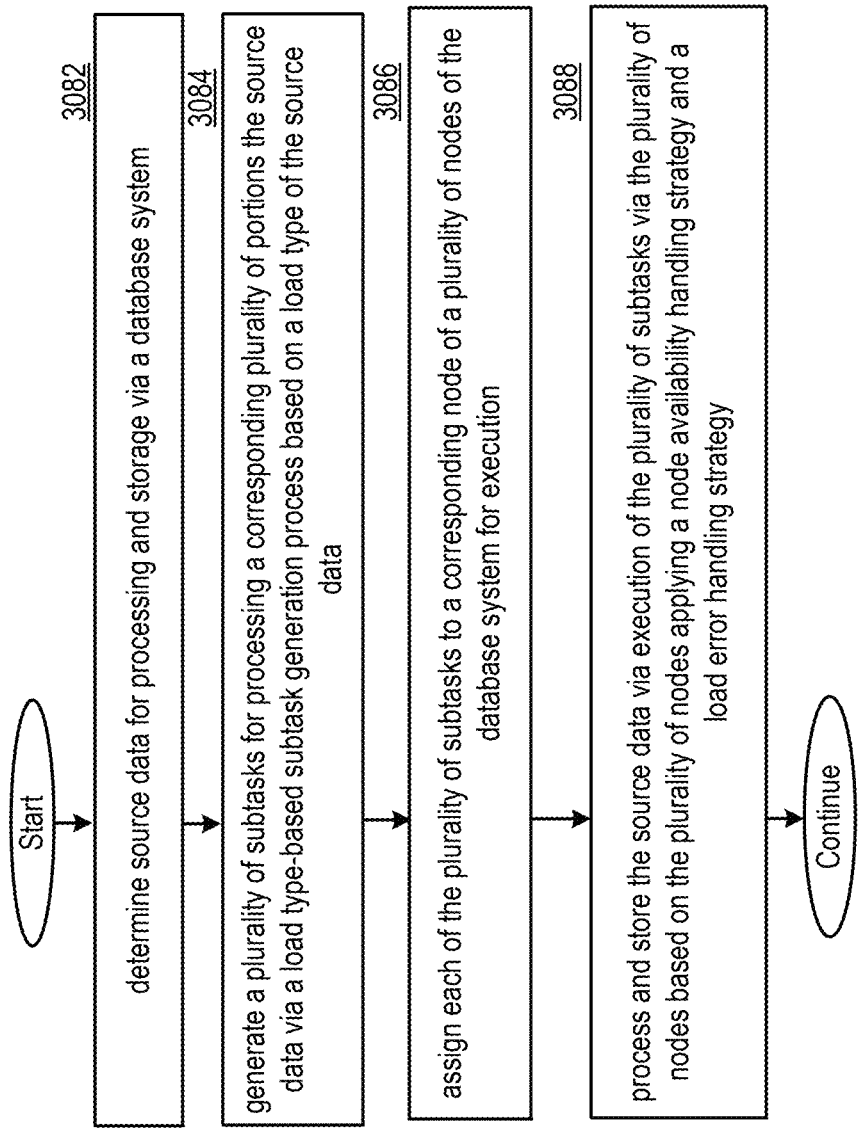
FIG. 30C is a logic diagram illustrating a method for execution in accordance with various embodiments.

Each subtask can be assigned to an available node (e.g. up to one task per node at a given time). If an error occurs in executing a subtask, the load is marked as failed when the error is transient and, when the error is non-transient, the subtask is marked as retriable for assignment to an available node (e.g. a new node) to attempt re-execution of some or all of the subtask (e.g. ensuring no data is duplicated or missed in loading). If the subtask completes, FIG. 30C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30C, for example, based on participating in execution of a query being executed by the database system 10. Some or all of the method of FIG. 30C can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 30C based on implementing a corresponding plurality of processing core resources 48.1-48.W. Some or all of the steps of FIG. 30C can optionally be performed by any other one or more processing modules of the database system 10. Some or all of the steps of FIG. 30C can be performed to implement some or all of the functionality of the database system 10 as described in conjunction with FIGS. 30A-30B, for example, by implementing some or all of the functionality of record processing and storage system 2505, loading process 2605, distributed tasks coordinator 3010, task generator module 3036, load type-based subtask generation process 3037, subtasks 3037.1-3037.N, database storage 2450, and/or loading modules 2510.1-2510.W. Some or all steps of FIG. 30C can be performed by database system 10 in accordance with other embodiments of the database system 10 and/or nodes 37 discussed herein. Some or all of the steps of FIG. 30C can be performed in conjunction with performing some or all steps of any other method described herein.

Step 3082 includes determining source data for processing and storage via a database system. Step 3084 includes generating a plurality of subtasks for processing a corresponding plurality of portions of the source data via a load type-based subtask generation process based on a load type of the source data. Step 3086 includes assigning each of the plurality of subtasks to a corresponding node of a plurality of nodes of the database system for execution. Step 3088 includes processing and storing the source data via execution of the plurality of subtasks via the plurality of nodes based on the plurality of nodes applying a node availability handling strategy and a load error handling strategy.

In various examples, the load type of the source data is one of a plurality of different load types that includes: a batch load type; and/or a continuous load type. In various examples, the load type-based subtask generation process is one of a plurality of different subtask generation mechanisms that includes: a batch load-based subtask generation process associated with the batch load type; and/or a continuous load-based subtask generation process associated with the continuous load type.

In various examples, the load type is the batch load type based on identifying the source data as a predetermined set of files for loading. In various examples, generating the plurality of subtasks via the batch load-based subtask generation process includes generating the plurality of subtasks as a plurality of sets of subtasks based on: creating a first set of subtasks for the plurality of nodes based on assigning one subtask of the plurality of subtasks to a corresponding one of the plurality of nodes; and/or creating additional sets of subtasks for the plurality of nodes based on completing prior subtasks of prior sets of subtasks.

In various examples, the plurality of sets of subtasks are generated in accordance with a sorted ordering of the predetermined set of files. In various examples, each of the plurality of nodes serially process corresponding assigned subtasks in accordance with an ordering that the corresponding assigned subtasks were generated.

In various examples, the load type is the continuous load type based on identifying the source data as a continuous streaming data source for loading. In various examples, generating the plurality of subtasks via the load type-based subtask generation process includes generating the plurality of subtasks based on generating one corresponding subtask for each of the plurality of nodes for execution in parallel with other ones of the plurality of nodes. In various examples, processing and storing the source data via execution of the plurality of subtasks via the plurality of nodes is based on the each of the plurality of nodes executing the one corresponding subtask based on polling the continuous streaming data source for additional data a plurality of times based on the one corresponding subtask being generated via the continuous load-based subtask generation process.

In various examples, the continuous streaming data source is implemented via an Apache Kafka streaming source.

In various examples, the load type of the source data corresponds to the batch load type. In various examples, the plurality of subtasks are generated via the batch load-based subtask generation process associated with the batch load type. In various examples, the method further includes: determining second source data for processing and storage via a database system; and/or generating a second plurality of subtasks for processing a second corresponding plurality of portions of the second source data via the continuous load-based subtask generation process based on the second source data corresponding to the continuous load type. In various examples, the second source data is executed based on applying the node availability handling strategy and the load error handling strategy.

In various examples, applying the node availability handling strategy is based on, in a first temporal period, identifying an initial plurality of nodes based on identifying each of the initial plurality of nodes as available nodes of the database system. In various examples, the initial plurality of nodes are assigned an initial set of subtasks of the plurality of subtasks. In various examples, applying the node availability handling strategy is based on, in a second temporal period after the first temporal period, in response to determining one of the initial plurality of nodes becomes unavailable while execution of a corresponding subtask of the initial set of subtasks is in progress, reassigning the corresponding subtask a new node distinct from the initial plurality of nodes based on determining the new node is available. In various examples, the new node executes the corresponding subtask based on the corresponding subtasks being reassigned to the new node.

In various examples, applying the node availability handling strategy includes performing a deduplication process to ensure all data includes in the corresponding plurality of portions of the source data is loaded exactly once to the database system. In various examples, the corresponding subtask corresponds to loading of a corresponding portion of source data of the corresponding plurality of portions of the source data. In various examples, execution of the corresponding subtask by the one of the initial plurality of nodes includes completing loading at least some data of corresponding portion of source data. In various examples, none of the at least some data of corresponding portion of source data is reloaded by the new node despite the corresponding subtask being executed by the new node based on performance of the deduplication process.

In various examples, generating the plurality of subtasks is based on assigning a corresponding unique stream source identifier of a plurality of unique stream source identifiers to each of the corresponding plurality of portions the source data. In various examples, applying the node availability handling strategy is based on utilizing plurality of unique stream source identifiers.

In various examples, applying the node availability handling strategy is based on system metadata indicating assignment of the plurality of subtasks to the plurality of nodes. In various examples, the system metadata is implemented as state data mediated via the plurality of nodes in accordance with a consensus protocol.

In various examples, the source data is processed and stored in conjunction with executing a loading process via the execution of the plurality of subtasks via the plurality of nodes. In various examples, the method further includes: during the loading process, detecting occurrence of a load error in conjunction with execution of a corresponding subtask of the plurality of subtasks; and/or, in response to the detection of the load error, performing a load error handling process in accordance with applying the load error handling strategy.

In various examples, performing the load error handling process includes: determining failure of the corresponding subtask prior to completing execution of the corresponding subtask via a corresponding node of the plurality of nodes based on the load error occurring; determining the corresponding subtask is retriable based on the load error being a transient load error; reassigning the corresponding subtask to an available node of the plurality of nodes for re-execution based on determining the corresponding subtask is retriable; and/or completing the re-execution of the corresponding subtask via the available node.

In various examples, performing the load error handling process includes aborting the loading process based on the occurrence of the load error. In various examples, at least some of the source data is not stored via the database system during the loading process due to the aborting of the loading process prior to completion of the loading process.

In various examples, aborting the loading process is based on, based on the load error having a transient load error type, determining a total number of transient load errors having occurred during the loading process exceeds a configured threshold number of transient errors in response to occurrence of the load error and occurrence of a plurality of prior transient load errors. In various examples, applying the configured threshold number of transient errors is in accordance with applying a transient load error handling process.

In various examples, aborting the loading process is based on, based on the load error having a non-transient load error type: determining the corresponding subtask being executed via a corresponding node of the plurality of nodes is non-retriable in accordance with applying a non-transient load error handling process; and/or based on determining the corresponding subtask is non-retriable, communicating task cancellation notification data to cancel execution a set of other subtasks of the plurality of subtasks currently being executed via other ones of the plurality of nodes.

In various examples, the source data is processed and stored in conjunction with performing a loading process. In various examples, performing the loading process is based on, for each record of a set of records in a set of data that includes the source data: identifying a corresponding source dataset from which the each record was sourced via a corresponding source identifier identifying the corresponding source dataset and corresponding source layout information for the corresponding source dataset; identifying a corresponding target database table via a corresponding target identifier identifying the corresponding target database table and corresponding target layout information for the corresponding target database table; reading the each record from the corresponding source dataset for storage in the corresponding target database table; and/or producing a transformed record for storage in the corresponding target database table. In various examples, processing and storing the source data is based on storing a plurality of transformed records generated from the set of records.

In various examples, the source data is processed and stored in conjunction with performing a loading process. In various examples, the method further includes segregating a plurality of files of the source data into a plurality of work units based on a work unit target size. In various examples, the loading process is performed via a set of parallelized loading modules to process the plurality of work units for storage in the database system via processing a plurality of sets of loading batches that collectively include the plurality of work units based on, for each set of loading batches of the plurality of sets of loading batches: selecting the each set of loading batches of the plurality of sets of loading batches based on selecting each loading batch of the each set of loading batches based on a corresponding target number of work units per batch determined for the each set of loading batches; assigning the each set of loading batches for processing by the set of loading modules based on assigning the each loading batch to a corresponding one of the set of loading modules; and/or in response to processing of a first loading batch of the set of loading batches being completed by a corresponding one of the set of loading modules, when at least one work unit of the plurality of work units has not yet been included in any loading batch assigned to any of the set of loading modules, initiating selection and assignment of a subsequent set of loading batches of the plurality of sets of loading batches.

In various examples, applying the load error handling strategy is based on: maintaining load error tracking data in accordance with error handling configuration data; when a record-level error occurs during processing of a corresponding record of the source data, updating the load error tracking data to indicate the record-level error for the corresponding record and/or foregoing further processing of the corresponding record and proceeding with processing of a next record of the source data; when a file-level error occurs during processing of a corresponding file of the source data, updating the load error tracking data to indicate the file-level error for the corresponding file and/or foregoing further processing of the corresponding file and proceeding with processing of a next file of the source data; and/or communicating the load error tracking data for access by a user entity.

In various embodiments, any one of more of the various examples listed above are implemented in conjunction with performing some or all steps of FIG. 30C. In various embodiments, any set of the various examples listed above can be implemented in tandem, for example, in conjunction with performing some or all steps of FIG. 30C, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 30C described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 30C, for example, in conjunction with further implementing any one or more of the various examples described above.

In various embodiments, the operational instructions, when executed by the at least one processor, cause the database system to: determine source data for processing and storage via a database system; generate a plurality of subtasks for processing a corresponding plurality of portions of the source data via a load type-based subtask generation process based on a load type of the source data; assign each of the plurality of subtasks to a corresponding node of a plurality of nodes of the database system for execution; and/or process and store the source data via execution of the plurality of subtasks via the plurality of nodes based on the plurality of nodes applying a node availability handling strategy and a load error handling strategy.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a data-ingest sub-system of a database system, the method comprising:
   receiving, by a plurality of data-ingest pipelines, a file regarding a dataset, wherein the dataset includes a plurality of rows of columnar data, wherein the columnar data includes a plurality of columns of data, wherein a row of columnar data corresponds to a record, and wherein a plurality of computing nodes of the data-ingest sub-system are configured to provide the plurality of data-ingest pipelines;
   sending, by the plurality of data-ingest pipelines, error free records of the file to memory of the data-ingest sub-system for storage therein;
   detecting, by a data-ingest pipeline of the plurality of data-ingest pipelines, a record having a data error;
   determining, by the data-ingest pipeline, an error tolerance setting regarding ingesting the file;
   when the error tolerance setting is zero tolerance, terminating, by the data-ingest pipeline, receiving of the file;
   when the error tolerance setting is a threshold number of records having a data error:
      adding, by the data-ingest pipeline, this occurrence of the record having the error to a record error list; and
      determining, by the data-ingest pipeline, whether the record error list includes a number of errors that exceeds the threshold number; and
      when the record error list includes a number of errors that exceeds the threshold number:
         terminating, by the data-ingest pipeline, receiving of the file.

2. The method of claim 1 further comprises:
   receiving, by the plurality of data-ingest pipelines, respective records of the file in accordance with a sequential distribution pattern, wherein each data-ingest pipeline of the plurality of data-ingest pipelines receives every $n^{th}$ record of the file, wherein n is the number of data-ingest pipelines of the plurality of data-ingest pipelines.

3. The method of claim 1 further comprises:
   when the record error list includes a number of errors that is below the threshold number:
      proceeding with, by the data-ingest pipeline, the receiving of the file.

4. The method of claim 1 further comprises:
   when the error tolerance setting is a tolerant setting:
      adding, by the data-ingest pipeline, this occurrence of the record having the error to the record error list; and
      proceeding with, by the data-ingest pipeline, the receiving of the file.

5. The method of claim 1 further comprises:
   receiving, by the data-ingest sub-system, an input value; and
   determining, by the data-ingest sub-system, the error tolerance setting based on the input value.

6. The method of claim 1 further comprises:
   detecting, by the data-ingest pipeline of the plurality of data-ingest pipelines, a file-level error of a file of a plurality of files being ingested by the plurality of data-ingest pipelines;
   determining, by the data-ingest pipeline, a file-level error tolerance setting regarding ingesting the plurality of files;
   when the file-level error tolerance setting is zero tolerance, terminating, by the plurality of data-ingest pipelines, the receiving of the plurality of files;
   when the file-level error tolerance is a threshold number of files having a file-level error:
      adding, by the data-ingest pipeline, this occurrence of the file having the file-level error to a list of files having file-level errors; and
      proceeding with, by the data-ingest pipeline, the receiving of the plurality of files.

7. The method of claim 6 further comprises:
   when the file-level error occurs mid-file after a first subset of records included in the file were processed:
      maintaining, by the data-ingest pipeline, the first subset of records to be sent to a memory of the data-ingest sub-system; and
      discarding, by the data-ingest pipeline, a second subset of records of the file, wherein a record of the second subset of records caused the file-level error.

8. The method of claim 1 further comprises:
   storing, by the data-ingest sub-system, the record error list in at least one of:
   a buffer associated with the data-ingest pipeline;
   a memory device associated with the data-ingest pipeline; and
   an error-storing data-ingest pipeline of the plurality of data-ingest pipelines.

9. The method of claim 8 further comprises:
accessing, via an administrator interface of the database system, the record error list;
receiving, via the administrator interface, correction data regarding one or more record errors associated with respective records; and
sending, via the administrator interface, corrected records to a memory of the data-ingest sub-system for storage therein.

10. A computer-readable memory comprises:
a first memory section that stores operational instructions that, when executed by a plurality of data-ingest pipelines of a data-ingest sub-system of a database system, causes the plurality of data-ingest pipelines to:
receive a file regarding a dataset, wherein the dataset includes a plurality of rows of columnar data, wherein the columnar data includes a plurality of columns of data, wherein a row of columnar data corresponds to a record, and wherein a plurality of computing nodes of the data-ingest sub-system are configured to provide the plurality of data-ingest pipelines;
send error free records of the file to memory of the data-ingest sub-system for storage therein; and
a second memory section that stores operational instructions that, when executed by a data-ingest pipeline of the plurality of data-ingest pipelines, causes the data-ingest pipeline to:
detect a record having a data error;
determine an error tolerance setting regarding ingesting the file;
when the error tolerance setting is zero tolerance, terminate receiving of the file;
when the error tolerance setting is a threshold number of records having a data error:
add this occurrence of the record having the error to a record error list; and
determine whether the record error list includes a number of errors that exceeds the threshold number; and when the record error list includes a number of errors that exceeds the threshold number:
terminate the receiving of the file.

11. The computer-readable memory of claim 10, wherein the first memory section further stores operational instructions that, when executed by the plurality of data-ingest pipelines, causes the plurality of data-ingest pipelines to:
receive respective records of the file in accordance with a sequential distribution pattern, wherein each data-ingest pipeline of the plurality of data-ingest pipelines receives every $n^{th}$ record of the file, wherein n is the number of data-ingest pipelines of the plurality of data-ingest pipelines.

12. The computer-readable memory of claim 10, wherein the second memory section further stores operational instructions that, when executed by the data-ingest pipeline, causes the data-ingest pipeline to:
when the record error list includes a number of errors that is below the threshold number:
proceed with the receiving of the file.

13. The computer-readable memory of claim 10, wherein the second memory section further stores operational instructions that, when executed by the data-ingest pipeline, causes the data-ingest pipeline to:
when the error tolerance setting is a tolerant setting:
add this occurrence of the record having the error to the record error list; and
proceed with the receiving of the file.

14. The computer-readable memory of claim 10, wherein the second memory section further stores operational instructions that, when executed by the data-ingest sub-system, causes the data-ingest sub-system to:
receive an input value; and
determine the error tolerance setting based on the input value.

15. The computer-readable memory of claim 10, wherein the second memory section further stores operational instructions that, when executed by the data-ingest pipeline, causes the data-ingest pipeline to:
detect a file-level error of a file of a plurality of files being ingested by the plurality of data-ingest pipelines;
determine a file-level error tolerance setting regarding ingesting the plurality of files;
when the file-level error tolerance setting is zero tolerance, terminate the receiving of the plurality of files by the plurality of data-ingest pipelines; and
when the file-level error tolerance is a threshold number of files having a file-level error:
add this occurrence of the file having the file-level error to a list of files having file-level errors; and
proceed with the receiving of the plurality of files.

16. The computer-readable memory of claim 15, wherein the second memory section further stores operational instructions that, when executed by the data-ingest pipeline, causes the data-ingest pipeline to:
when the file-level error occurs mid-file after a first subset of records included in the file were processed:
maintain the first subset of records to be sent to a memory of the data-ingest sub-system; and
discard a second subset of records of the file, wherein a record of the second subset of records caused the file-level error.

17. The computer-readable memory of claim 10, wherein the second memory section further stores operational instructions that, when executed by the data-ingest sub-system, causes the data-ingest sub-system to:
store the record error list in at least one of:
a buffer associated with the data-ingest pipeline;
a memory device associated with the data-ingest pipeline; and
an error-storing data-ingest pipeline of the plurality of data-ingest pipelines.

18. The computer-readable memory of claim 17, wherein the second memory section further stores operational instructions that, when executed by the data-ingest sub-system, causes the data-ingest sub-system to:
allow access via an administrator interface of the database system, the record error list;
when access is allowed:
receive via the administrator interface, correction data regarding one or more record errors associated with respective records; and
send corrected records to a memory of the data-ingest sub-system for storage therein.

* * * * *